(12) United States Patent
Bacchetta et al.

(10) Patent No.: US 12,540,311 B2
(45) Date of Patent: Feb. 3, 2026

(54) CRISPR-BASED FOXP3 GENE ENGINEERED T CELLS AND HEMATOPOIETIC STEM CELL PRECURSORS TO TREAT IPEX SYNDROME PATIENTS

(71) Applicant: The Board of Trustees of the Leland Stanford Junior University, Stanford, CA (US)

(72) Inventors: Rosa Bacchetta, Menlo Park, CA (US); Maria-Grazia Roncarolo, Menlo Park, CA (US); Matthew Porteus, Stanford, CA (US); Marianne Goodwin, Redwood City, CA (US)

(73) Assignee: The Board of Trustees of the Leland Stanford Junior University, Stanford, California, Stanford, CA (US)

( * ) Notice: Subject to any disclaimer, the term of this patent is extended or adjusted under 35 U.S.C. 154(b) by 771 days.

(21) Appl. No.: 17/760,264

(22) PCT Filed: Feb. 13, 2021

(86) PCT No.: PCT/US2021/018057
§ 371 (c)(1),
(2) Date: Aug. 5, 2022

(87) PCT Pub. No.: WO2021/163642
PCT Pub. Date: Aug. 19, 2021

(65) Prior Publication Data
US 2023/0081343 A1 Mar. 16, 2023

Related U.S. Application Data

(60) Provisional application No. 62/976,233, filed on Feb. 13, 2020.

(51) Int. Cl.
| | |
|---|---|
| *A61K 40/10* | (2025.01) |
| *A61K 40/22* | (2025.01) |
| *A61K 40/41* | (2025.01) |
| *C12N 5/0783* | (2010.01) |
| *C12N 9/22* | (2006.01) |
| *C12N 15/90* | (2006.01) |

(52) U.S. Cl.
CPC .......... *C12N 5/0637* (2013.01); *A61K 40/10* (2025.01); *A61K 40/22* (2025.01); *A61K 40/416* (2025.01); *C12N 9/22* (2013.01); *C12N 15/907* (2013.01); *A61K 2239/31* (2023.05); *A61K 2239/38* (2023.05); *C12N 2310/20* (2017.05)

(58) Field of Classification Search
None
See application file for complete search history.

(56) References Cited

U.S. PATENT DOCUMENTS 8,501,464 B2   8/2013   Naldini et al.

FOREIGN PATENT DOCUMENTS

| WO | WO2000009693 | 2/2000 | |
|---|---|---|---|
| WO | WO2018/024894 A1 | 2/2018 | |
| WO | WO2019210042 | 10/2019 | |
| WO | WO2019210078 | 10/2019 | |
| WO | WO-2019210078 A1 * | 10/2019 | ............... C12N 9/22 |
| WO | WO2020/104467 A1 | 5/2020 | |

OTHER PUBLICATIONS

Allan et al. (2008). "Generation of potent and stable human CD4+ T regulatory cells by activation-independent expression of FOXP3". Molecular Therapy, 16(1), 194-202.
Passerini et al. (2013). "CD4+ T cells from IPEX patients convert into functional and stable regulatory T cells by FOXP3 gene transfer". Science translational medicine, 5(215), 215RA174.
Sato et al. (2020). "Human-engineered Treg-like cells suppress FOXP3-deficient T cells but preserve adaptive immune responses in vivo." Clinical & Translational Immunology, 9(11), E1214.
Passerini et al. (2017) "Forkhead-Box-P3 gene transfer in human CD4+ T conventional cells for the generation of stable and efficient regulatory T cells, suitable for immune modulatory therapy". Frontiers in immunology, 8(1282), pp. 1-8.
Casucci et al. (2018) "Extracellular NGFR Spacers Allow Efficient Tracking and Enrichment of Fully Functional CAR-T Cells Co-Expressing a Suicide Gene". Frontiers in Immunology, vol. 9, No. 507; pp. 1-13.
Bacchetta et al. (2016) "From IPEX syndrome to FOXP3 mutation: a lesson on immune dysregulation", Annals of the New York Academy of Sciences, New York Academy of Sciences, US, vol. 1417, No. 1, 25, pp. 5-22.
Goodwin et al. (2020) "CRISPR-based gene editing enables FOXP3 gene repair in IPEX patient cells", Science advances, p. 1-16, eaaz0571.
Honaker et al. (2020) "Gene editing to induce FOXP3 expression in human CD4 + T cells leads to a stable regulatory phenotype and function", Science Translational Medicine, vol. 12, No. 546, p. 1-18, eaay6422.
Lee et al (2020) "Gene editing using CRISPR enables FOXP3 gene repair in HSPCs and IPEX patient T cells", Cytotherapy, vol. 22, No. 5, p. S20, Abstract.

(Continued)

Primary Examiner — Anna Skibinsky
Assistant Examiner — Catherine L Mccormick
(74) Attorney, Agent, or Firm — Pamela J. Sherwood; Bozicevic, Field & Francis LLP

(57) ABSTRACT

Compositions and methods are provided relating to FOXP3 gene edited hematopoietic cells, include hematopoietic stem and progenitor cells, lymphoid progenitor cells, and CD4+ T cells. The gene edited cells are useful in cellular therapy to restore normal immune functions and promote immune tolerance. In particular, $CD4^{edFOXP3}$ T cells, which may be differentiated from FOXP3 gene edited hematopoietic progenitor cells, can physiologically express functional FOXP3 and exert normal immune responses as effector T cells or have immune suppressive characteristics as naturally occurring Treg cells.

2 Claims, 38 Drawing Sheets

Specification includes a Sequence Listing.

(56) References Cited

OTHER PUBLICATIONS

Goodwin et al. (2016) "123. Gene Editing as a Therapeutic Approach to Treat IPEX Syndrome", Molecular Therapy, vol. 24, p. S51, XP093163819.
Passerini et al. (2013) "CD4+ T Cells from IPEX Patients Convert into Functional and Stable Regulatory T Cells by FOXP3 Gene Transfer", Science Translational Medicine, vol. 5, No. 215, pp. 1-10, XP093055996.
Schumann et al. (2015) "Generation of knock-in primary human T cells using Cas9 ribonucleoproteins", Proceedings of the National Academy of Sciences, vol. 112, No. 33, pp. 10437-10442.
Amendola et al. (Jan. 2005) "Coordinate dual-gene transgenesis by lentiviral vectors carrying synthetic bidirectional promoters", Nat. Biotech. 23(1):108-116.
Golding et al. (Jan. 2011) "A bidirectional promoter architecture enhances lentiviral transgenesis in embryonic and extraembryonic stem cells", Gene Therapy 18:817-826.

\* cited by examiner

FIG. 1
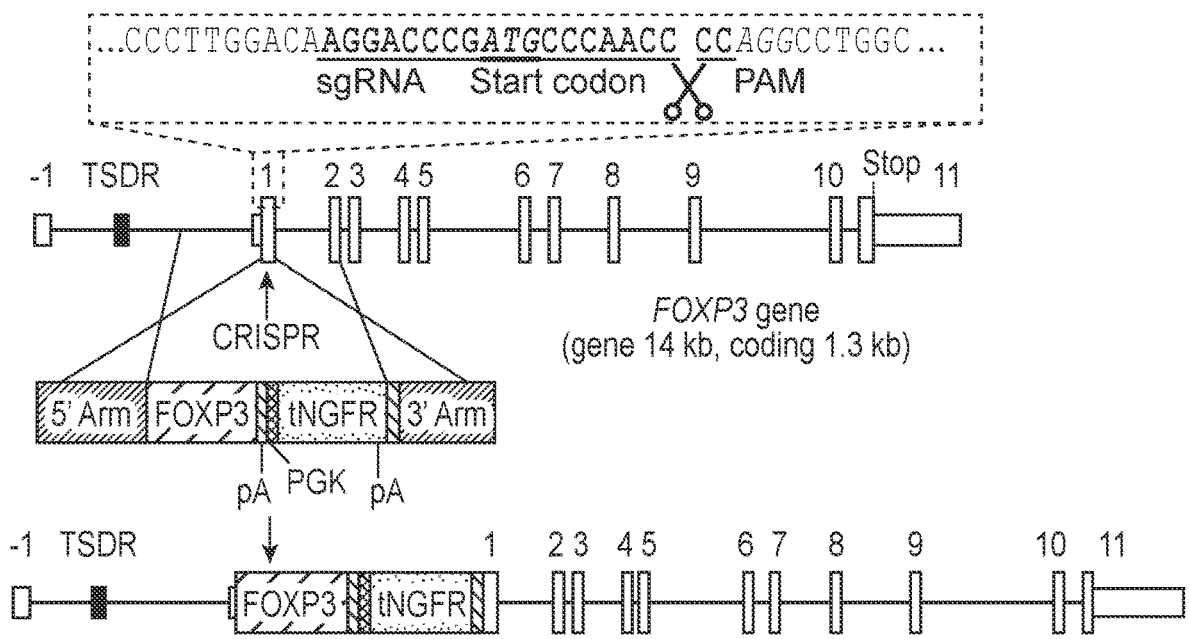
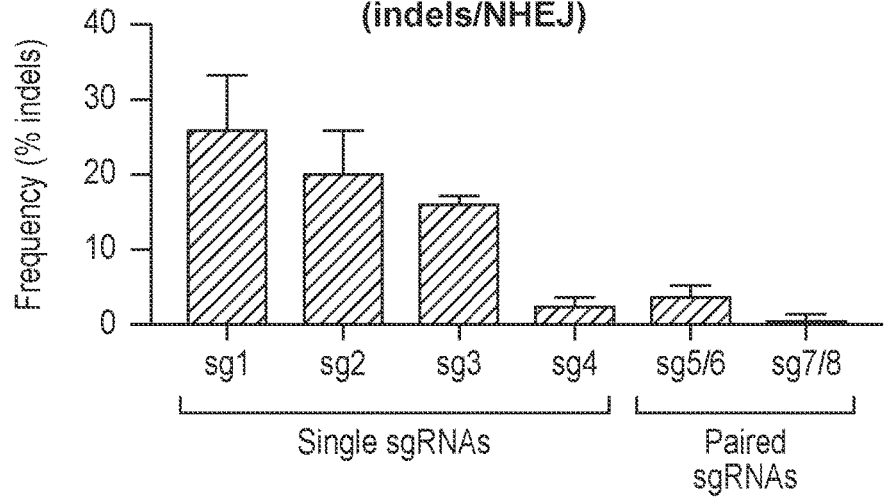

FIG. 1 (Cont.)
C
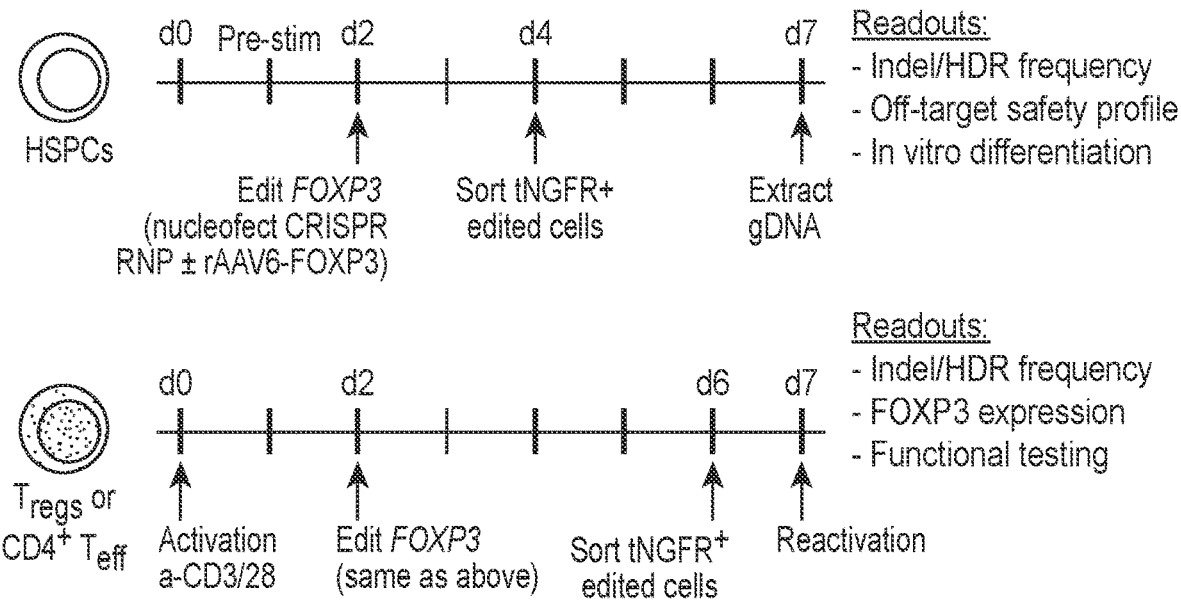
D
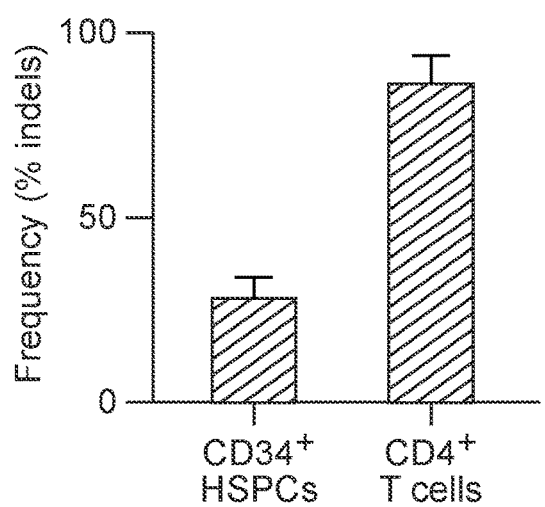

FIG. 2
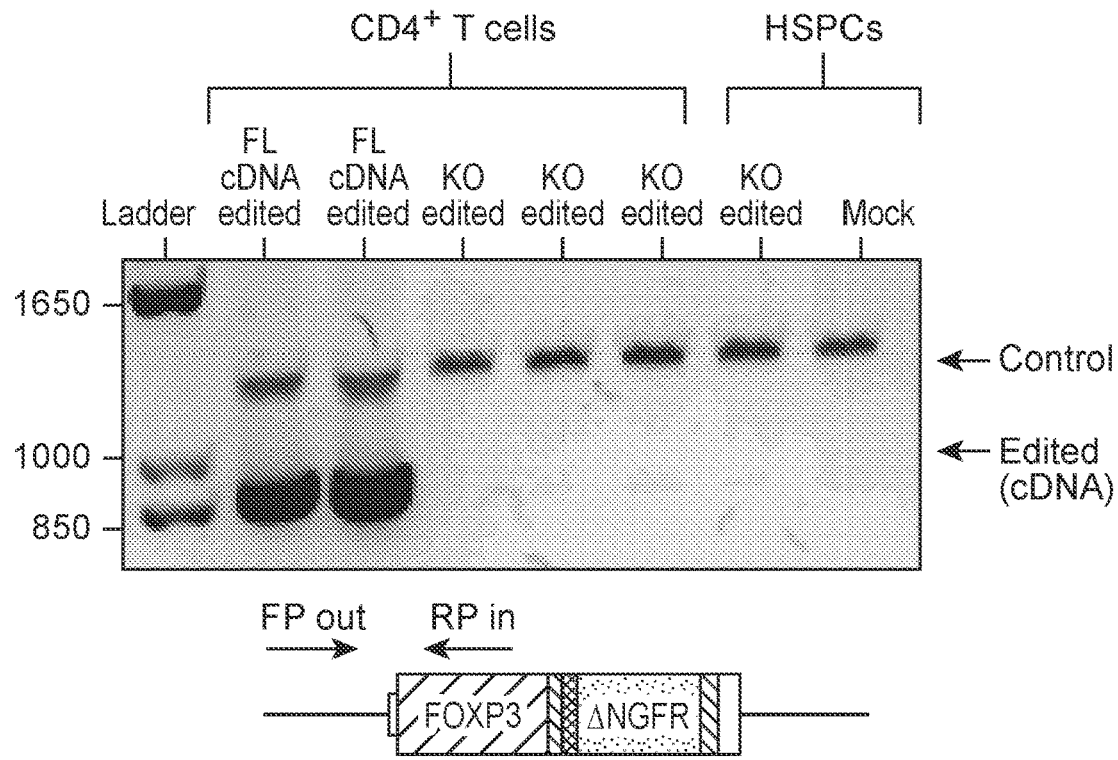
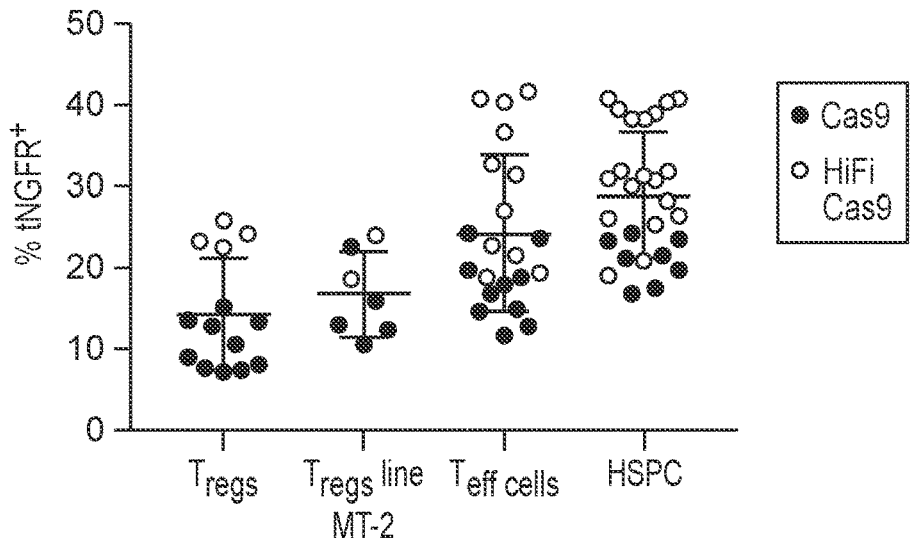

FIG. 2 (Cont.)
C
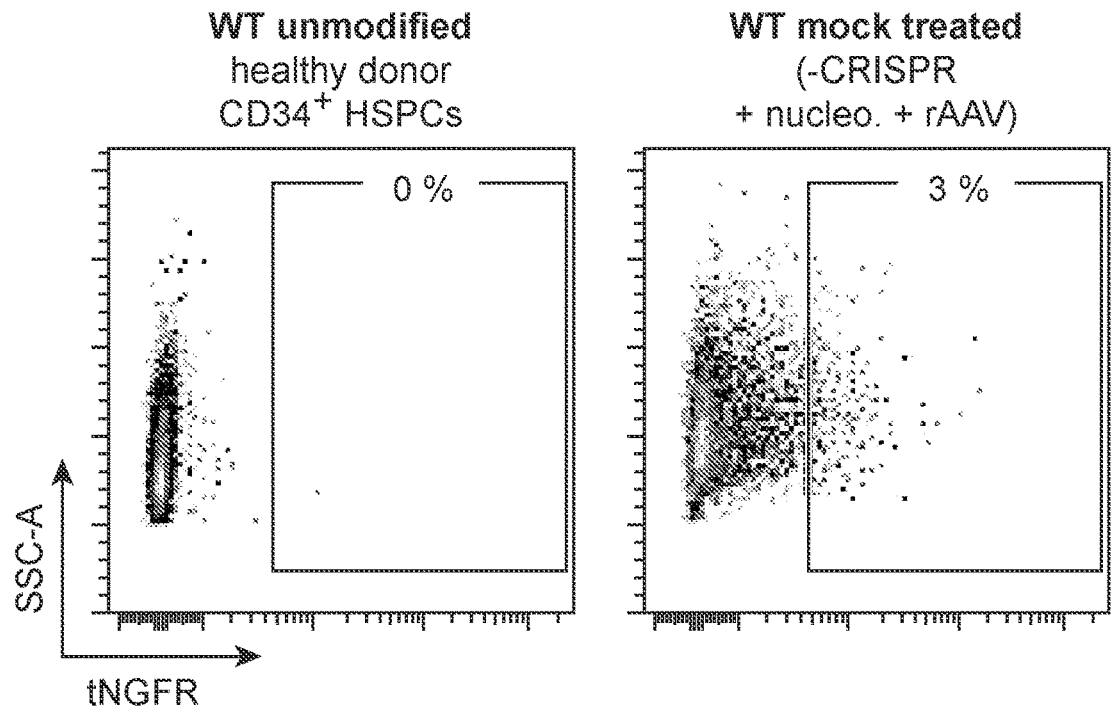
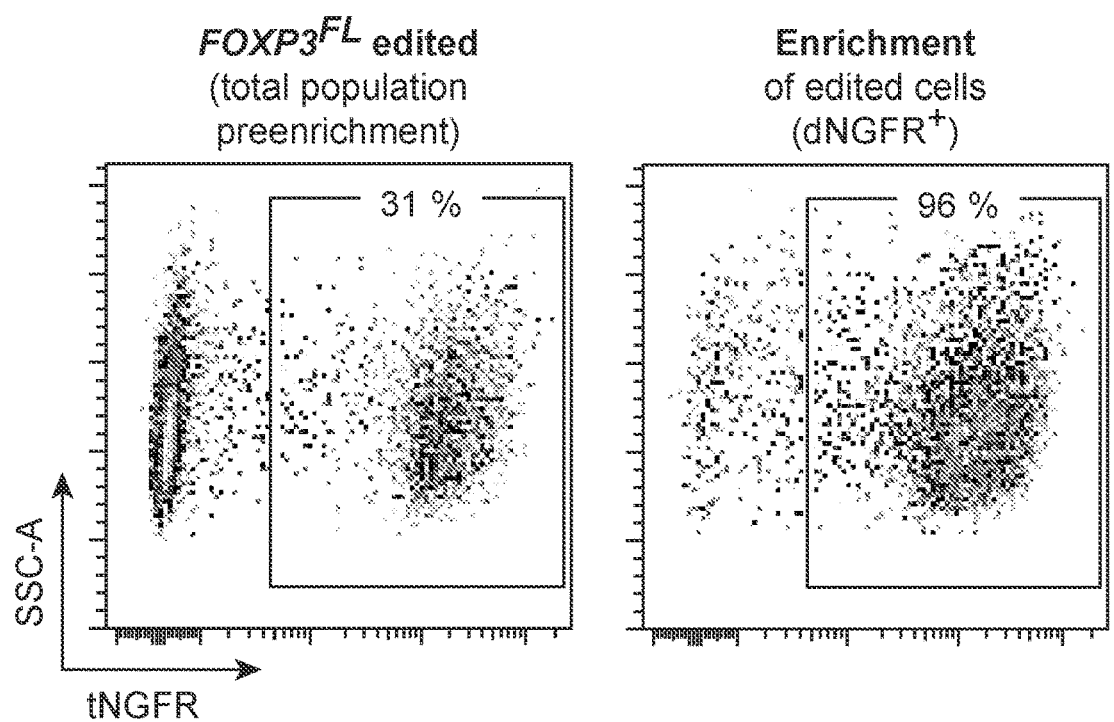

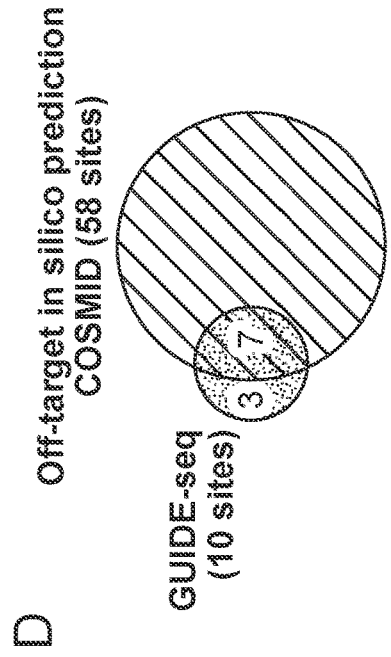
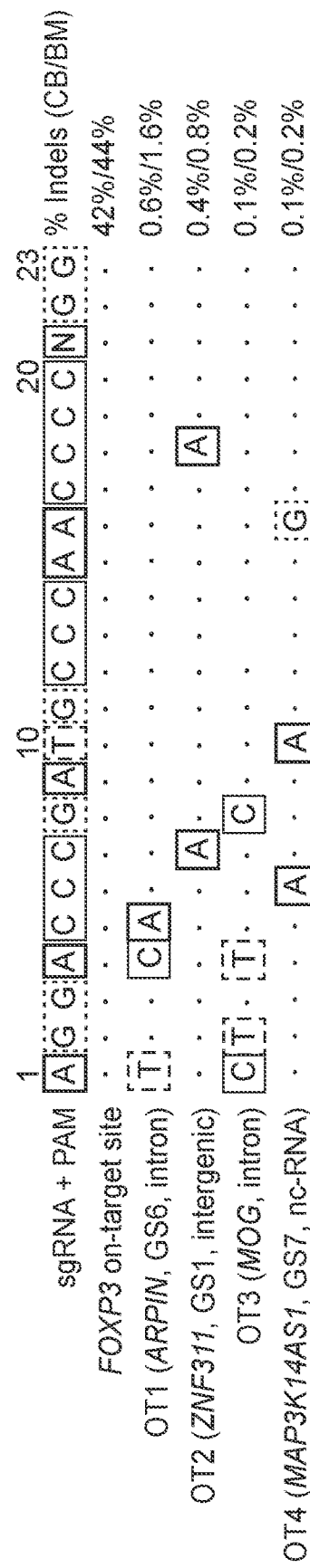
FIG. 2 (Cont.)

FIG. 3
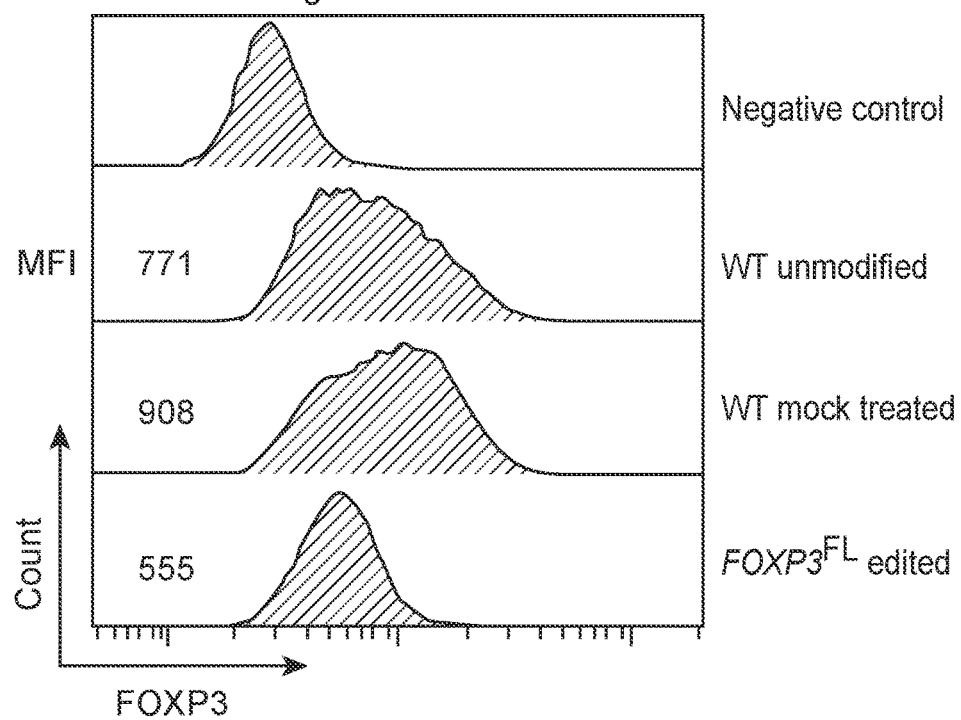
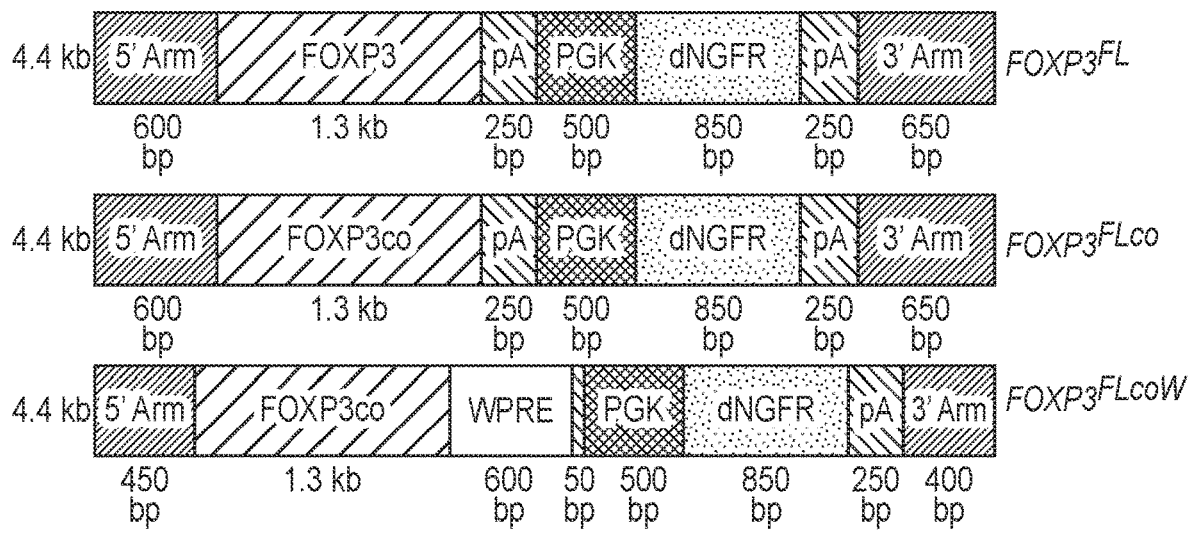

FIG. 3 (Cont.)
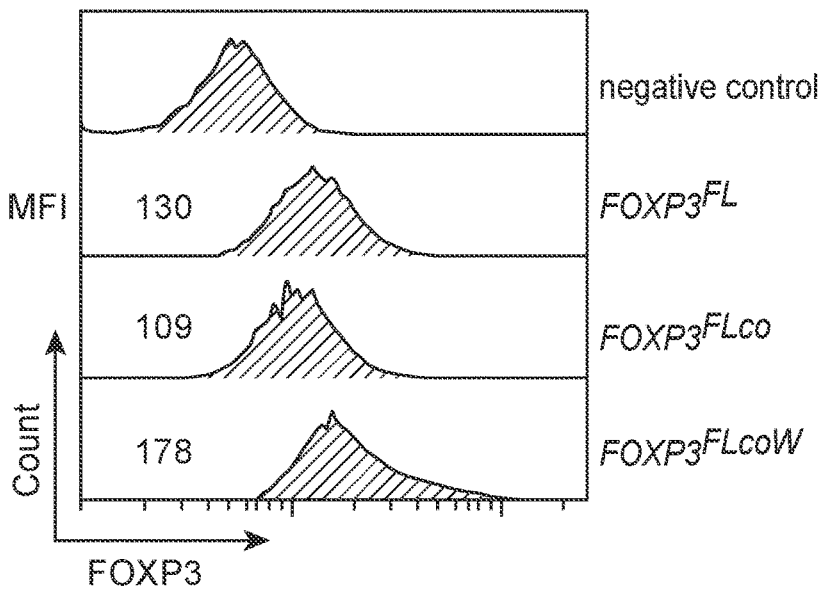
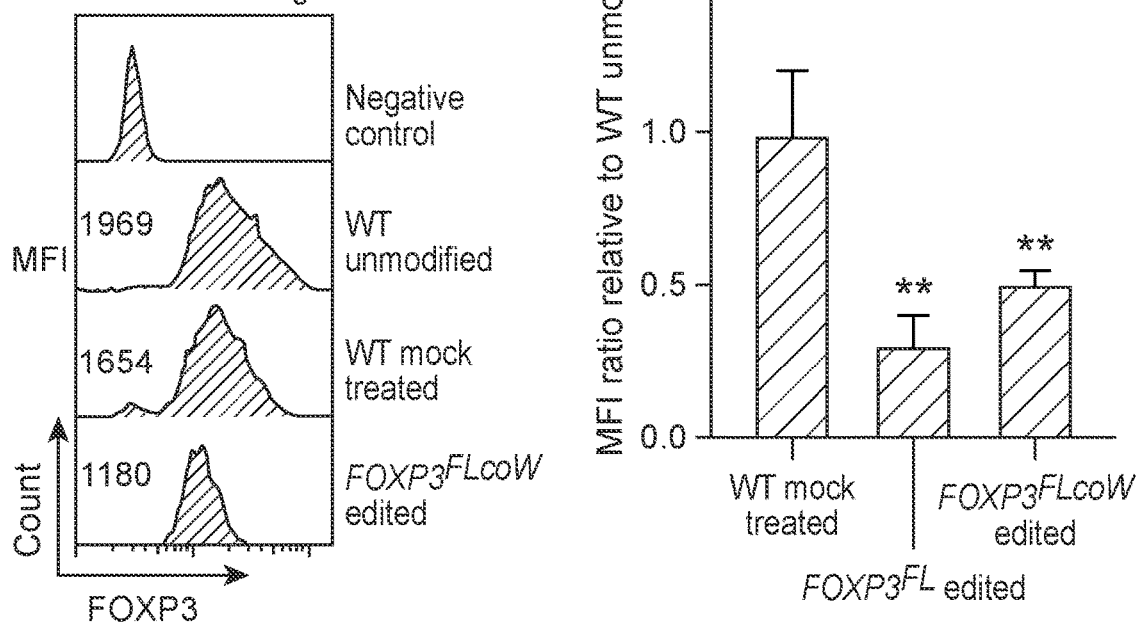

E (Cont.)

FIG. 3 (Cont.)
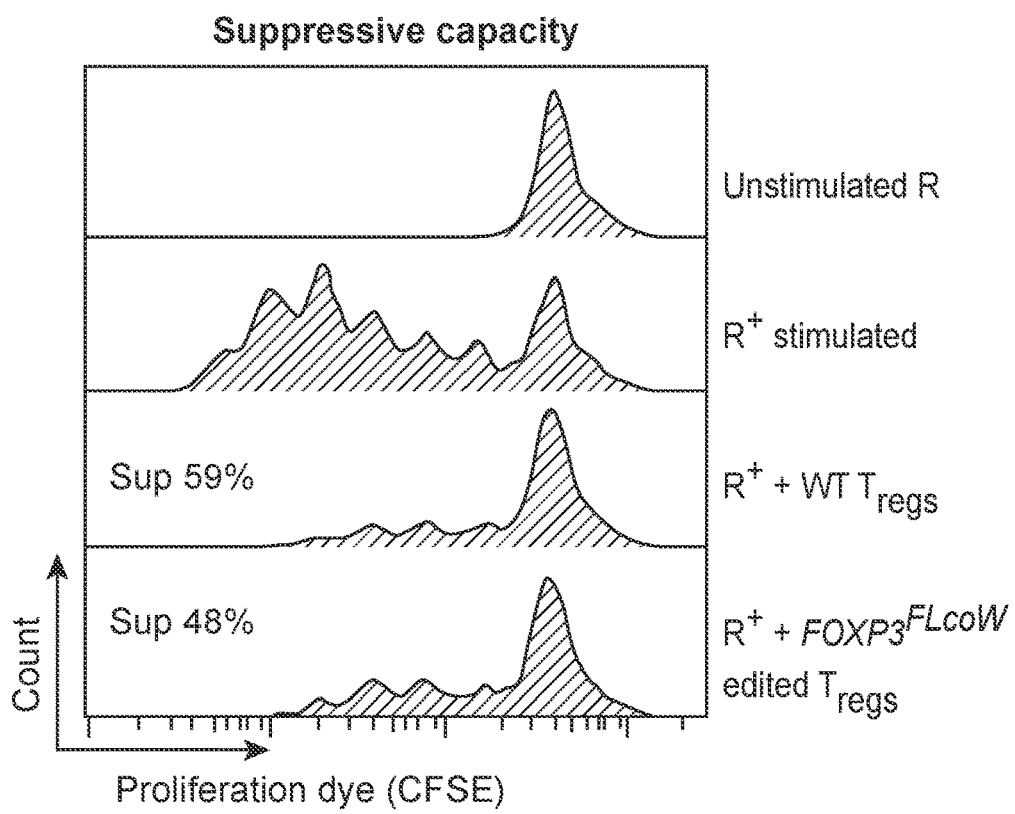
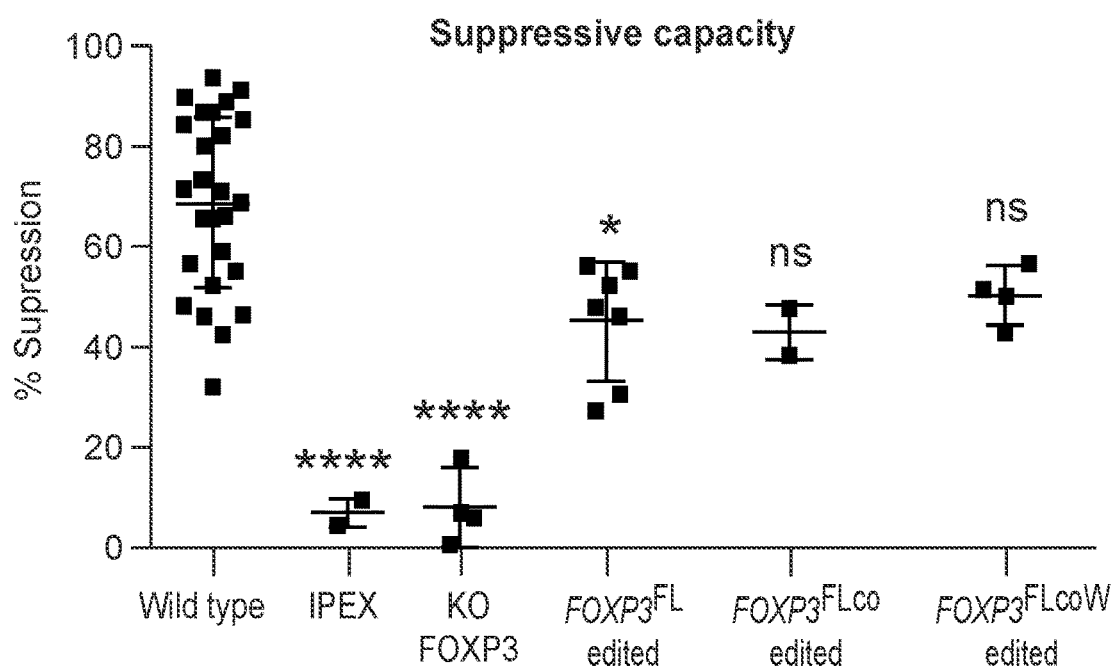

FIG. 4
A
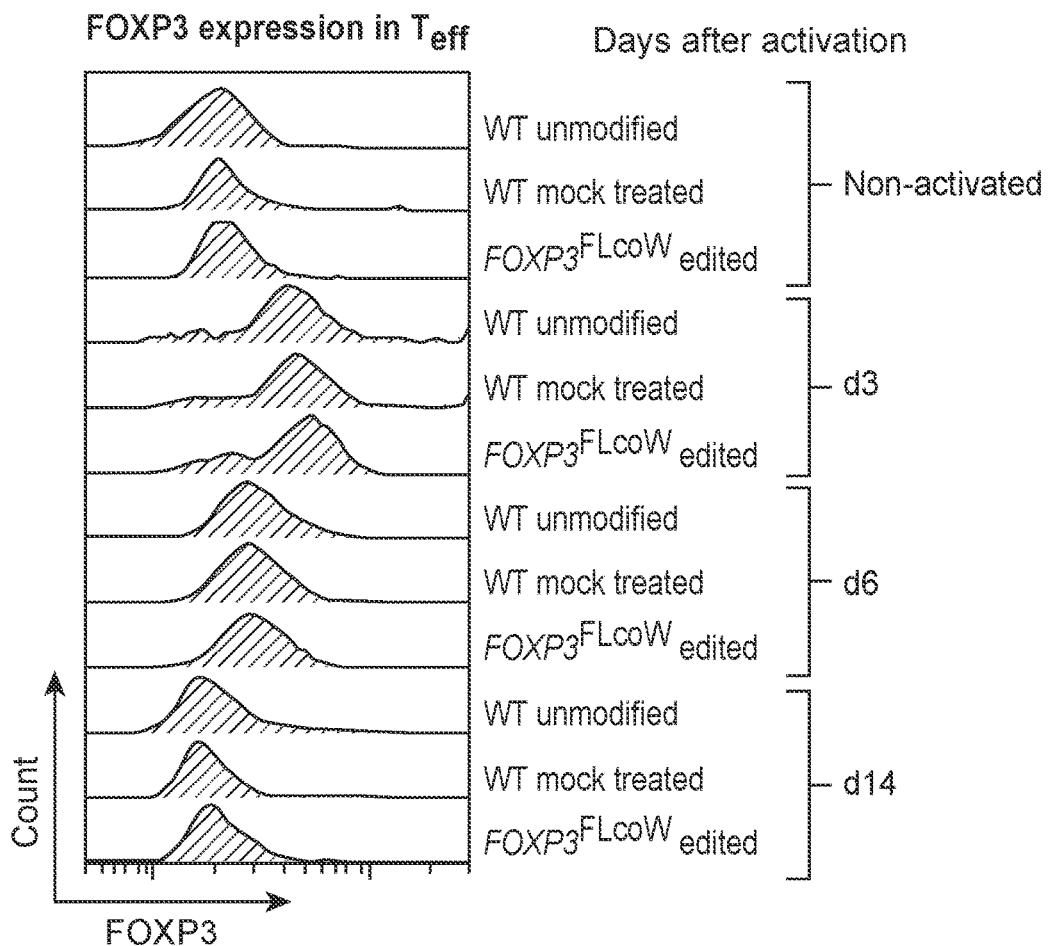
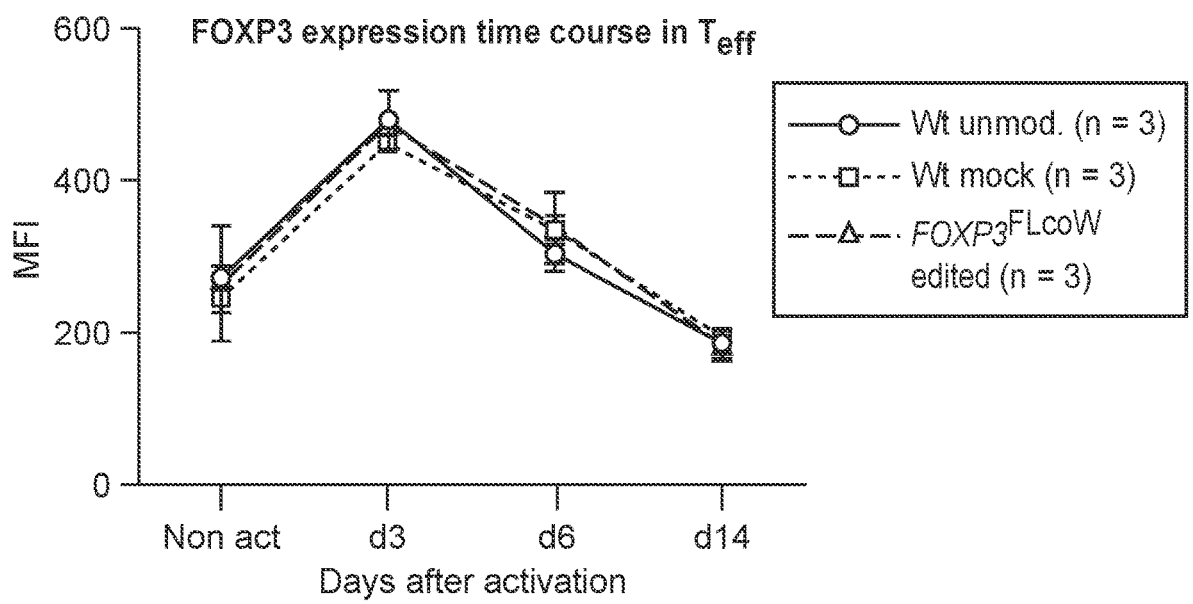

FIG. 4 (Cont.)
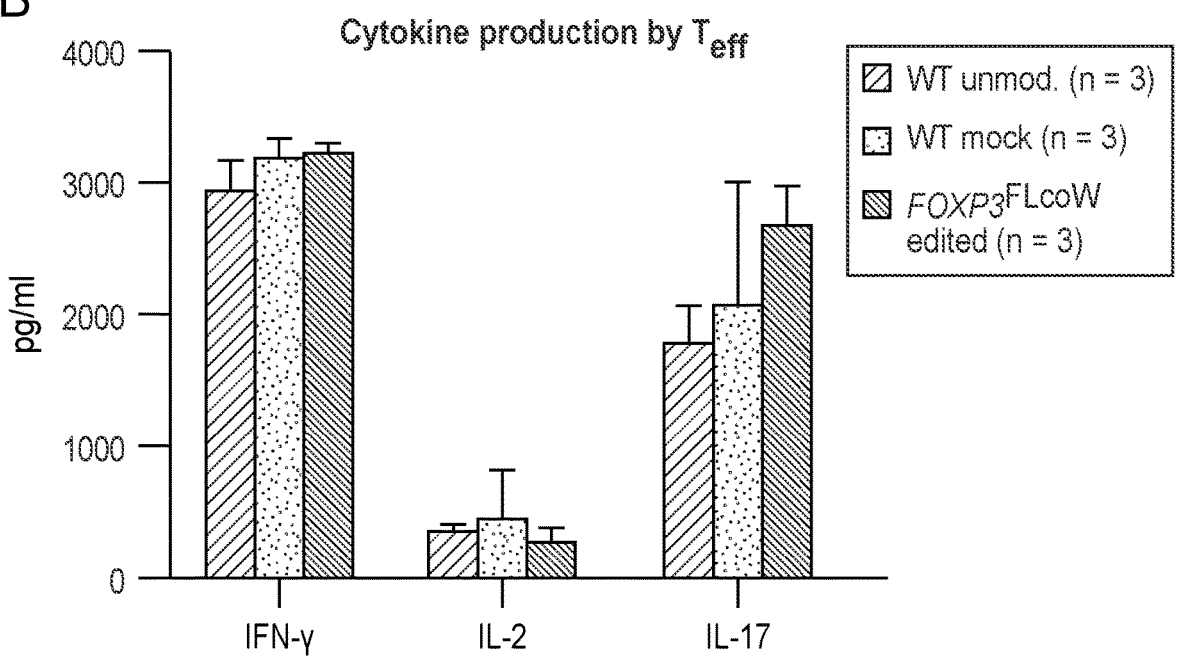
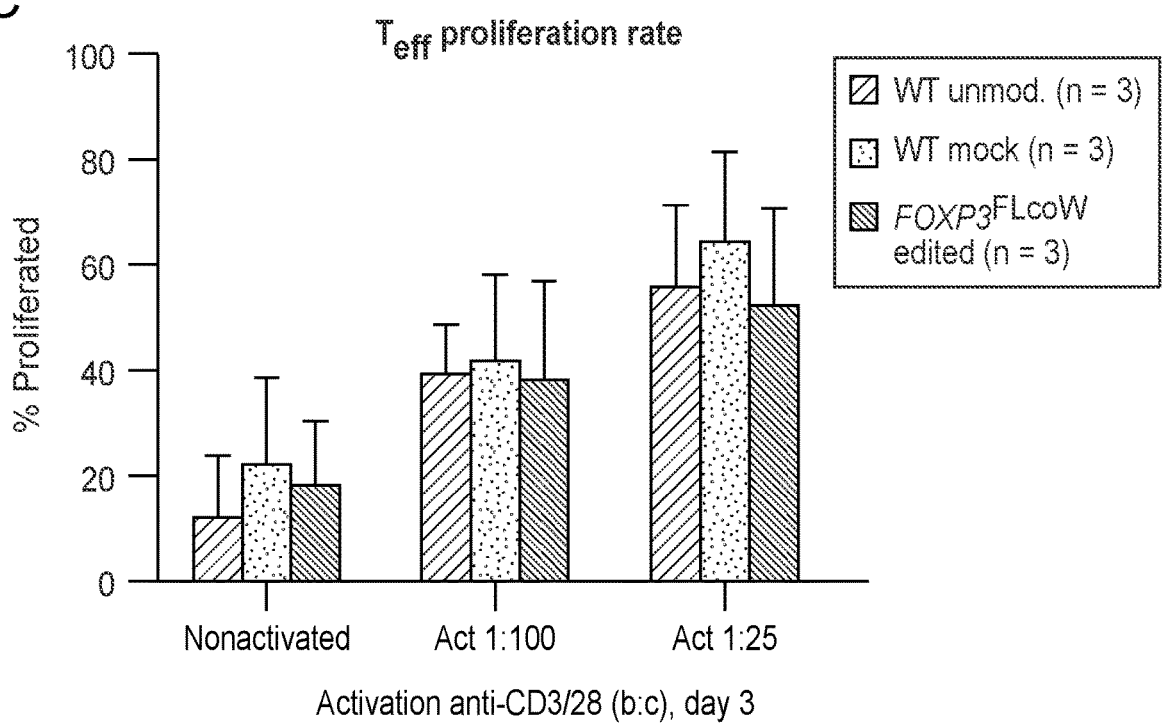

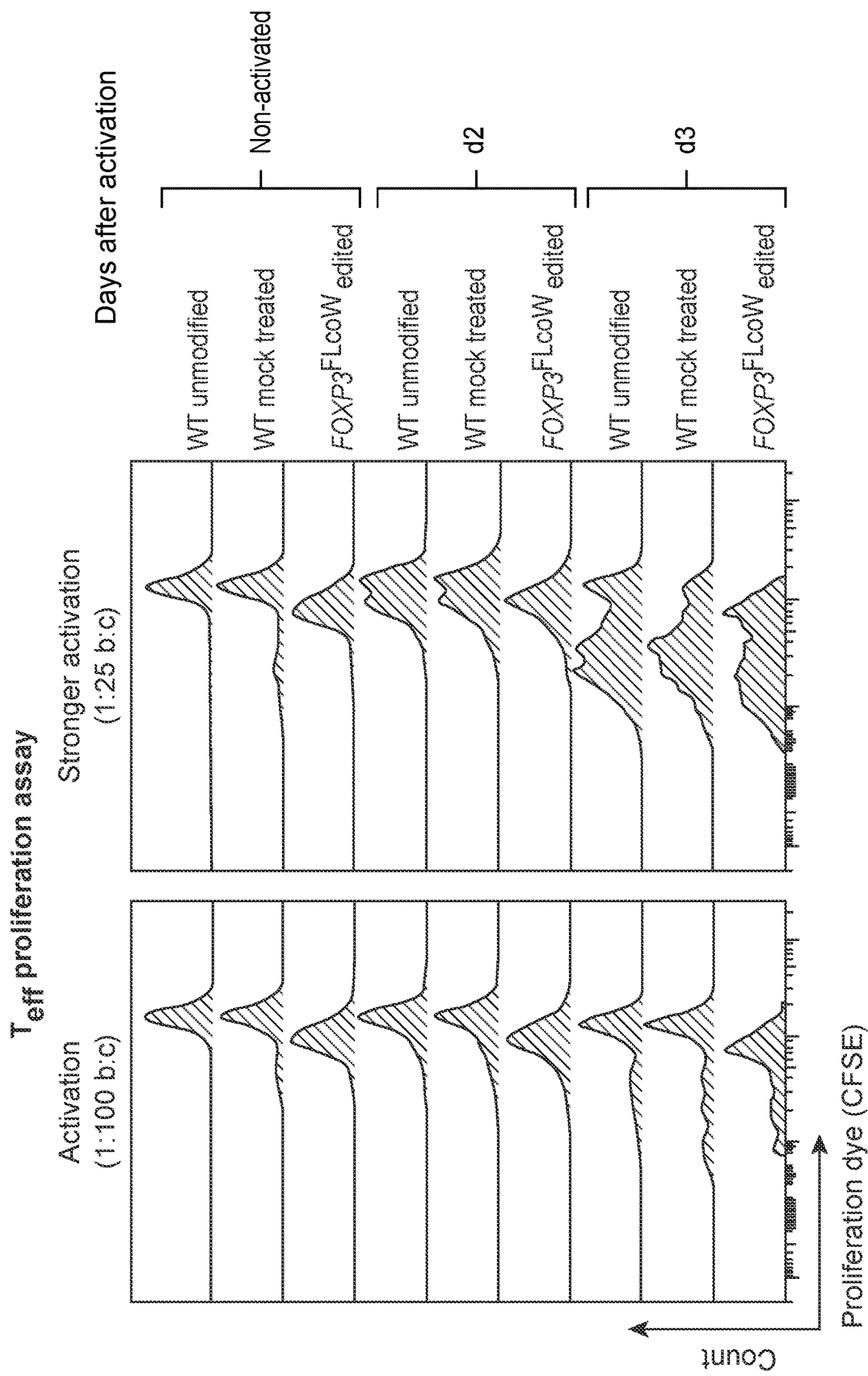

FIG. 5
A
*FOXP3* gene with patient mutations
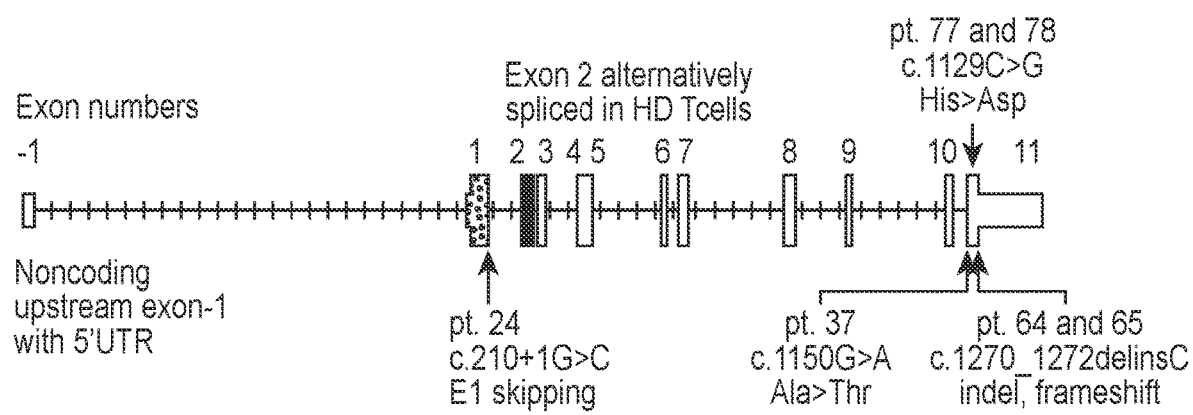
B
*FOXP3* gene locus in-out PCR
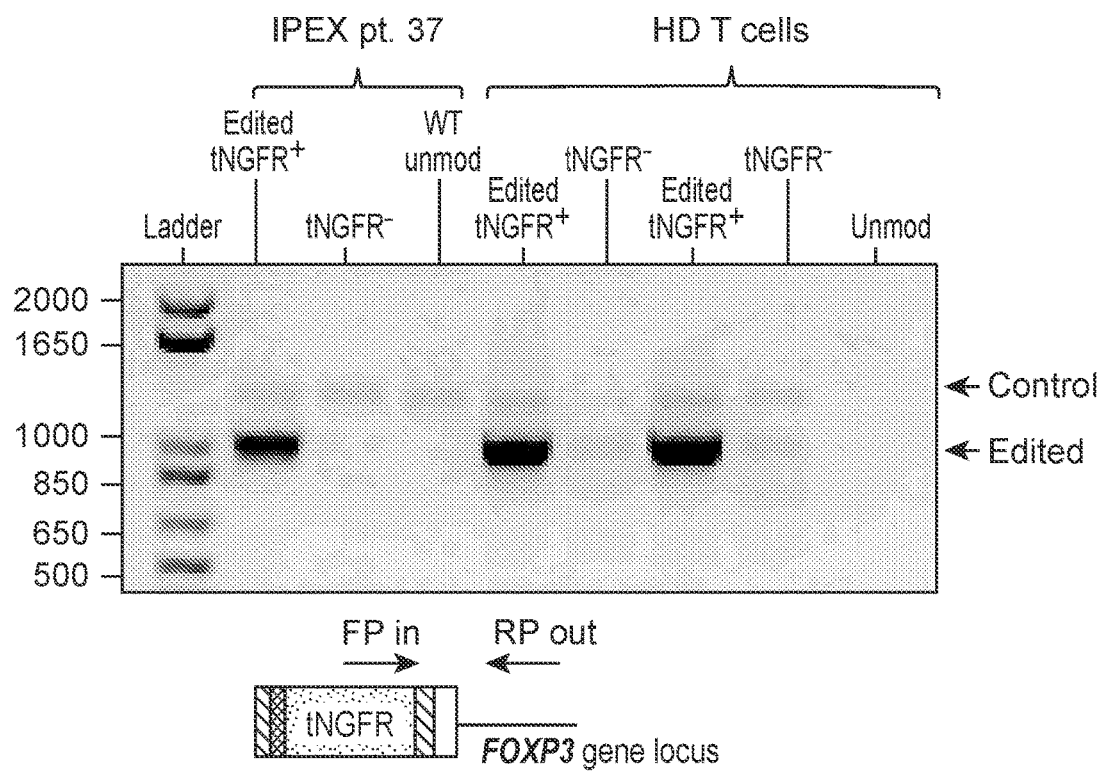

FIG. 5 (Cont.)
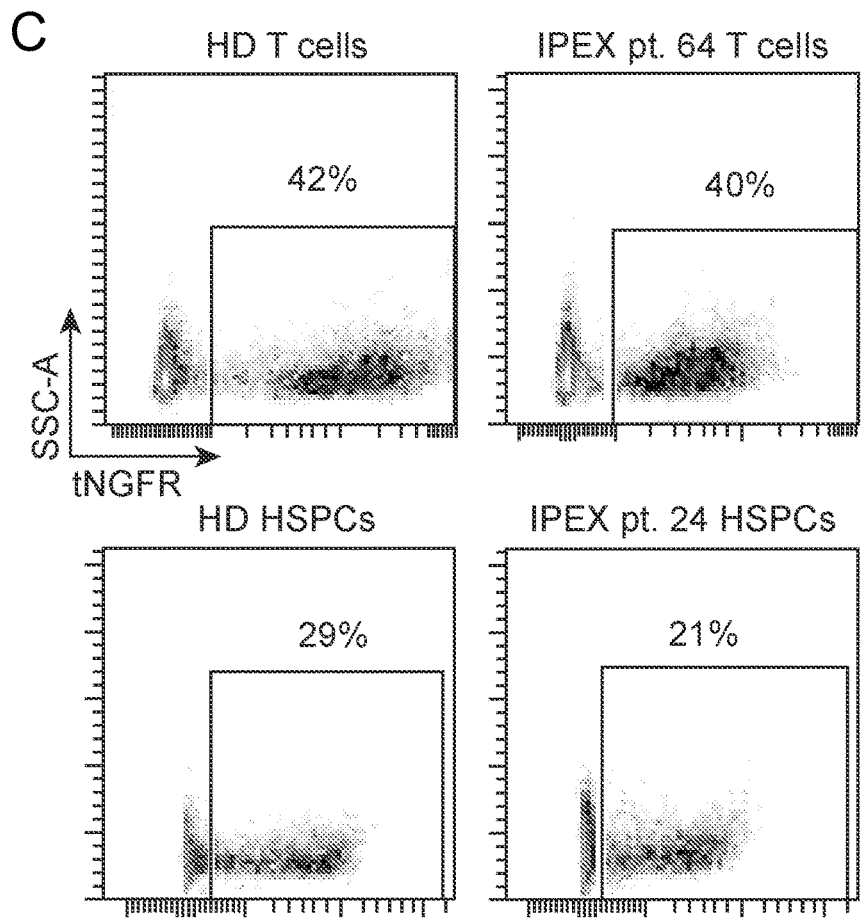
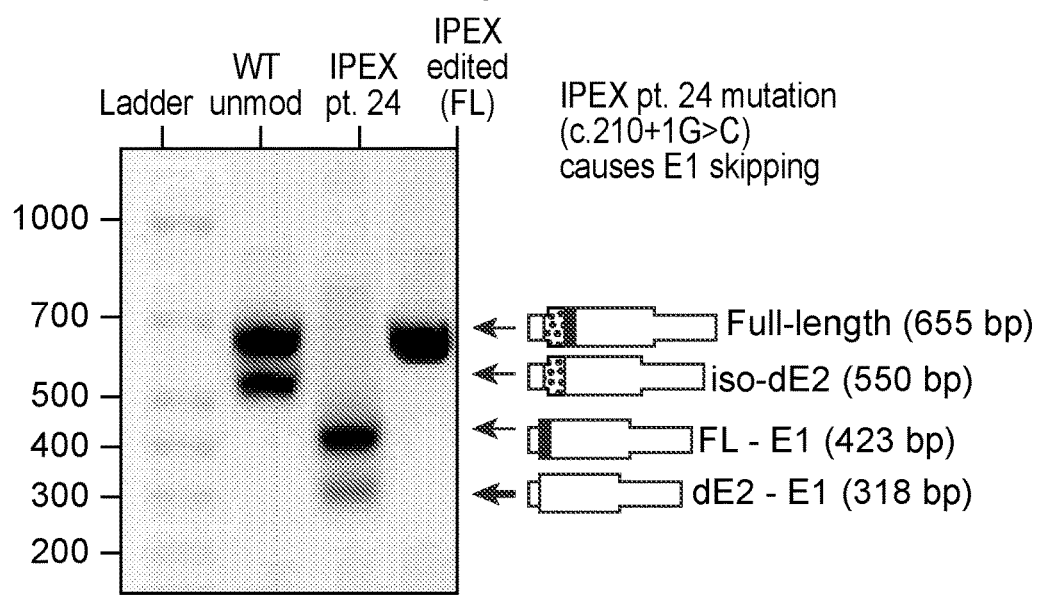

FIG. 5 (Cont.)
F (Cont.)
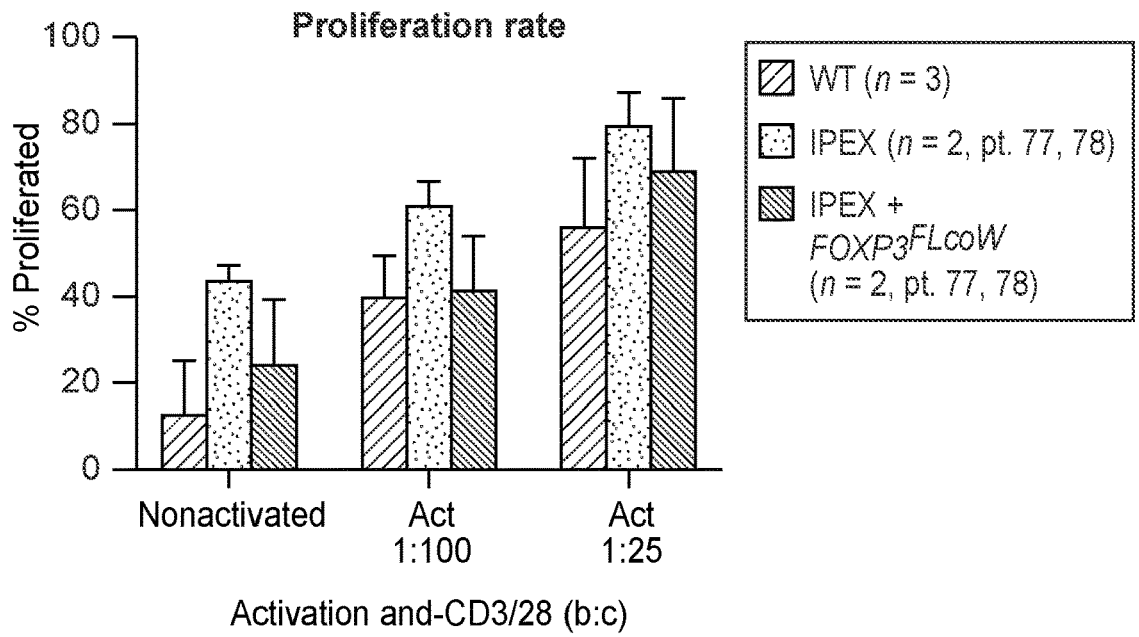
G
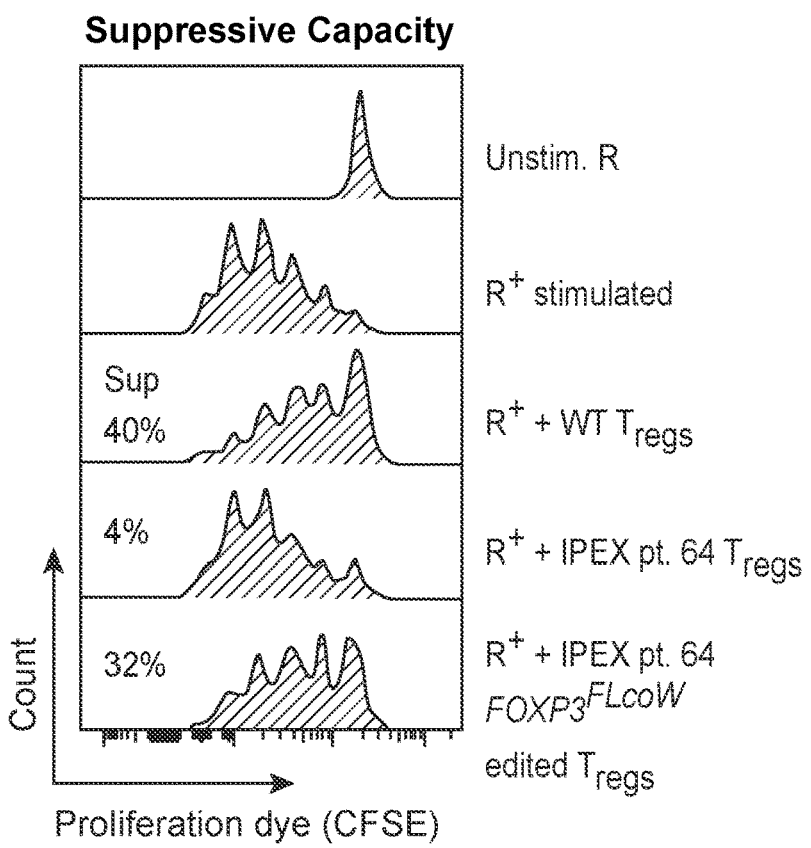

FIG. 6
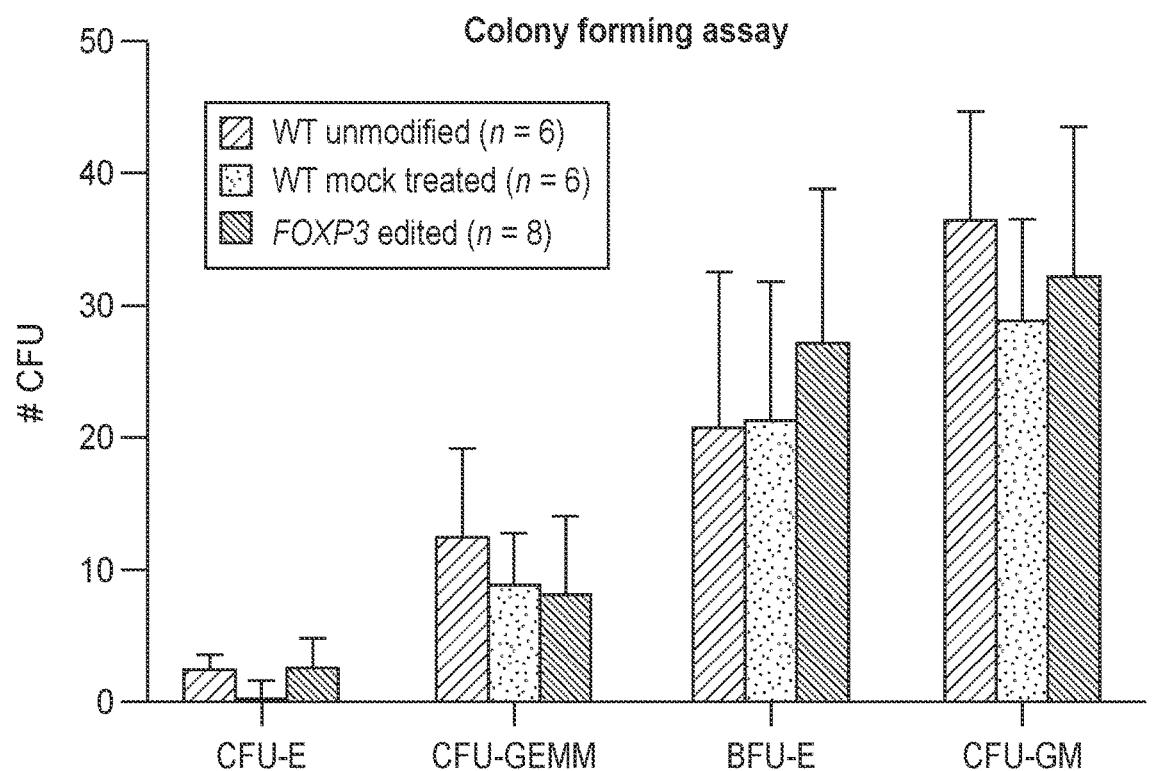
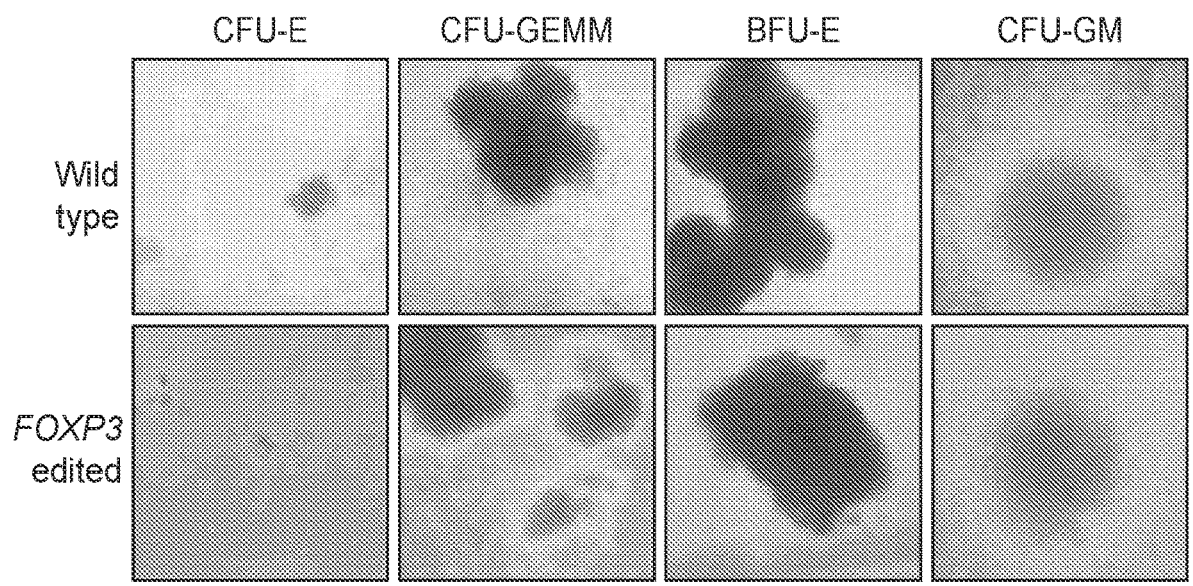

FIG. 6 (Cont.)
B
Experimental timeline of in vivo engraftment study
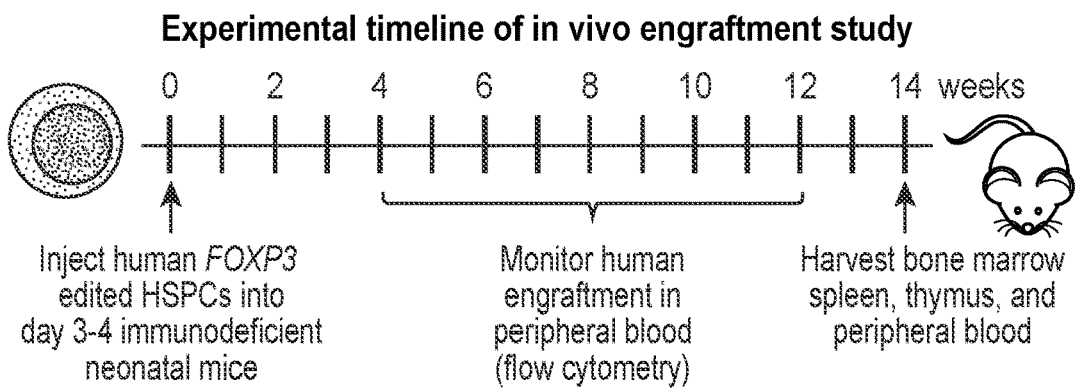
C
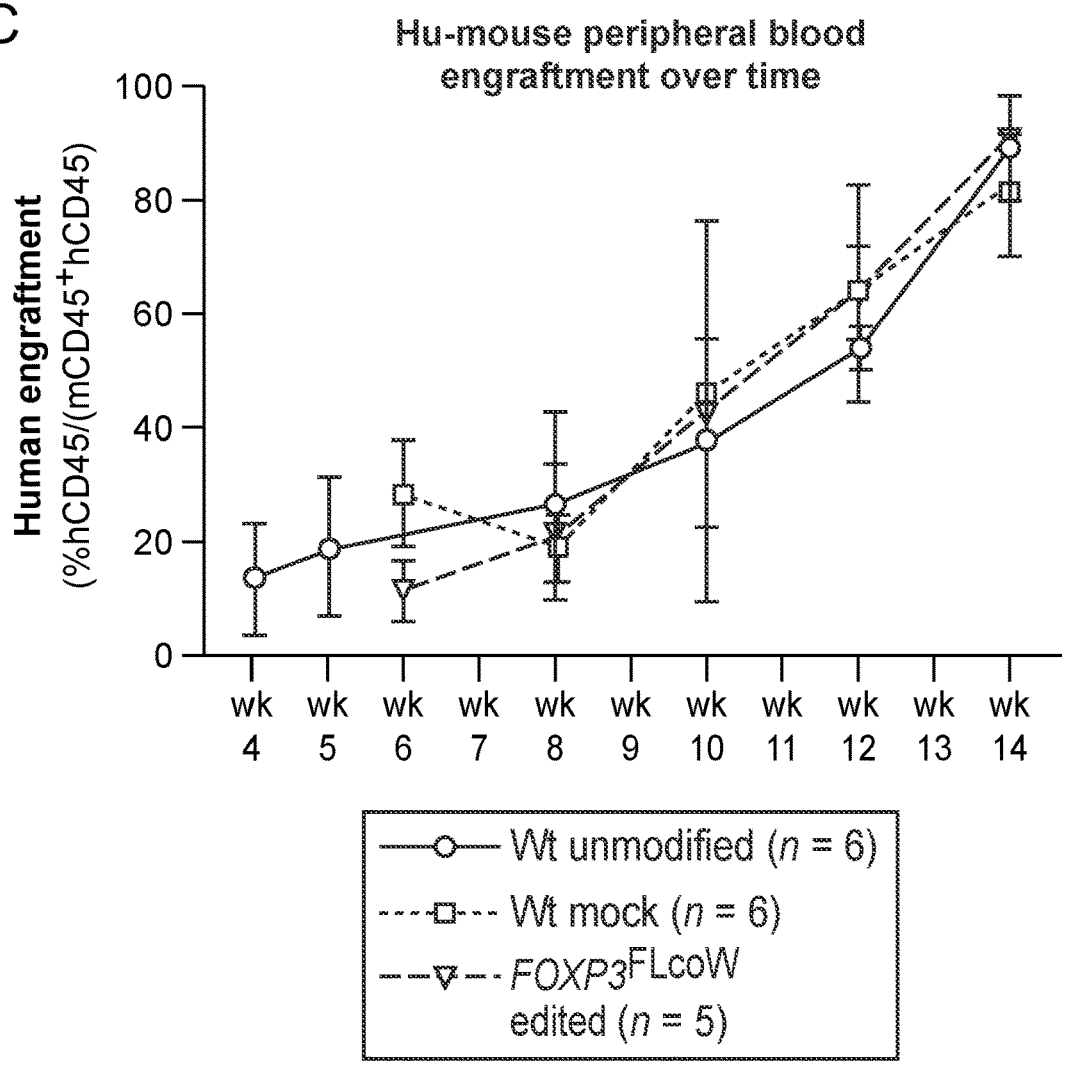

D (Cont.)

FIG. 6 (Cont.)
E
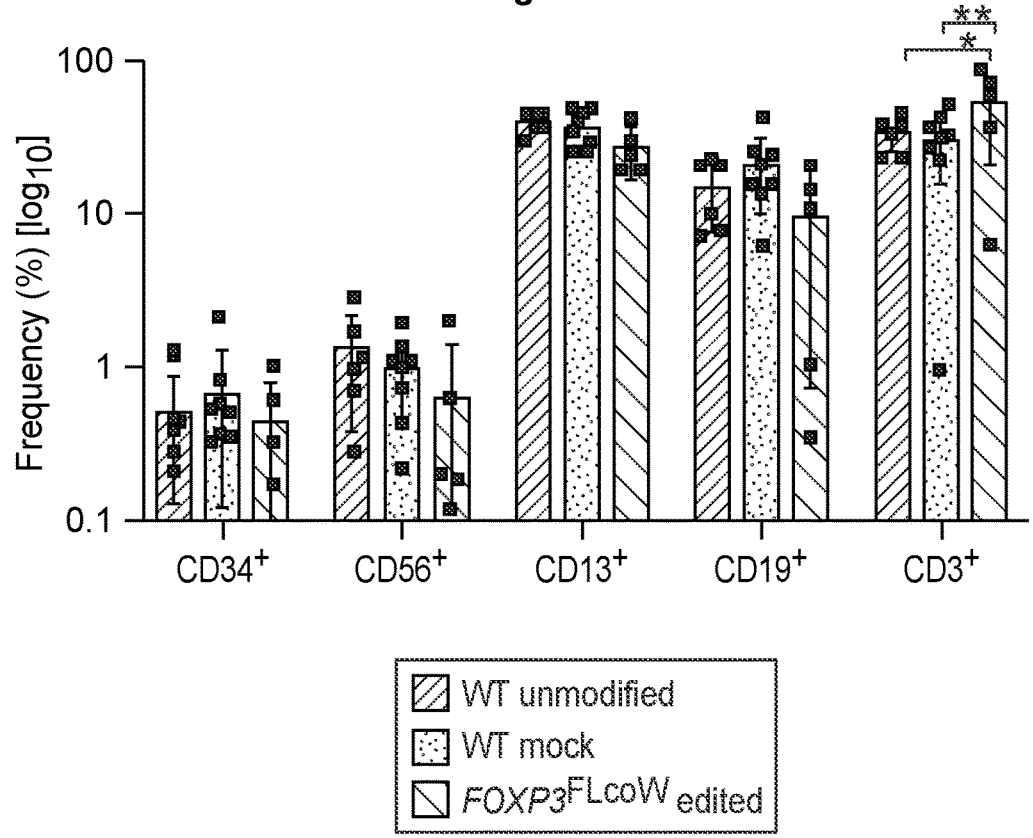
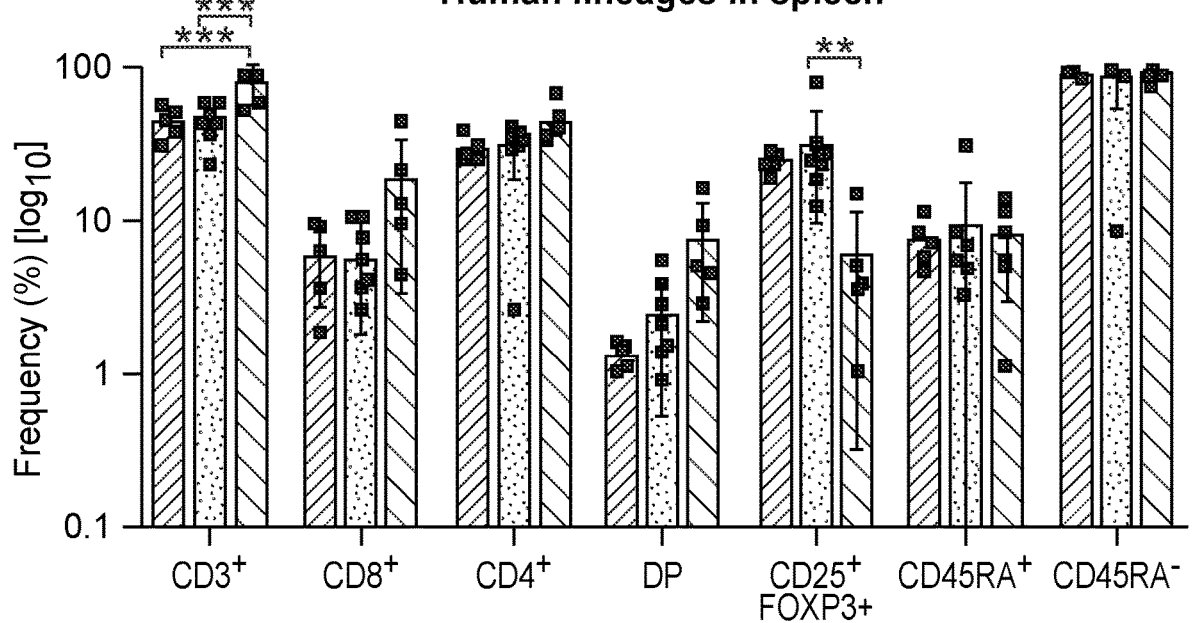

FIG. 7
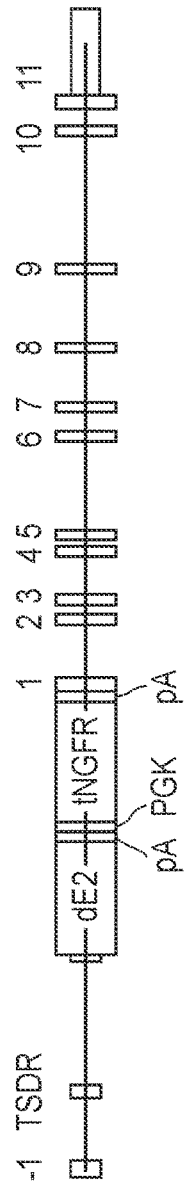
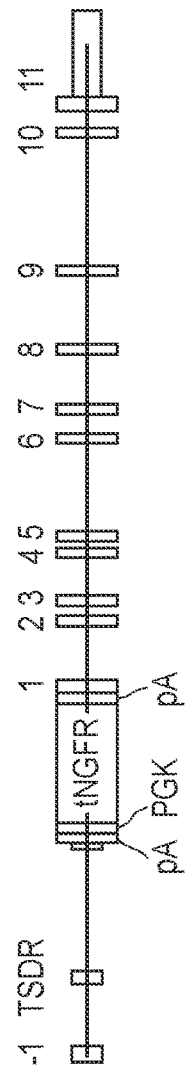

FIG. 8
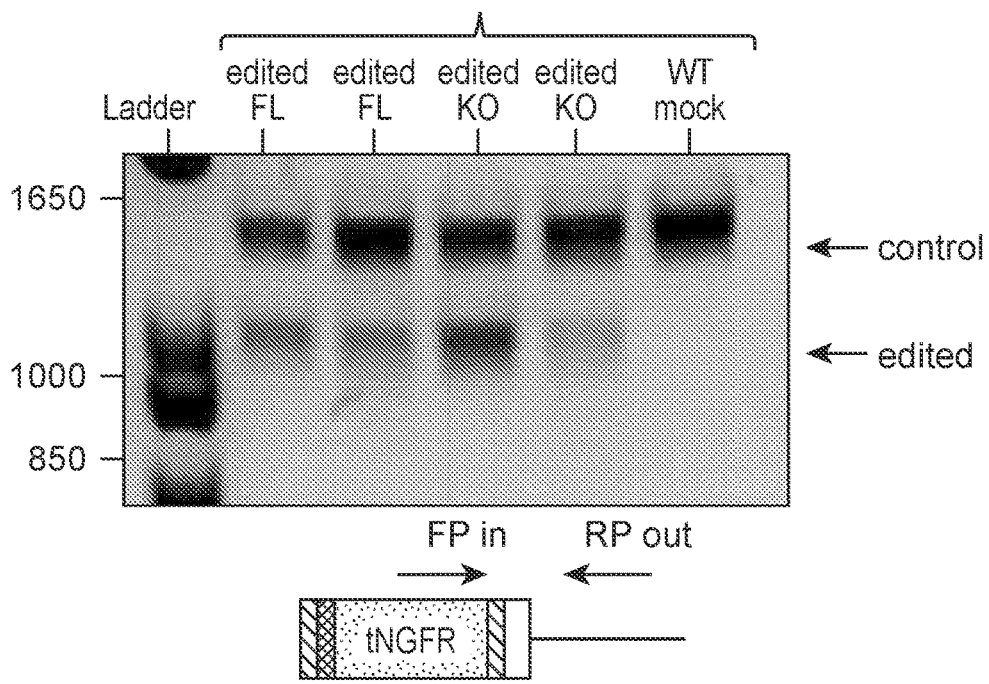
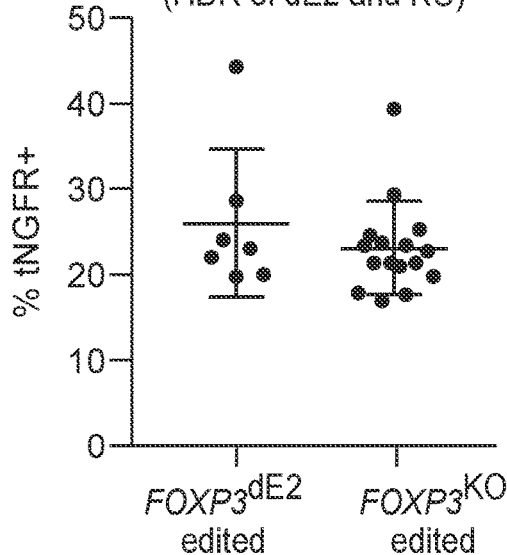
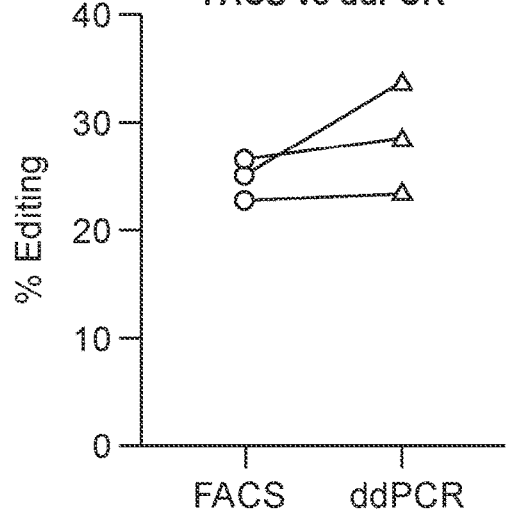

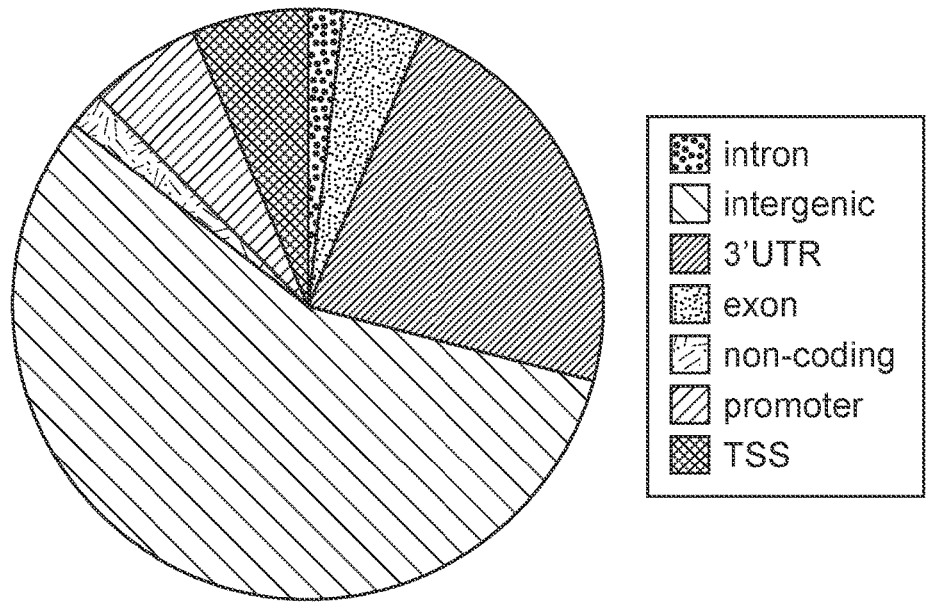

Off-targets in *silico* prediction
COSMID - gene region

- intron
- intergenic
- 3'UTR
- exon
- non-coding
- promoter
- TSS

F

GUIDE-seq predicted off-targets in U2OS cells

| | 1 | | | | | | | | | 10 | | | | | | | | | | 20 | | | 23 | |
|---|---|---|---|---|---|---|---|---|---|---|---|---|---|---|---|---|---|---|---|---|---|---|---|---|
| sgRNA | A | G | G | A | C | C | G | A | T | G | C | C | C | A | A | C | C | C | C | N | G | G | | |
| Closest Gene | | | | | | | | | | | | | | | | | | | | | | | | Reads |
| FOXP3 | · | · | · | · | · | · | · | · | · | · | · | · | · | · | · | · | · | · | · | · | · | · | | 2155 |
| ZNF311 | · | · | · | · | · | · | · | A | · | · | · | · | · | · | · | · | · | · | A | · | · | · | | 762 |
| LINC02070 | · | · | · | · | · | · | T | T | A | · | · | T | · | · | · | · | · | · | · | · | · | · | | 132 |
| IPO8 | · | · | · | · | · | · | · | — | · | G | A | · | · | · | · | · | · | · | · | · | · | · | | 83 |
| LOC101927131 | · | · | C | · | · | · | · | · | · | · | C | C | · | · | · | · | · | · | · | · | · | · | | 57 |
| SLC7A4 | · | A | · | · | · | · | · | · | · | A | · | · | · | · | · | · | G | · | · | · | · | · | | 54 |
| ARPIN | T | · | · | C | A | · | · | · | · | · | · | · | · | · | · | · | · | · | · | · | · | · | | 48 |
| MAP3K14-AS1 | · | · | · | · | · | A | · | · | A | · | · | · | · | · | · | · | G | · | · | · | · | · | | 27 |
| EXOC3L2 | · | · | · | C | · | T | · | · | · | · | · | · | · | · | · | · | · | · | · | A | · | · | | 20 |
| KIF1A | · | · | · | · | · | · | C | — | · | · | · | · | · | · | · | · | · | · | · | · | · | · | | 8 |
| SORBS3 | · | · | G | A | T | · | C | G | · | · | · | · | · | · | · | · | · | · | · | · | · | · | | 3 |

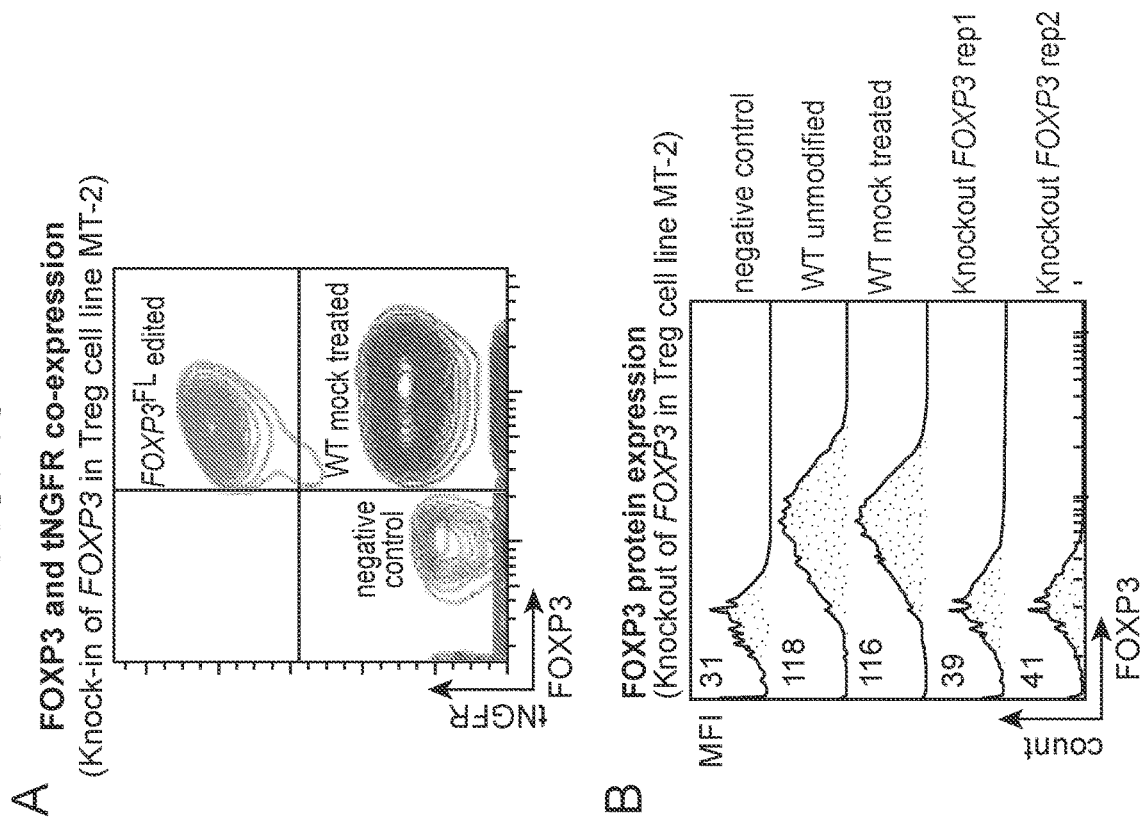
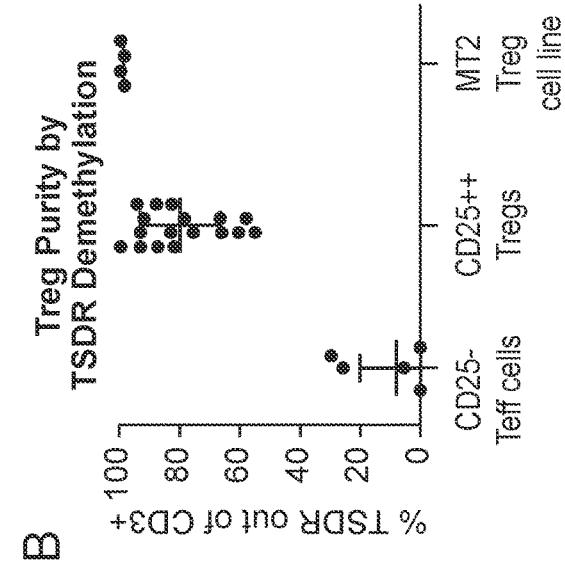

FIG. 11
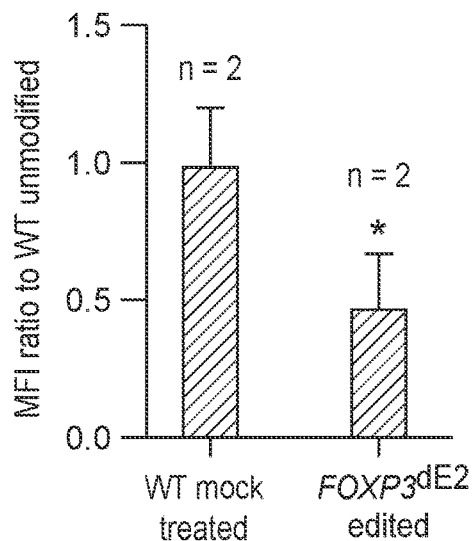
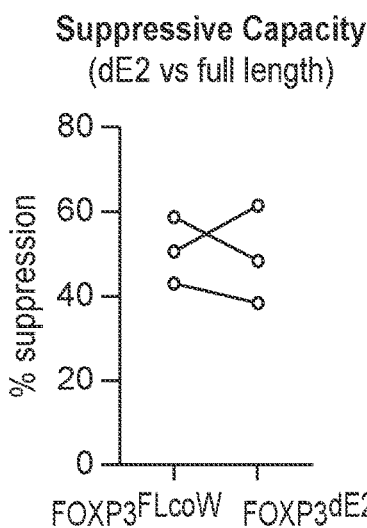
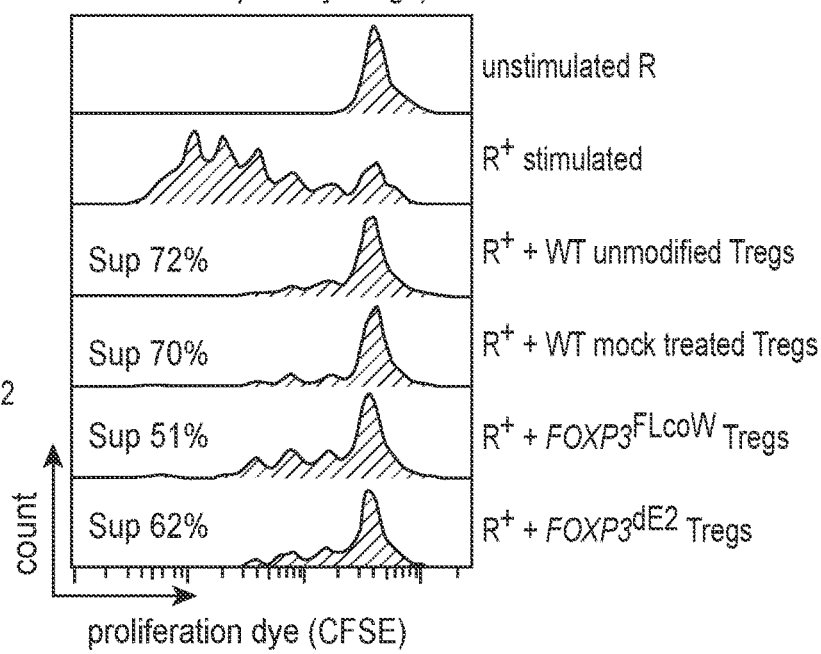

C

Suppressive Capacity
(FL vs FLcoW isoform in edited primary Tregs)

FIG. 13 (Cont.)
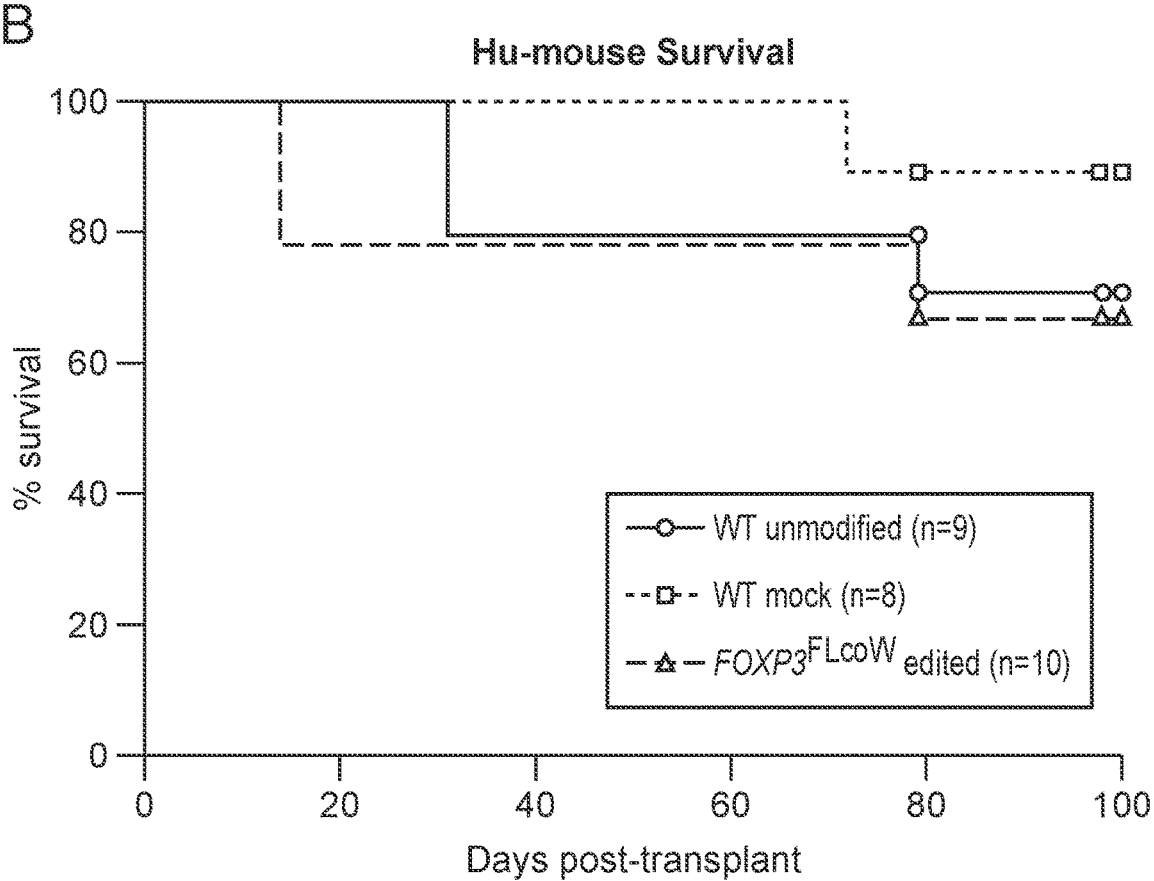
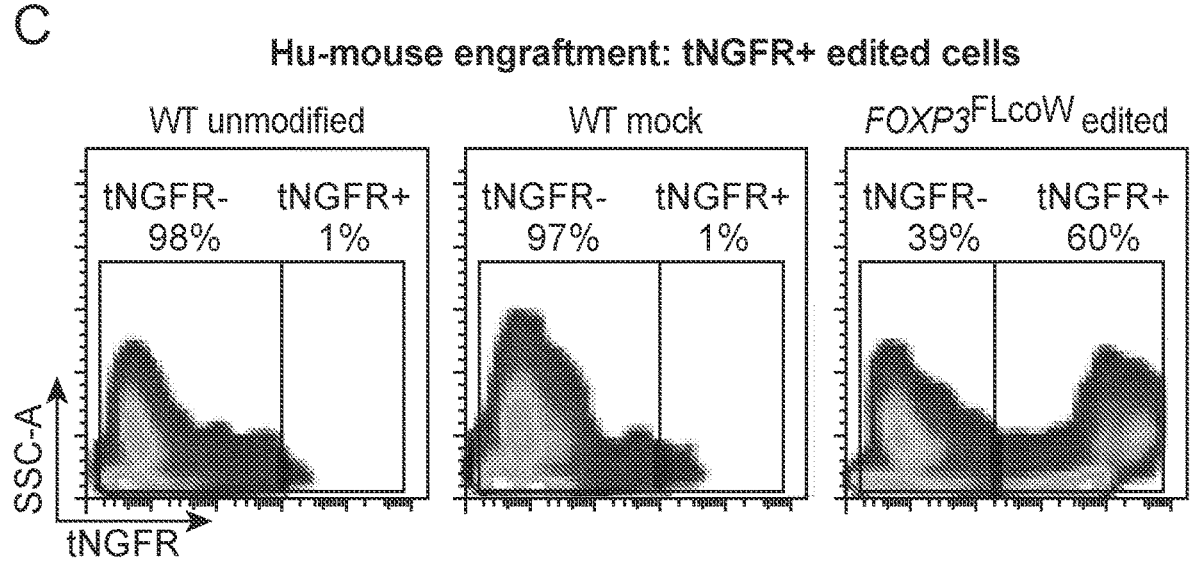

FIG. 13 (Cont.)
F
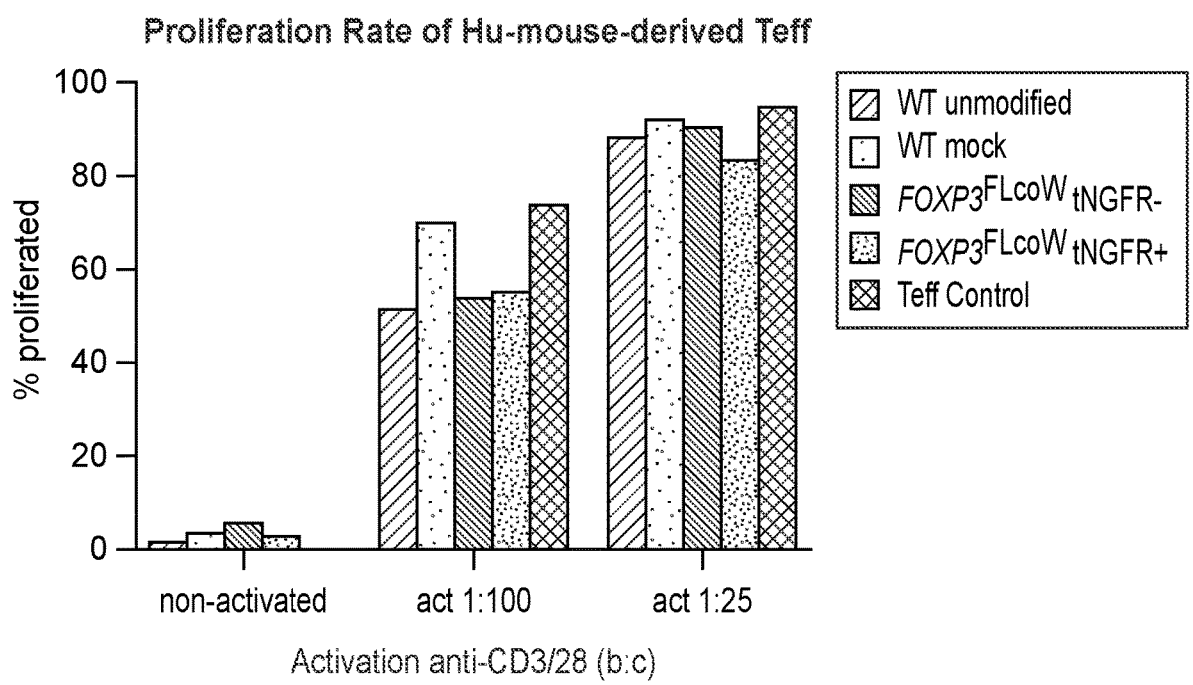
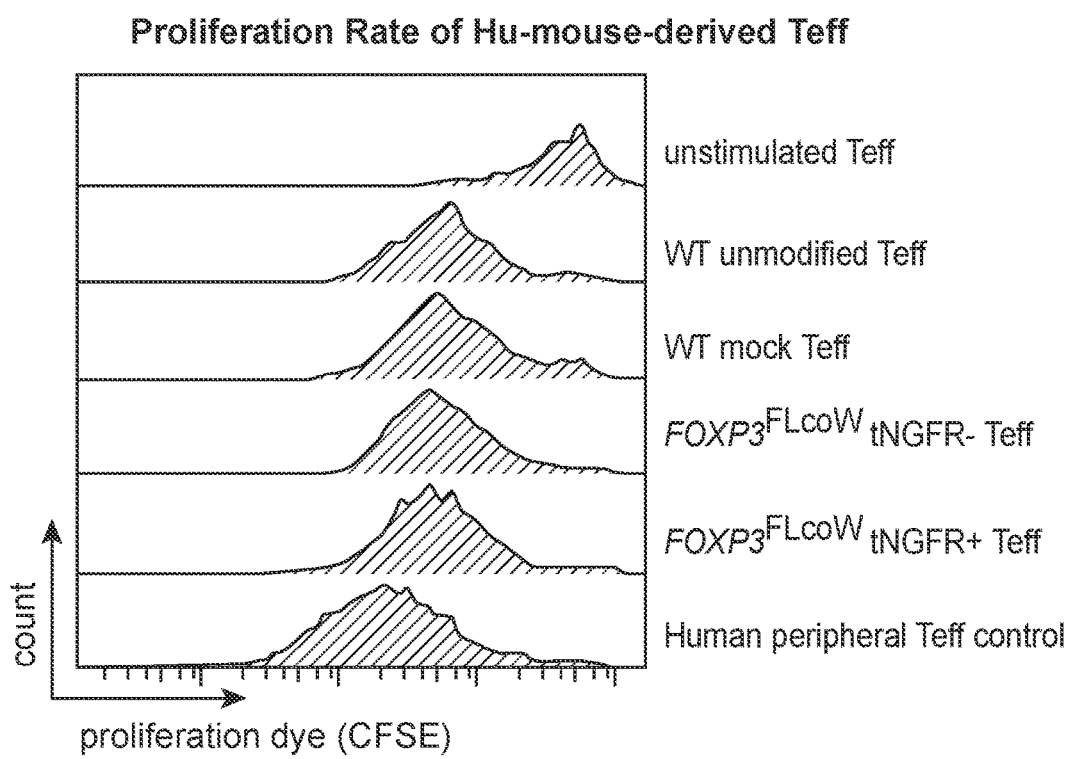

FIG. 13 (Cont.)
G
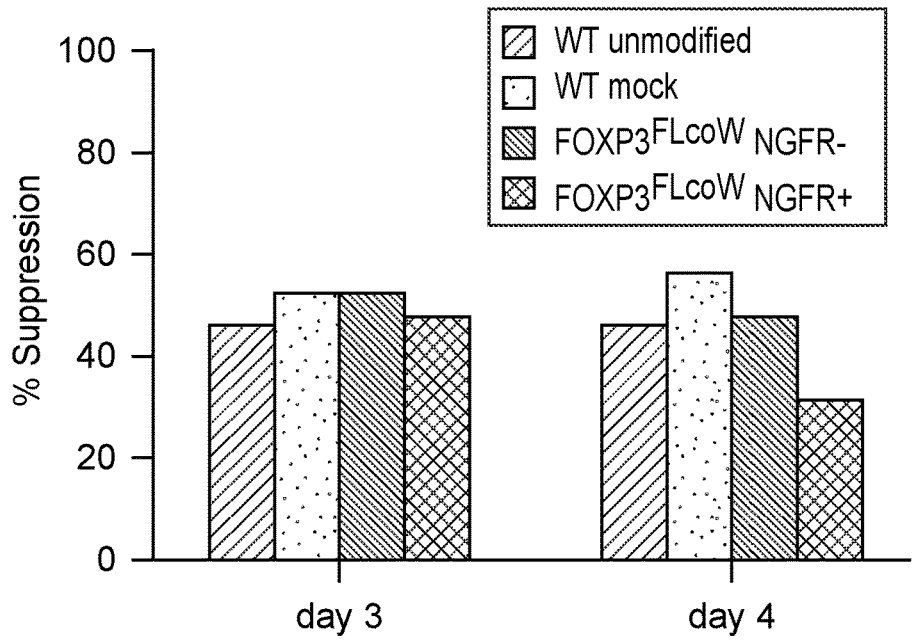
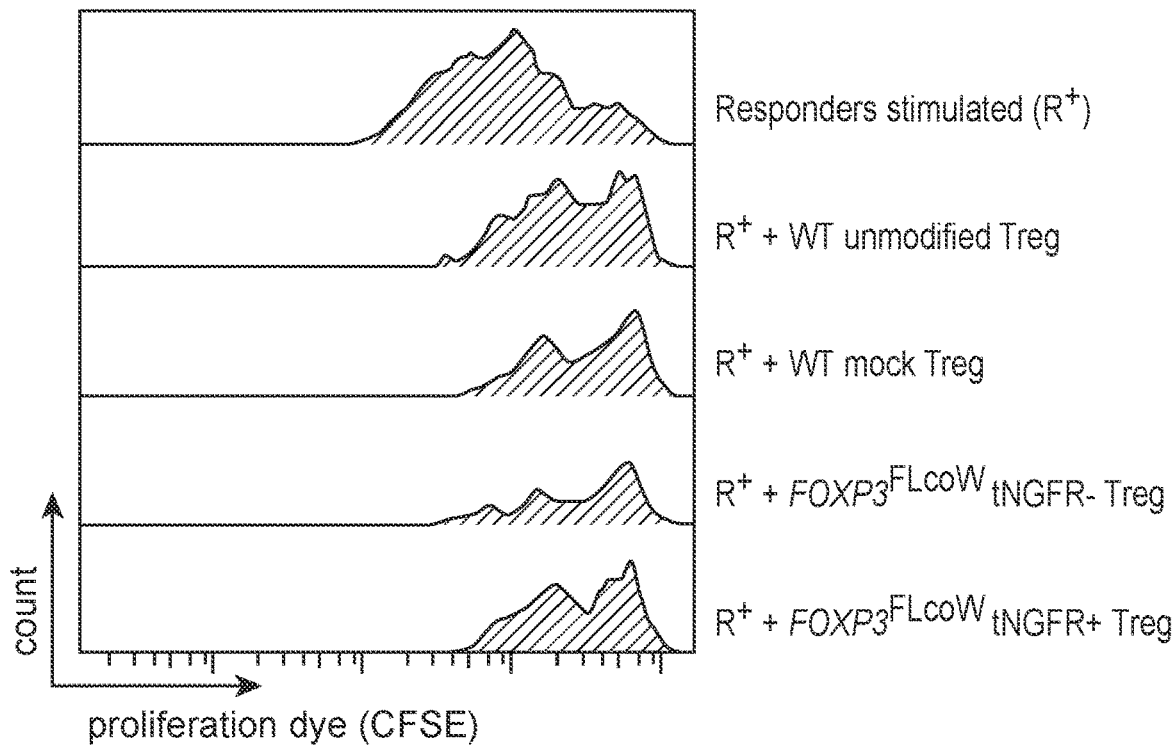

SEQUENCE LISTING

<160> NUMBER OF SEQ ID NOS: 71

<210> SEQ ID NO 1
<211> LENGTH: 431
<212> TYPE: PRT
<213> ORGANISM: Homo sapiens

<400> SEQUENCE: 1

```
Met Pro Asn Pro Arg Pro Gly Lys Pro Ser Ala Pro Ser Leu Ala Leu
 1               5                  10                  15

Gly Pro Ser Pro Gly Ala Ser Pro Ser Trp Arg Ala Ala Pro Lys Ala
             20                  25                  30

Ser Asp Leu Leu Gly Ala Arg Gly Pro Gly Gly Thr Phe Gln Gly Arg
         35                  40                  45

Asp Leu Arg Gly Gly Ala His Ala Ser Ser Ser Leu Asn Pro Met
     50                  55                  60

Pro Pro Ser Gln Leu Gln Leu Pro Thr Leu Pro Leu Val Met Val Ala
 65                  70                  75                  80

Pro Ser Gly Ala Arg Leu Gly Pro Leu Pro His Leu Gln Ala Leu Leu
                 85                  90                  95

Gln Asp Arg Pro His Phe Met His Gln Leu Ser Thr Val Asp Ala His
             100                 105                 110

Ala Arg Thr Pro Val Leu Gln Val His Pro Leu Glu Ser Pro Ala Met
         115                 120                 125

Ile Ser Leu Thr Pro Pro Thr Thr Ala Thr Gly Val Phe Ser Leu Lys
    130                 135                 140

Ala Arg Pro Gly Leu Pro Pro Gly Ile Asn Val Ala Ser Leu Glu Trp
145                 150                 155                 160

Val Ser Arg Glu Pro Ala Leu Leu Cys Thr Phe Pro Asn Pro Ser Ala
                165                 170                 175

Pro Arg Lys Asp Ser Thr Leu Ser Ala Val Pro Gln Ser Ser Tyr Pro
            180                 185                 190

Leu Leu Ala Asn Gly Val Cys Lys Trp Pro Gly Cys Glu Lys Val Phe
        195                 200                 205

Glu Glu Pro Glu Asp Phe Leu Lys His Cys Gln Ala Asp His Leu Leu
    210                 215                 220

Asp Glu Lys Gly Arg Ala Gln Cys Leu Leu Gln Arg Glu Met Val Gln
225                 230                 235                 240

Ser Leu Glu Gln Gln Leu Val Leu Glu Lys Glu Lys Leu Ser Ala Met
                245                 250                 255

Gln Ala His Leu Ala Gly Lys Met Ala Leu Thr Lys Ala Ser Ser Val
            260                 265                 270

Ala Ser Ser Asp Lys Gly Ser Cys Cys Ile Val Ala Ala Gly Ser Gln
        275                 280                 285

Gly Pro Val Val Pro Ala Trp Ser Gly Pro Arg Glu Ala Pro Asp Ser
    290                 295                 300

Leu Phe Ala Val Arg Arg His Leu Trp Gly Ser His Gly Asn Ser Thr
305                 310                 315                 320

Phe Pro Glu Phe Leu His Asn Met Asp Tyr Phe Lys Phe His Asn Met
                325                 330                 335

Arg Pro Pro Phe Thr Tyr Ala Thr Leu Ile Arg Trp Ala Ile Leu Glu
            340                 345                 350

Ala Pro Glu Lys Gln Arg Thr Leu Asn Glu Ile Tyr His Trp Phe Thr
        355                 360                 365
```

```
Arg Met Phe Ala Phe Phe Arg Asn His Pro Ala Thr Trp Lys Asn Ala
    370                 375                 380

Ile Arg His Asn Leu Ser Leu His Lys Cys Phe Val Arg Val Glu Ser
385                 390                 395                 400

Glu Lys Gly Ala Val Trp Thr Val Asp Glu Leu Glu Phe Arg Lys Lys
                405                 410                 415

Arg Ser Gln Arg Pro Ser Arg Cys Ser Asn Pro Thr Pro Gly Pro
            420                 425                 430

<210> SEQ ID NO 2
<211> LENGTH: 396
<212> TYPE: PRT
<213> ORGANISM: Homo sapiens

<400> SEQUENCE: 2

Met Pro Asn Pro Arg Pro Gly Lys Pro Ser Ala Pro Ser Leu Ala Leu
1               5                   10                  15

Gly Pro Ser Pro Gly Ala Ser Pro Ser Trp Arg Ala Ala Pro Lys Ala
            20                  25                  30

Ser Asp Leu Leu Gly Ala Arg Gly Pro Gly Gly Thr Phe Gln Gly Arg
        35                  40                  45

Asp Leu Arg Gly Gly Ala His Ala Ser Ser Ser Leu Asn Pro Met
    50                  55                  60

Pro Pro Ser Gln Leu Gln Leu Ser Thr Val Asp Ala His Ala Arg Thr
65                  70                  75                  80

Pro Val Leu Gln Val His Pro Leu Glu Ser Pro Ala Met Ile Ser Leu
                85                  90                  95

Thr Pro Pro Thr Thr Ala Thr Gly Val Phe Ser Leu Lys Ala Arg Pro
            100                 105                 110

Gly Leu Pro Pro Gly Ile Asn Val Ala Ser Leu Glu Trp Val Ser Arg
        115                 120                 125

Glu Pro Ala Leu Leu Cys Thr Phe Pro Asn Pro Ser Ala Pro Arg Lys
    130                 135                 140

Asp Ser Thr Leu Ser Ala Val Pro Gln Ser Ser Tyr Pro Leu Leu Ala
145                 150                 155                 160

Asn Gly Val Cys Lys Trp Pro Gly Cys Glu Lys Val Phe Glu Glu Pro
                165                 170                 175

Glu Asp Phe Leu Lys His Cys Gln Ala Asp His Leu Leu Asp Glu Lys
            180                 185                 190

Gly Arg Ala Gln Cys Leu Leu Gln Arg Glu Met Val Gln Ser Leu Glu
        195                 200                 205

Gln Gln Leu Val Leu Glu Lys Glu Lys Leu Ser Ala Met Gln Ala His
    210                 215                 220

Leu Ala Gly Lys Met Ala Leu Thr Lys Ala Ser Ser Val Ala Ser Ser
225                 230                 235                 240

Asp Lys Gly Ser Cys Cys Ile Val Ala Ala Gly Ser Gln Gly Pro Val
                245                 250                 255

Val Pro Ala Trp Ser Gly Pro Arg Glu Ala Pro Asp Ser Leu Phe Ala
            260                 265                 270

Val Arg Arg His Leu Trp Gly Ser His Gly Asn Ser Thr Phe Pro Glu
        275                 280                 285

Phe Leu His Asn Met Asp Tyr Phe Lys Phe His Asn Met Arg Pro Pro
    290                 295                 300

Phe Thr Tyr Ala Thr Leu Ile Arg Trp Ala Ile Leu Glu Ala Pro Glu
305                 310                 315                 320
```

```
Lys Gln Arg Thr Leu Asn Glu Ile Tyr His Trp Phe Thr Arg Met Phe
            325                 330                 335

Ala Phe Phe Arg Asn His Pro Ala Thr Trp Lys Asn Ala Ile Arg His
        340                 345                 350

Asn Leu Ser Leu His Lys Cys Phe Val Arg Val Glu Ser Glu Lys Gly
        355                 360                 365

Ala Val Trp Thr Val Asp Glu Leu Glu Phe Arg Lys Lys Arg Ser Gln
        370                 375                 380

Arg Pro Ser Arg Cys Ser Asn Pro Thr Pro Gly Pro
385                 390                 395

<210> SEQ ID NO 3
<211> LENGTH: 4386
<212> TYPE: DNA
<213> ORGANISM: Artificial sequence
<220> FEATURE:
<223> OTHER INFORMATION: synthetic polynucleotide

<400> SEQUENCE: 3
gcggccgcat taagtctcag aatctaccca cttctcgcct tctccactgc caccagccca      60
ttctgtgcca gcatcatcac ttgccaggac tgttacaata gcctcctcac tagccccact     120
cacagcagcc agatgaatct tttgagtcca tgcctagtca ctgggcaaa ataggactcc      180
gaggagaaag tccgagacca gctccggcaa gatgagcaaa cacagcctgt gcagggtgca     240
gggagggcta gaggcctgag gcttgaaaca gctctcaagt ggagggggaa caaccattg      300
ccctcataga ggacacatcc acaccagggc tgtgctagcg tgggcaggca agccaggtgc     360
tggacctctg cacgtggggc atgtgtgggt atgtacatgt acctgtgttc ttggtgtgtg     420
tgtgtgtgtg tgtgtgtgtg tgtgtctaga gctggggtgc aactatgggg ccctcgggga     480
catgtcccag ccaatgcctg ctttgaccag aggagtgtcc acgtggctca ggtggtcgag     540
tatctcatac cgcccagca cacgtgtgac tcctttcccc tattgtctac gcagcctgcc     600
cttggacaag gacccgatgc ccaaccctcg cccaggaaaa cctagcgcac ctagcctcgc     660
tctgggggcct tctcctggag caagcccag ttggcgcgct gcacccaagg cttctgacct     720
tctcggtgcc cgaggccccg gcgggacttt tcagggcaga gatctcagag gcggcgcgca     780
cgccagcagc agttccctta atcctatgcc accctcccag ctgcaactgc caaccctgcc     840
tctggtgatg gtggccccca gcggagcccg gttgggacca ctgccacacc tgcaggccct     900
gctgcaggat cgccctcatt tcatgcacca gctgtctaca gtcgatgccc acgcccggac     960
cccagttctc caggtgcacc ccctggaatc tccggccatg ataagcctca ccccaccaac    1020
cacagcaact ggtgtctttt ctcttaaagc gcgcccaggc ctgcccctg gtatcaacgt     1080
ggctagcctg gaatgggtga gcagagagcc agcccttttg tgtacctttc ccaatcctag    1140
cgcgcctagg aaggactcta cactgtcagc tgttccacag tctagctatc cccttctggc    1200
caatggcgtc tgcaaatggc cagggtgtga gaaggtcttt gaagagccag aagatttcct    1260
gaaacactgt caagcagacc acttgttgga cgagaagggt cgcgcgcagt gccttctgca    1320
aagagagatg gtgcagtcac tggagcagca gctggtgctg gagaaggaga agctgtcagc    1380
tatgcaggca cacctggcag gaaaaatggc tctcaccaaa gcctcttccg tagccagctc    1440
agacaaggga agctgttgta ttgtcgccgc tggctctcag gggcctgttg tgccagcctg    1500
gagtggacct cgggaggcac cggacagcct gttcgccgtg cggagacacc tttgggctc    1560
tcacggaaac tctaccttcc ctgaattcct tcataatatg gattacttca aattccacaa    1620
```

```
catgaggcct cctttacgt acgcgacgct gatccggtgg gccattctgg aggcacctga    1680
gaagcaaaga actctcaatg aaatctatca ctggttcaca agaatgttcg cattttccg     1740
caaccaccct gccacctgga agaacgctat tcggcacaat ctttccctgc acaagtgctt    1800
cgtccgcgtt gagagcgaga aaggcgccgt ctggacagtc gacgaactcg aatttagaaa    1860
aaaacggtca caaagaccaa gccgctgcag caatcccacg ccgggaccct gaagcctcga    1920
ctgtgccttc tagttgccag ccatctgttg tttgccctc cccgtgcct tccttgaccc      1980
tggaaggtgc cactcccact gtcctttcct aataaaatga ggaaattgca tcgcattgtc    2040
tgagtaggtg tcattctatt ctgggggtg gggtggggca ggacagcaag ggggaggatt     2100
gggaagacaa tagcaggcat gctggggatg cggtgggctg aattcccacg gggttggggt    2160
tgcgcctttt ccaaggcagc cctgggttg cgcaggacg cggctgctct gggcgtggtt     2220
ccgggaaacg cagcggcgcc gaccctgggt ctcgcacatt cttcacgtcc gttcgcagcg    2280
tcacccggat cttcgccgct acccttgtgg gcccccgc gacgcttcct gctccgcccc    2340
taagtcggga aggttccttg cggttcgcgg cgtgccggac gtgacaaacg gaagccgcac    2400
gtctcactag taccctcgca gacggacagc gccaggagc aatggcagcg cgccgaccgc    2460
gatgggctgt ggccaatagc ggctgctcag cggggcgcgc cgagagcagc ggccgggaag    2520
gggcggtgcg ggaggcgggg tgtgggcgg tagtgtgggc cctgttcctg cccgcgcggt    2580
gttccgcatt ctgcaagcct ccggagcgca cgtcggcagt cggctccctc gttgaccgaa    2640
tcaccgacct ctctcccag atgggggcag gtgccaccgg ccgcgccatg gacgggccgc    2700
gcctgctgct gttgctgctt ctgggggtgt cccttggagg tgccaaggag gcatgcccca    2760
caggcctgta cacacacagc ggtgagtgct gcaaagcctg caacctgggc gagggtgtgg    2820
cccagccttg tggagccaac cagaccgtgt gtgagccctg cctggacagc gtgacgttct    2880
ccgacgtggt gagcgcgacc gagccgtgca agccgtgcac cgagtgcgtg ggctccagc    2940
gcatgtcggc gccgtgcgtg gaggccgacg acgccgtgtg ccgctgcgcc tacggctact    3000
accaggatga gacgactggg cgctgcgagg cgtgccgcgt gtgcgaggcg gctcgggcc   3060
tcgtgttctc ctgccaggac aagcagaaca ccgtgtgcga ggagtgcccc gacggcacgt    3120
attccgacga ggccaaccac gtggacccgt gcctgccctg caccgtgtgc gaggacaccg    3180
agcgccagct ccgcgagtgc acacgctggg ccgacgccga gtgcgaggag atccctggcc    3240
gttggattac acgtccaca cccccagagg gctcggacag cacagccccc agcacccagg    3300
agcctgaggc acctccagaa caagacctca tagccagcac ggtggcaggt gtggtgacca    3360
cagtgatggg cagctcccag cccgtggtga cccgaggcac caccgacaac ctcatccctg    3420
tctattgctc catcctggct gctgtggttg tgggccttgt ggcctacata gccttcaaga    3480
ggtggaacag ggggatcctc tagagcctcg actgtgcctt ctagttgcca gccatctgtt    3540
gtttgcccct ccccgtgcc ttccttgacc ctggaaggtg ccactcccac tgtcctttcc    3600
taataaaatg aggaaattgc atcgcattgt ctgagtaggt gtcattctat tctgggggt    3660
ggggtgggc aggacagcaa ggggaggat tgggaagaca atagcaggca tgctggggat    3720
gcggtgggct cccagggctg gcaagccctc ggcccttcc ttggccttg gcccatccc      3780
acgagcctcg cccagctgga gggctgcacc caaagcctca gacctgctgg gcccgggg    3840
cccagggga accttccagg gccgagatct tcgaggcggg gccatgcct cctcttcttc     3900
cttgaacccc atgccaccat cgcagctgca ggtgaggccc tgggcccagg atggggcagg  3960
```

| | |
|---|---:|
| cagggtgggg tacctggacc tacaggtgcc gacctttact gtggcactgg gcgggagggg | 4020 |
| ggctggctgg ggcacaggaa gtggtttctg ggtcccaggc aagtctgtga cttatgcaga | 4080 |
| tgttgcaggg ccaagaaaat ccccacctgc caggcctcag agattggagg ctctccccga | 4140 |
| cctcccaatc cctgtctcag gagaggagga ggccgtattg tagtcccatg agcatagcta | 4200 |
| tgtgtcccca tccccatgtg acaagagaag aggactgggg ccaagtaggt gaggtgacag | 4260 |
| ggctgaggcc agctctgcaa cttattagct gtttgatctt taaaaagtta ctcgatctcc | 4320 |
| atgagcctca gtttccatac gtgtaaaagg gggatgatca tagcatctac catgtggggc | 4380 |
| ggccgc | 4386 |

```
<210> SEQ ID NO 4
<211> LENGTH: 4267
<212> TYPE: DNA
<213> ORGANISM: Artificial sequence
<220> FEATURE:
<223> OTHER INFORMATION: synthetic polynucleotide

<400> SEQUENCE: 4
```

| | |
|---|---:|
| gcggccgcat taagtctcag aatctaccca cttctcgcct tctccactgc caccagccca | 60 |
| ttctgtgcca gcatcatcac ttgccaggac tgttacaata gcctcctcac tagccccact | 120 |
| cacagcagcc agatgaatct tttgagtcca tgcctagtca ctgggcaaa ataggactcc | 180 |
| gaggagaaag tccgagacca gctccggcaa gatgagcaaa cacagcctgt gcagggtgca | 240 |
| ggagggcta gaggcctgag gcttgaaaca gctctcaagt ggaggggaa acaaccattg | 300 |
| ccctcataga ggacacatcc acaccagggc tgtgctagcg tgggcaggca agccaggtgc | 360 |
| tggacctctg cacgtggggc atgtgtgggt atgtacatgt acctgtgttc ttggtgtgtg | 420 |
| tgtgtgtgtg tgtgtgtgtg tgtgtctaga gctggggtgc aactatgggg cccctcggga | 480 |
| catgtcccag ccaatgcctg cttttgaccag aggagtgtcc acgtggctca ggtggtcgag | 540 |
| tatctcatac cgcccctagca cacgtgtgac tcctttcccc tattgtctac gcagcctgcc | 600 |
| cttggacaag gacccgatgc ccaaccctcg cccaggaaaa cctagcgcac ctagcctcgc | 660 |
| tctgggccct tctcctggag caagcccag ttggcgcgct gcacccaagg cttctgacct | 720 |
| tctcggtgcc cgaggccccg gcgggacttt tcagggcaga gatctcagag gcggcgcgca | 780 |
| cgccagcagc agttccctta atcctatgcc accctcccag ctgcaactgt ctacagtcga | 840 |
| tgcccacgcc cggaccccag ttctccaggt gcaccccctg gaatctccgg ccatgataag | 900 |
| cctcaccca caaccacag caactggtgt ctttttctctt aaagcgcgcc caggcctgcc | 960 |
| ccctggtatc aacgtggcta gcctggaatg ggtgagcaga gagccagccc ttttgtgtac | 1020 |
| cttttcccaat cctagcgcgc ctaggaagga ctctacactg tcagctgttc cacagtctag | 1080 |
| ctatcccctt ctggccaatg gcgtctgcaa atggccaggg tgtgagaagg tctttgaaga | 1140 |
| gccagaagat ttcctgaaac actgtcaagc agaccacttg ttggacgaga agggtcgcgc | 1200 |
| gcagtgcctt ctgcaaagag agatggtgca gtcactggag cagcagctgg tgctggagaa | 1260 |
| ggagaagctg tcagctatgc aggcacacct ggcaggaaaa atggctctca ccaaagcctc | 1320 |
| ttccgtagcc agctcagaca agggaagctg ttgtattgtc gccgctggct ctcagggggcc | 1380 |
| tgttgtgcca gcctggagtg gacctcggga ggcaccggac agcctgttcg ccgtgcggag | 1440 |
| acacctttgg ggctctcacg gaaactctac cttccctgaa ttccttcata atatggatta | 1500 |
| cttcaaattc cacaacatga ggcctccttt tacgtacgcg acgctgatcc ggtgggccat | 1560 |
| tctggaggca cctgagaagc aaagaactct caatgaaatc tatcactggt tcacaagaat | 1620 |

```
gttcgcattt tccgcaacc accctgccac ctggaagaac gctattcggc acaatctttc    1680
cctgcacaag tgcttcgtcc gcgttgagag cgagaaaggc gccgtctgga cagtcgacga    1740
actcgaattt agaaaaaaac ggtcacaaag accaagccgc tgcagcaatc ccacgccggg    1800
accctgaagc ctcgactgtg ccttctagtt gccagccatc tgttgtttgc cctcccccg     1860 tgccttcctt gaccctggaa ggtgccactc ccactgtcct ttcctaataa aatgaggaaa    1920
ttgcatcgca ttgtctgagt aggtgtcatt ctattctggg gggtgggtg gggcaggaca     1980 gcaagggga ggattgggaa gacaatagca ggcatgctgg ggatgcggtg ggctgaattc     2040 ccacgggtt ggggttgcgc cttttccaag gcagccctgg gtttgcgcag ggacgcggct     2100
gctctgggcg tggttccggg aaacgcagcg gcgccgaccc tgggtctcgc acattcttca    2160
cgtccgttcg cagcgtcacc cggatcttcg ccgctaccct tgtgggcccc ccggcgacgc    2220
ttcctgctcc gccctaagt cgggaaggtt ccttgcggtt cgcggcgtgc cggacgtgac     2280
aaacggaagc cgcacgtctc actagtaccc tcgcagacgg acagcgccag ggagcaatgg    2340
cagcgcgccg accgcgatgg gctgtggcca atagcggctg ctcagcgggg cgcgccgaga    2400
gcagcggccg ggaaggggcg gtgcgggagg cggggtgtgg ggcggtagtg tgggccctgt    2460
tcctgcccgc gcggtgttcc gcattctgca agcctccgga gcgcacgtcg gcagtcggct    2520
ccctcgttga ccgaatcacc gacctctctc cccagatggg ggcaggtgcc accgccgcg    2580 ccatggacgg gccgcgcctg ctgctgttgc tgcttctggg ggtgtcccct tggaggtgcca   2640 aggaggcatg ccccacaggc ctgtacacac acagcggtga gtgctgcaaa gcctgcaacc    2700
tgggcgaggg tgtggcccag ccttgtggag ccaaccagac cgtgtgtgag ccctgcctgg    2760
acagcgtgac gttctccgac gtggtgagcg cgaccgagcc gtgcaagccg tgcaccgagt    2820
gcgtggggct ccagagcatg tcggcgccgt gcgtggaggc cgacgacgcc gtgtgccgct    2880
gcgcctacgg ctactaccag gatgagacga ctgggcgctg cgaggcgtgc cgcgtgtgcg    2940
aggcgggctc gggcctcgtg ttctcctgcc aggacaagca gaacaccgtg tgcgaggagt    3000
gccccgacgg cacgtattcc gacgaggcca accacgtgga cccgtgcctg ccctgcaccg    3060
tgtgcgagga caccgagcgc cagctccgcg agtgcacacg ctgggccgac gccgagtgcg    3120
aggagatccc tggccgttgg attacacggt ccacacccc agagggctcg gacagcacag     3180 ccccagcac ccaggagcct gaggcacctc cagaacaaga cctcatagcc agcacggtgg     3240
caggtgtggt gaccacagtg atgggcagct cccagcccgt ggtgacccga ggcaccaccg    3300
acaacctcat ccctgtctat tgctccatcc tggctgctgt ggttgtgggc cttgtggcct    3360
acatagcctt caagaggtgg aacagggga tcctctagag cctcgactgt gccttctagt     3420
tgccagccat ctgttgtttg cccctcccc gtgccttcct tgaccctgga aggtgccact     3480
cccactgtcc tttcctaata aaatgaggaa attgcatcgc attgtctgag taggtgtcat    3540
tctattctgg gggtggggt ggggcaggac agcaagggg aggattggga agacaatagc      3600
aggcatgctg gggatgcggt gggctcccag ggctggcaag ccctcggccc cttccttggc    3660
ccttggccca tccccacgag cctcgcccag ctggagggct gcacccaaag cctcagacct    3720 gctggggcc cgggcccag ggggaacctt ccagggccga gatcttcgag gcggggccca      3780
tgcctcctct tcttccttga accccatgcc accatcgcag ctgcaggtga ggccctgggc    3840
ccaggatggg gcaggcaggg tggggtacct ggacctacag gtgccgacct ttactgtggc    3900
actgggcggg aggggggctg gctggggcac aggaagtggt ttctgggtcc caggcaagtc    3960
```

```
tgtgacttat gcagatgttg cagggccaag aaaatcccca cctgccaggc ctcagagatt    4020
ggaggctctc cccgacctcc caatccctgt ctcaggagag gaggaggccg tattgtagtc    4080
ccatgagcat agctatgtgt ccccatcccc atgtgacaag agaagaggac tggggccaag    4140
taggtgaggt gacagggctg aggccagctc tgcaacttat tagctgtttg atctttaaaa    4200
agttactcga tctccatgag cctcagtttc catacgtgta aaaggggat gatcatagcg     4260 cggccgc                                                              4267

<210> SEQ ID NO 5
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 5
ggcatcgggt ccttgtccaa                                                20

<210> SEQ ID NO 6
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 6
aggacccgat gcccaacccc                                                20

<210> SEQ ID NO 7
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 7
tccagctggg cgaggctcct                                                20

<210> SEQ ID NO 8
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 8
gaaggggccg agggcttgcc                                                20

<210> SEQ ID NO 9
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 9
gaaggggccg agggcttgcc                                                20

<210> SEQ ID NO 10
<211> LENGTH: 20
<212> TYPE: DNA
<213> ORGANISM: Artificial sequence
<220> FEATURE:
<223> OTHER INFORMATION: synthetic polynucleotide
```

<400> SEQUENCE: 10
ttggcccttg gcccatcccc                                                   20

<210> SEQ ID NO 11
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 11
ggccgagggc ttgccaggcc                                                   20

<210> SEQ ID NO 12
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 12
ccccaggagc ctcgcccagc                                                   20

<210> SEQ ID NO 13
<211> LENGTH: 102
<212> TYPE: RNA
<213> ORGANISM: Artificial sequence
<220> FEATURE:
<223> OTHER INFORMATION: synthetic polynucleotide
<220> FEATURE:
<221> NAME/KEY: misc_feature
<222> LOCATION: (1)..(3)
<223> OTHER INFORMATION: 2'-O-methyl 3'phosphorothioate
<220> FEATURE:
<221> NAME/KEY: misc_feature
<222> LOCATION: (100)..(102)
<223> OTHER INFORMATION: 2'-O-methyl 3'phosphorothioate

<400> SEQUENCE: 13
aggacccgau gcccaacccc guuuuagagc uagaaauagc aaguuaaaau aaggcuaguc        60
cguuaucaac uugaaaaagu ggcaccgagu cggugcuuuu uu                          102

<210> SEQ ID NO 14
<211> LENGTH: 23
<212> TYPE: DNA
<213> ORGANISM: Artificial sequence
<220> FEATURE:
<223> OTHER INFORMATION: synthetic polynucleotide

<400> SEQUENCE: 14
ctagagctgg ggtgcaacta tgg                                               23

<210> SEQ ID NO 15
<211> LENGTH: 25
<212> TYPE: DNA
<213> ORGANISM: Artificial sequence
<220> FEATURE:
<223> OTHER INFORMATION: synthetic polynucleotide

<400> SEQUENCE: 15
gactacaata cggcctcctc ctctc                                             25

<210> SEQ ID NO 16
<211> LENGTH: 20
<212> TYPE: DNA

<213> ORGANISM: Artificial sequence
<220> FEATURE:
<223> OTHER INFORMATION: synthetic polynucleotide

<400> SEQUENCE: 16
atgtcagctc ggtccttcca                                                   20

<210> SEQ ID NO 17
<211> LENGTH: 22
<212> TYPE: DNA
<213> ORGANISM: Artificial sequence
<220> FEATURE:
<223> OTHER INFORMATION: synthetic polynucleotide

<400> SEQUENCE: 17
tggcatagga ttaagggaac tg                                                22

<210> SEQ ID NO 18
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 18
agccttcaag aggtggaaca                                                   20

<210> SEQ ID NO 19
<211> LENGTH: 19
<212> TYPE: DNA
<213> ORGANISM: Artificial sequence
<220> FEATURE:
<223> OTHER INFORMATION: synthetic polynucleotide

<400> SEQUENCE: 19
aggccatcct gatcctcac                                                    19

<210> SEQ ID NO 20
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 20
tgcctcctct tcttccttga                                                   20

<210> SEQ ID NO 21
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 21
gagcctcgaa aaccctgact                                                   20

<210> SEQ ID NO 22
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 22
gggaggattg ggaagacaat                                                   20

<210> SEQ ID NO 23
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 23
tcagagattg gaggctctcc                                             20

<210> SEQ ID NO 24
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 24
acaatacggc ctcctcctct                                             20

<210> SEQ ID NO 25
<211> LENGTH: 22
<212> TYPE: DNA
<213> ORGANISM: Artificial sequence
<220> FEATURE:
<223> OTHER INFORMATION: synthetic polynucleotide

<400> SEQUENCE: 25
caccgaaatc ggtattagtt tg                                          22

<210> SEQ ID NO 26
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 26
cagttctgga ggccagagtc                                             20

<210> SEQ ID NO 27
<211> LENGTH: 19
<212> TYPE: DNA
<213> ORGANISM: Artificial sequence
<220> FEATURE:
<223> OTHER INFORMATION: synthetic polynucleotide

<400> SEQUENCE: 27
cccgggggag tatagaagg                                              19

<210> SEQ ID NO 28
<211> LENGTH: 22
<212> TYPE: DNA
<213> ORGANISM: Artificial sequence
<220> FEATURE:
<223> OTHER INFORMATION: synthetic polynucleotide

<400> SEQUENCE: 28
ccaggctgat cctttctgt ca                                           22

<210> SEQ ID NO 29
<211> LENGTH: 20
<212> TYPE: DNA
<213> ORGANISM: Artificial sequence
<220> FEATURE:

<223> OTHER INFORMATION: synthetic polynucleotide

<400> SEQUENCE: 29
cagacaccat ttgccagcag                                              20

<210> SEQ ID NO 30
<211> LENGTH: 21
<212> TYPE: DNA
<213> ORGANISM: Artificial sequence
<220> FEATURE:
<223> OTHER INFORMATION: synthetic polynucleotide

<400> SEQUENCE: 30
cagacgccat tggccagaag g                                            21

<210> SEQ ID NO 31
<211> LENGTH: 19
<212> TYPE: DNA
<213> ORGANISM: Artificial sequence
<220> FEATURE:
<223> OTHER INFORMATION: synthetic polynucleotide

<400> SEQUENCE: 31
tgcacccaag gcttctgac                                               19

<210> SEQ ID NO 32
<211> LENGTH: 17
<212> TYPE: DNA
<213> ORGANISM: Artificial sequence
<220> FEATURE:
<223> OTHER INFORMATION: synthetic polynucleotide

<400> SEQUENCE: 32
ctggagaact ggggtcc                                                 17

<210> SEQ ID NO 33
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 33
cgccctcatt tcatgcacca                                              20

<210> SEQ ID NO 34
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 34
ttgaagagcc agaagatttc                                              20

<210> SEQ ID NO 35
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 35
atgcgaacat tcttgtgaac                                              20

```
<210> SEQ ID NO 36
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 36
agcacttgtg cagggaaaga                                                    20

<210> SEQ ID NO 37
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 37
cccggcgtgg gattgctgca                                                    20

<210> SEQ ID NO 38
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 38
aacggtcaca aagaccaagc                                                    20

<210> SEQ ID NO 39
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 39
caccgctgtg tgtgtacagg                                                    20

<210> SEQ ID NO 40
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 40
aacgctattc ggcacaatct                                                    20

<210> SEQ ID NO 41
<211> LENGTH: 21
<212> TYPE: DNA
<213> ORGANISM: Artificial sequence
<220> FEATURE:
<223> OTHER INFORMATION: synthetic polynucleotide

<400> SEQUENCE: 41
ccagtcgtct catcctggta g                                                  21

<210> SEQ ID NO 42
<211> LENGTH: 20
<212> TYPE: DNA
<213> ORGANISM: Artificial sequence
<220> FEATURE:
<223> OTHER INFORMATION: synthetic polynucleotide
```

```
<400> SEQUENCE: 42
aggcacctga gaagcaaaga                                              20

<210> SEQ ID NO 43
<211> LENGTH: 19
<212> TYPE: DNA
<213> ORGANISM: Artificial sequence
<220> FEATURE:
<223> OTHER INFORMATION: synthetic polynucleotide

<400> SEQUENCE: 43
gctcacacac ggtctggtt                                               19

<210> SEQ ID NO 44
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 44
aggcacctga gaagcaaaga                                              20

<210> SEQ ID NO 45
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 45
ggggttcaag gaagaagagg                                              20

<210> SEQ ID NO 46
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 46
aacggtcaca aagaccaagc                                              20

<210> SEQ ID NO 47
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 47
cctggaggag tgcctgtaag                                              20

<210> SEQ ID NO 48
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 48
acgctattcg gcacaatctt                                              20

<210> SEQ ID NO 49
<211> LENGTH: 20
```

```
<212> TYPE: DNA
<213> ORGANISM: Artificial sequence
<220> FEATURE:
<223> OTHER INFORMATION: synthetic polynucleotide

<400> SEQUENCE: 49
ttgagagctg gtgcatgaaa                                              20

<210> SEQ ID NO 50
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 50
accgtacagc gtggtttttc                                              20

<210> SEQ ID NO 51
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 51
ttggtgagag ccattttcc                                               20

<210> SEQ ID NO 52
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 52
agagagaggt ctgcggcttc                                              20

<210> SEQ ID NO 53
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 53
gaggcctcat gttgtggaat                                              20

<210> SEQ ID NO 54
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 54
ggaaaaatgg ctctcaccaa                                              20

<210> SEQ ID NO 55
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 55
```
ccaacaagtg gtctgcttga                                                    20

<210> SEQ ID NO 56
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 56
aggcttggtg aagtggactg                                                    20

<210> SEQ ID NO 57
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 57
ggctaggtgc gctaggtttt                                                    20

<210> SEQ ID NO 58
<211> LENGTH: 34
<212> TYPE: DNA
<213> ORGANISM: Artificial sequence
<220> FEATURE:
<223> OTHER INFORMATION: synthetic polynucleotide

<400> SEQUENCE: 58
gtttaattga gttgtcatat gttaataacg gtat                                    34

<210> SEQ ID NO 59
<211> LENGTH: 39
<212> TYPE: DNA
<213> ORGANISM: Artificial sequence
<220> FEATURE:
<223> OTHER INFORMATION: synthetic polynucleotide

<400> SEQUENCE: 59
cccttggaca aggacccgat gcccaacccc aggcctggc                               39

<210> SEQ ID NO 60
<211> LENGTH: 23
<212> TYPE: DNA
<213> ORGANISM: Artificial sequence
<220> FEATURE:
<223> OTHER INFORMATION: synthetic polynucleotide
<220> FEATURE:
<221> NAME/KEY: misc_feature
<222> LOCATION: (21)..(21)
<223> OTHER INFORMATION: n is a, c, g, or t

<400> SEQUENCE: 60
aggacccgat gcccaacccc ngg                                                23

<210> SEQ ID NO 61
<211> LENGTH: 8
<212> TYPE: PRT
<213> ORGANISM: Artificial sequence
<220> FEATURE:
<223> OTHER INFORMATION: synthetic polynucleotide

<400> SEQUENCE: 61

Trp Lys Asn Ala Ile Arg His Asn
1               5

```
<210> SEQ ID NO 62
<211> LENGTH: 24
<212> TYPE: DNA
<213> ORGANISM: Artificial sequence
<220> FEATURE:
<223> OTHER INFORMATION: synthetic polynucleotide

<400> SEQUENCE: 62
tggaagaacg ccatccgcca caac                                            24

<210> SEQ ID NO 63
<211> LENGTH: 8
<212> TYPE: PRT
<213> ORGANISM: Artificial sequence
<220> FEATURE:
<223> OTHER INFORMATION: synthetic polynucleotide

<400> SEQUENCE: 63

Trp Lys Asn Thr Ile Arg His Asn
1               5

<210> SEQ ID NO 64
<211> LENGTH: 24
<212> TYPE: DNA
<213> ORGANISM: Artificial sequence
<220> FEATURE:
<223> OTHER INFORMATION: synthetic polynucleotide

<400> SEQUENCE: 64
tggaagaaca ccatccgcca caac                                            24

<210> SEQ ID NO 65
<211> LENGTH: 24
<212> TYPE: DNA
<213> ORGANISM: Artificial sequence
<220> FEATURE:
<223> OTHER INFORMATION: synthetic polynucleotide

<400> SEQUENCE: 65
tggaagaacg ctattcggca caat                                            24

<210> SEQ ID NO 66
<211> LENGTH: 101
<212> TYPE: DNA
<213> ORGANISM: Artificial sequence
<220> FEATURE:
<223> OTHER INFORMATION: synthetic polynucleotide

<400> SEQUENCE: 66
cctgcccttg gacaaggacc cgatgcccaa ccccaggcct ggcaagccct cggcccttc      60 cttggcccctt ggcccatccc caggagcctc gcccagctgg a                       101

<210> SEQ ID NO 67
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 67
ttggacaagg acccgatgcc                                                 20

<210> SEQ ID NO 68
<211> LENGTH: 20
<212> TYPE: DNA
```

```
<213> ORGANISM: Artificial sequence
<220> FEATURE:
<223> OTHER INFORMATION: synthetic polynucleotide

<400> SEQUENCE: 68
aggagcctcg cccagctgga                                              20

<210> SEQ ID NO 69
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 69
ggcaagccct cggccccttc                                              20

<210> SEQ ID NO 70
<211> LENGTH: 40
<212> TYPE: DNA
<213> ORGANISM: Artificial sequence
<220> FEATURE:
<223> OTHER INFORMATION: synthetic polynucleotide

<400> SEQUENCE: 70
ggcaagccct cggccccttc ttggcccttg gcccatcccc                        40

<210> SEQ ID NO 71
<211> LENGTH: 20
<212> TYPE: DNA
<213> ORGANISM: Artificial sequence
<220> FEATURE:
<223> OTHER INFORMATION: synthetic polynucleotide

<400> SEQUENCE: 71
ggcctggcaa gccctcggcc                                              20
```

CRISPR-BASED FOXP3 GENE ENGINEERED T CELLS AND HEMATOPOIETIC STEM CELL PRECURSORS TO TREAT IPEX SYNDROME PATIENTS

CROSS REFERENCE

This application claims priority to U.S. Provisional Application No. 62/976,233, filed Feb. 13, 2020, which is incorporated herein in its entirety for all purpose.

GOVERNMENT SUPPORT

This invention was made with Government support under contract AI123896 awarded by the National Institutes of Health. The Government has certain rights in the invention.

BACKGROUND

Primary immunodeficiencies comprise a group of genetic immune diseases, which typically present with recurrent infections, but may instead manifest with predominant autoimmunity. Over 350 monogenic immune diseases have been described to date, and this number has been rapidly increasing with technological advances in DNA sequencing and expanding accessibility of genetic screening. The prototype of genetic autoimmunity is immune dysregulation, polyendocrinopathy, enteropathy, immune dysregulation polyendocrinopathy enteropathy X-linked (IPEX) syndrome, which is a severe X-linked disease with early onset. The most frequent autoimmune manifestations of IPEX syndrome include type 1 diabetes, eczema, and life-threatening enteropathy. Other common autoimmune manifestations include cytopenia, autoimmune hepatitis, and thyroiditis.

IPEX syndrome is classified as a Tregopathy, a class of diseases that selectively affect the function of regulatory T cells (Tregs), and in the case of IPEX syndrome, $CD4^+$ $CD25^{high}FOXP3^+$ Tregs. In IPEX patients, non-functional Tregs are produced that are unable to prevent the development of autoimmunity or allergy because they lack the ability to suppress the function and proliferation of effector T (Teff) cells. In recent years, the pathophysiology of IPEX syndrome has been dissected, but few therapeutic advances have been made and limited treatment options exist. Currently, IPEX patients are treated with pharmacological immunosuppression, which has only partial efficacy in the acute phase of the disease and cannot prevent long-term disease progression. Furthermore, administration of immunosuppressive drugs carries the risk of severe side effects associated with toxicity and susceptibility to infections. The only curative treatment available for IPEX is allogeneic hematopoietic stem cell transplantation. However, many patients do not find a suitable donor or suffer from transplant related complications.

IPEX syndrome is caused by mutations in the forkhead box protein 3 (FOXP3) gene, and over 70 unique mutations throughout the FOXP3 locus have been identified. FOXP3 is a master transcription factor required for the function of Tregs, which upregulates Treg-associated markers, such as CD25 and CTLA4, and represses proinflammatory cytokine production. While Tregs rely on constitutive FOXP3 expression, Teff cells transiently express FOXP3 following TCR activation. This cell-type specific regulation is a result of a complex network of promoter and enhancer elements. The high and persistent FOXP3 expression in Tregs is due to epigenetic marks established during T cell development, including the Treg-specific demethylated region (TSDR). It has previously been shown that Teff cells require transient FOXP3 expression for intrinsic regulation of proliferation, cytokine production, and TCR signaling. According to the current understanding of IPEX, impairment of both Teff and Treg function underlies IPEX syndrome pathology. In human Teff cells and Tregs, FOXP3 pre-mRNA is alternatively spliced, and the two predominate spliced isoforms are the full length ($FOXP3^{FL}$) isoform and a shorter version that lacks exon 2 ($FOXP3^{dE2}$).

The $FOXP3^{FL}$ and $FOXP3^{dE2}$ isoforms each represents roughly half of the FOXP3 expressed, however the proportion is skewed in different cell activation states and in a number of inflammatory diseases. Causative IPEX mutations in exon 2 have been described, with a subset of patients presenting with milder clinical phenotypes, Because these mutations spare the $FOXP3^{dE2}$ isoform, it has been suggested that $FOXP3^{dE2}$ can partially compensate for $FOXP3^{FL}$ loss, but that $FOXP3^{FL}$ is required for complete Treg and Teff cell function and prevention of IPEX syndrome.

Because IPEX syndrome is a monogenic immune disease caused by mutations in FOXP3, gene therapy could be a useful approach to treat the disease. A FOXP3 gene delivery protocol for ex vivo generation of genetically engineered Tregs has been developed that uses lentiviral vector (LV)-mediated delivery of copy of the complementary DNA (cDNA) of the full length isoform of FOXP3. Because this vector expresses FOXP3 under a constitutive promoter, EF1α, it is able to convert IPEX patient conventional CD4+ T cells into potent Treg-like suppressor cells. However, this approach cannot be used on long term repopulating hematopoietic stem and progenitor (HSPC) cells due to the adverse effects of FOXP3 overexpression on stem cell proliferation and differentiation. For the development of a successful FOXP3 gene therapy using HSPCs, it is necessary to achieve constitutive expression of FOXP3 in the Treg compartment to restore suppressive function without having FOXP3 overexpression perturb the proliferation and function of HSPCs or Teff cells.

IPEX syndrome clinical manifestations recapitulate those occurring in many other autoimmune diseases more commonly observed in the general population. These autoimmune diseases are not due to monogenic defects but rather results from genetic predisposition and environmental co-morbidity factors. Nevertheless, abnormal function or number of Treg cells are involved in their pathogenesis and Treg cell immunotherapy is envisaged as innovative treatment for these diseases. IPEX is a model of Primary Immune Regulatory Disorders (PIRD) in which Treg and Teff can be dysfunctional because of mutations in genes relevant for both and characterized by immune dysregulation. The method provided herein for the correction of FOXP3 can be applied to many other PIRD. The present disclosure addresses this condition.

SUMMARY

Methods and compositions relating to FOXP3 gene edited human hematopoietic cells, and their use in cellular therapy to promote immune tolerance, are provided. In some embodiments a method is provided for restoring functional regulatory T cell activity to an individual in need thereof, e.g. an individual suffering from immune dysregulation polyendocrinopathy enteropathy X-linked (IPEX) syndrome. The gene edited hematopoietic cells comprise a site-directed gene correction of the FOXP3 gene. In some embodiments the cells are autologous to a recipient, for example where the cells are isolated from a patient sample, gene corrected ex vivo, and reintroduced to the recipient. In other embodiments the cells are allogeneic to the recipient. In some embodiments the recipient suffers from IPEX.

In some embodiments the hematopoietic cells are hematopoietic stem or progenitor cells (HSPC), e.g. CD34+ human hematopoietic stem cells, lymphoid progenitor cells, etc.; which may be isolated from peripheral blood, cord blood, bone marrow, etc. as known in the art. In some embodiments the hematopoietic cells are T cells, which may be isolated from patient samples, for example by selection for positive expression of CD4, CD25, etc. or may be differentiated from HSPC. In some embodiments the T cells are CD4+ T effector (Teff) cells. In some embodiments the T cells are CD4+ regulatory T cells (Treg). The cells produced by this method may be referred to herein as hematopoietic$^{edFOXP3}$ cells, e.g. HSPC$^{edFOXP3}$ CD4$^{edFOXP3}$ T cells, etc.

In an embodiment, FOXP3 engineered human hematopoietic cells are produced by gene editing of hematopoietic cells ex vivo by CRISPR/Cas effector gene editing. The gene editing method may comprise introducing into the targeted cell the components: sgRNA complexed to a Cas protein as an RNP system; and a FOXP3 homology donor vector.

The FOXP3 homology donor vector comprises a coding sequence for FOXP3, usually a full-length coding sequence. The coding sequence may be a cDNA, or may comprise one or more introns. The coding sequence can be modified, or diverged, to incorporate synonymous mutations at the nucleotide level according to the redundant codon usage system, to prevent premature recombination while still encoding for a wild-type protein. Generally the FOXP3 sequence encodes a functional, wild-type FOXP3 protein, although for research purposes a mutated form may be encoded. The FOXP3 protein may be one of the FOXP3 isoforms FOXP3$^{FL}$ (SEQ ID NO:1) or FOXP3$^{dE2}$ (SEQ ID NO:2). The FOXP3 coding sequence is generally not linked to a promoter in the vector, and is expressed in the cell by the native FOXP3 promoter. This is a fundamental advantage of this approach, that in the case of the FOXP3 gene editing allows endogenously regulated expression which occur differentially in Treg and Teff. The FOXP3 coding sequence may be operably linked to a polyadenylation sequence, including without limitation BGH polyadenylation signal. The homology vector optionally comprises a marker sequence, including without limitation a truncated nerve growth factor receptor (tNGFR) operably linked to a promoter, e.g. the phosphoglycerate kinase 1 (PGK) promoter. The homology donor vector further comprises a 5' and a 3' arm with homology to the FOXP3 locus (chromosomal site); where the homology arms may be centered on the cut site of the sgRNA.

In one embodiment, the recombinant FOXP3 homology donor vector comprises the nucleotide sequence of SEQ ID NO:3 or SEQ ID NO:4, or a sequence having at least about 80-100% sequence identity thereto, for example at about 95% sequence identity, including any percent identity within this range, such as 81, 82, 83, 84, 85, 86, 87, 88, 89, 90, 91, 92, 93, 94, 95, 96, 97, 98, or 99% sequence identity thereto, wherein the recombinant FOXP3 homology donor vector is capable of gene correcting a mutated FOXP3 sequence in a hematopoietic cell of interest.

Introduction of the components to a cell targeted for gene editing may utilize any convenient method, e.g. transfection, nucleofection, transduction, etc. In some embodiments the sgRNA comprises 2'-O-methyl 3'phosphorothioate (MS) chemical modifications at the terminal nucleotides. In some embodiments the Cas protein is Cas9 protein. In some embodiments the sgRNA comprises the sequence set forth in Table 1, e.g. SEQ ID NO:5-12, and in some embodiments comprises SEQ ID NO:6.

In another aspect, a method of producing CD4$^{edFOXP3}$ T cells is provided, the method comprising: a) obtaining a biological cell sample comprising one of HSPC, lymphoid progenitor cells, or CD4+ T lymphocytes from a subject; b) gene editing the cells with CRISPR/Cas9 and FOXP3 homology donor vectors described herein; and c) culturing the cells under conditions suitable for expression of the FOXP3, wherein CD4+ T lymphocytes are edited into CD4$^{edFOXP3}$ T cells. In embodiments where the cells targeted for gene editing are HSPC or lymphoid progenitor cells, the cells may be differentiated into CD4+ T cells. Alternatively, HSPC are transplanted to a recipient and differentiated into Treg and Teff CD4$^{edFOXP3}$ T cells in vivo. The biological cell sample can be any sample comprising targeted hematopoietic cells, e.g. peripheral blood, bone marrow, etc. Isolation of HSPC may utilize mobilized peripheral blood, as known in the art (see, for example, Karpova et al. (1019) F1000Res.; 8: F1000 Faculty Rev-2125). In some embodiments, the method further comprises isolating the targeted cells, e.g. HSPC, lymphoid progenitor cells, CD4+ T lymphocytes, etc. from the biological sample.

In certain embodiments, the method further comprises substantially purifying the cells after gene editing. In some embodiments, the gene edited cells are substantially purified by positive selection for a cell surface marker encoded by the homology donor vector. For example, if the cell surface marker is a truncated nerve growth factor receptor (tNGFR), the gene edited cells can be substantially purified by positive selection for the tNGFR cell surface marker using for example and without limitation, immunomagnetic separation or flow cytometry.

In certain embodiments, the method further comprises culturing the hematopoietic cells during and after the gene editing process. In certain embodiments, the method further comprises culturing CD4$^{edFPXP3}$ T cells. In some embodiments, the method further comprises adding IL-2 to a culture of CD4$^{edFOXP3}$ T cells to expand the number of CD4$^{edFOXP3}$ T cells in the culture.

In another aspect, gene edited hematopoietic cells produced by the methods described herein are provided, for example a population of isolated HSPC$^{edFOXP3}$; CD4$^{edFOXP3}$ T cells; etc. In another aspect, a composition comprising FOXP3 gene edited cells produced by the methods described herein are provided for use in treatment of an inflammatory condition. In some embodiments, a composition of the FOXP3 gene edited cells is substantially purified free of other cells. In some embodiments, the composition further comprises a pharmaceutically acceptable excipient. In another embodiment, a composition comprising the FOXP3 gene edited cells for use in treatment of IPEX syndrome is provided.

In another aspect, a method of treating an inflammatory condition in a subject is provided, the method comprising administering a therapeutically effective amount of a composition comprising FOXP3 gene edited cells produced by the methods described herein to the subject. The composition is generally administered in an amount sufficient to reduce inflammation in the subject.

In another aspect, a method of adoptive cellular immunotherapy for treating an inflammatory condition is provided, the method comprising: a) obtaining a biological cell sample comprising one of HSPC, lymphoid progenitor cells, or CD4+ T lymphocytes from a subject; b) gene editing the cells with CRISPR/Cas9 and FOXP3 homology donor vectors described herein; c) administering a therapeutically effective amount of the cells to the subject. In embodiments where the cells targeted for gene editing are HSPC or lymphoid progenitor cells, the cells may be differentiated into $CD4^{edFOXP3}$ T cells. Alternatively, HSPC are transplanted to a recipient and differentiated into $CD4^{edFOXP3}$ T cells in vivo. The biological cell sample can be any sample comprising targeted hematopoietic cells, e.g. peripheral blood, cord blood, bone marrow, etc. In some embodiments, the method further comprises isolating the targeted cells, e.g. HSPC, lymphoid progenitor cells, $CD4^+$ T lymphocytes, etc. from the biological sample.

The methods described herein can be used to treat inflammatory conditions, including for example, without limitation, Treg deficiency, autoimmune disorders, allergies, graft-versus-host disease, and transplant rejection. In one embodiment, the Treg deficiency/autoimmune disorder is IPEX syndrome.

In another embodiment, a method of treating immune dysregulation polyendocrinopathy enteropathy X-linked (IPEX) syndrome is provided, the method comprising administering a therapeutically effective amount of a composition comprising autologous $HSPC^{edFOXP3}$ or $CD4^{edFOXP3}$ T cells to the subject, as described herein.

FOXP3 gene edited cells produced by the methods described herein may be administered by any suitable mode of administration. In some embodiments, the cells are administered intravenously or intra-arterially. In another embodiment, the cells are administered locally at a site of inflammation. In another embodiment, the cells are administered locally at a site of a tissue or organ transplant. Method of transplantation for hematopoietic stem cells may use myeloablative or non-myeloablative conditioning, including antibody-mediated conditioning, e.g. as disclosed in U.S. Pat. Nos. 10,882,915; 10,111,966; 10,406,179; US Patent publications 20200369767; 20200129557; and 20180214524, each herein specifically incorporated by reference.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

FIG. 1. The FOXP3 locus is precisely targeted using the CRISPR system in primary HSPCs and T cells. (A) Schematic representation of CRISPR-based editing of the FOXP3 gene showing the CRISPR cut site in first coding exon, E1 (exons depicted by grey boxes separated by lines representing introns; non-coding exon E-1, enhancer with TSDR). A zoomed-in view of the sgRNA binding site relative to the start codon, PAM site, and cleavage site is shown. Homology donor depicted below with arms of homology, codon divergent FOXP3 cDNA, BGH polyadenylation signal (pA) included to terminate the FOXP3 transcript, truncated NGFR (tNGFR) marker gene under the PGK promoter to drive marker expression independent of FOXP3 expression, and a second pA. (B) Screening of sgRNAs targeting the first coding exon of the FOXP3 gene. Plasmids encoding wild-type Cas9 or nickase variant of Cas9 (paired sgRNAs) and FOXP3 sgRNAs nucleofected into K562 cell lines. CRISPR efficiency measured by TIDE analysis to detect indel mutations created by NHEJ-mediated DNA repair. (C) Experimental method for editing of HSPCs and T cells with functional readouts listed. (D) CRISPR cutting efficiency in CD34+ HSPCs and CD4+ Tcells quantified by TIDE analysis for detection of indel mutations created by the NHEJ repair pathway.

FIG. 2. CRISPR combined with a rAAV6 homology donor enables precise HDR-mediated FOXP3 cDNA transgene insertion into the endogenous locus. (A) Editing observed at the DNA level by an in-out PCR strategy that uses a primer inside the inserted divergent cDNA construct and a second primer outside of the 5' arm of homology. Control band represents un-modified region in the FOXP3 gene as a positive control for the presence of genomic DNA. PCR using in-out primers resulted in band only present in samples in which the cDNA was inserted (FL cDNA) and not in FOXP3 knockout (KO) or mock treated samples. After the ladder, the first four lanes represent CD4+ T cells and the last three lanes represent HSPCs. (B) Rates of HDR-mediated FOXP3 editing detected flow cytometry for tNGFR marker gene expression in primary human CD4+CD25++ Tregs, MT-2 Treg cells, primary CD4+CD25− Teff cells, and CD34+ HSPCs. Editing rates with standard Sp Cas9 (grey) and high fidelity (HiFi) Cas9 (red) shown for comparison. Dots represent cells from individual donors. (C) Representative flow cytometry plots showing tNGFR marker gene expression in edited cord blood-derived CD34+ HSPCs. Negative control: mock treated cells nucleofected with PBS in place of CRISPR and transduced with rAAV6-FOXP3 donor. Edited cells enriched using tNGFR selection and purity shown by flow cytometry. (D) Venn diagram showing overlap in predicted off-target (OT) sites identified by COSMID in silico prediction and GUIDE-seq DSB capture. All predicted sites tested by next generation sequencing (NGS) in edited CD34+ HSPCs derived from cord blood (CB), and validated by NGS in edited bone marrow (BM)-derived HSPCs. (E) The four OT sites validated by NGS shown with highlighted mismatches in OT site vs. FOXP3 sgRNA target sequence, closest gene name, gene region, and average frequency of indel mutations detected by NGS (mean, n=3).

FIG. 4. FOXP3 editing of Teff cells preserves physiological regulation of FOXP3 expression and in vitro function. (A) Flow cytometry time course showing kinetics of FOXP3 expression in non-activated Teff cells and activated Teff cells on subsequent days post-activation (d3, d6, d14), comparing WT unmodified, WT mock treated, and FOXP3$^{FLCOW}$ edited Teff cells. FOXP3 expression quantified in Teff cells over time course of activation, showing average MFI (mean±SD, n=3). (B) Cytokine production in WT and FOXP3 gene edited Teff cells determined by ELISA. Supernatants collected at 24 hr (IL-2) and 48 hr (IFN-γ and IL-17) post-activation with anti-CD3/28 (mean±SD, n=3). (C) Teff cell proliferation in response to activation measured by the proliferation assay. Shown are flow cytometry plots of CFSE dye stained Teff cells with progressive dilution of dye as proliferation progresses from non-activated to d2 and d3 post-activation with anti-CD3/28 dynabeads. Comparison of proliferation rates in response to activation with a bead:cell ratio of 1:100 and 1:25. Quantification of average proliferative response of Teff cells from proliferation assay at day 3 shown to the right, comparing different doses of activation beads (mean±SD, n=3).

FIG. 7. The CRISPR system allows for precise FOXP3 gene modification. (Corresponding to FIG. 1) (A) Schematic representation of the edited FOXP3 allele after HDR-mediated insertion of a cDNA encoding the alternatively spliced isoform of FOXP3 lacking exon2 (dE2, FOXP3$^{dE2}$, top construct). Construct includes the inserted tNGFR marker gene under the constitutive promoter, PGK, allowing marking of all edited cells. The FOXP3 knockout allele (KO, FOXP3$^{KO}$, bottom construct) created by insertion of the tNGFR marker gene without a FOXP3 cDNA. The tNGFR marker cassette flanked by polyadenylation signals (pA) to terminate mRNA processing and block expression of the downstream FOXP3 gene elements, creating FOXP3 knockout while marking edited cells. (B) The sequence of CRISPR sgRNA binding sites in exon 1 of the FOXP3 gene relative to the start codon (red). The cut site of each sgRNA is underlined. The sgRNAs were tested either individually (sg1, sg2, sg3, and sg4) or as pairs (sg5&6 and sg7&8).

FIG. 10. The FOXP3 gene is knocked-in and knocked out using CRISPR-based homologous recombination. (Corresponding to FIG. 3) (A) Example flow cytometry plot showing that MT-2 Tregs edited with the FL construct co-express FOXP3 and tNGFR. Overlay contains negative control sample that is 98% double negative for FOXP3 and tNGFR (FOXP3− tNGFR−), WT mock treated cells that are 98% FOXP3+ tNGFR−, and FL cDNA edited cells that are 93% double positive (FOXP3+tNGFR+). (B) Knockout of the FOXP3 gene in the MT-2 Treg cell line by insertion of the tNGFR cassette without FOXP3 cDNA into the FOXP3 locus)(FOXP3$^{KO}$). Shown is FOXP3 protein expression by flow cytometry with median fluorescent intensity (MFI), comparing the wild-type MT-2 cells with two replicates of the FOXP3$^{KO}$ treated cells.

DETAILED DESCRIPTION OF EMBODIMENTS

Gene Editing

Figure 3:
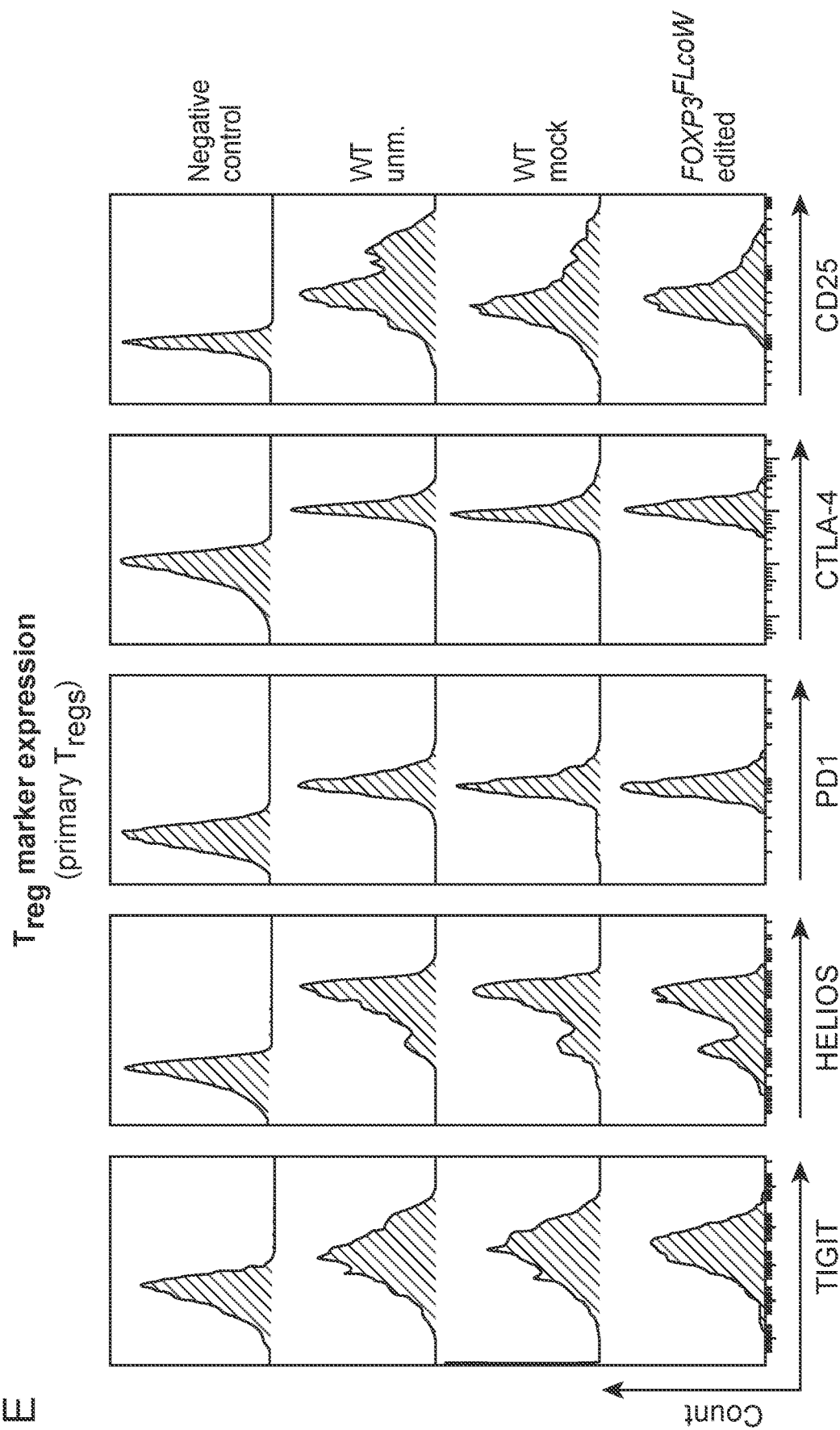
FIG. 3. FOXP3 edited Tregs express FOXP3 protein and display characteristic in vitro phenotype and function. (A) Quantification of FOXP3 protein expression in the MT-2 Treg cell line by flow cytometry, showing median fluorescent intensity (MFI) values for one representative experiment out of three performed. (B) FOXP3 homology donor constructs designed to improve FOXP3 protein expression, including further codon optimization ($FOXP3^{FLco}$) and addition of a WPRE element ($FOXP3^{FLcoW}$). (C) Flow cytometry for FOXP3 in MT-2 cells comparing the different donor constructs. (D) FOXP3 expression in primary Tregs by flow cytometry and quantification represented as ratio of MFI in treated cells versus WT unmodified Tregs (mean±SD, one-way ANOVA, Tukey's multiple comparisons). Significance comparing $FOXP3^{FL}$ (n=2, p<0.01) or $FOXP3^{FLcoW}$ (n=6, p<0.01) to WT mock treated (n=2). (E) Expression of signature Treg marker proteins on primary Tregs by flow cytometry and corresponding quantification (mean±SD, n=2-4). (F) Suppression assay showing unstimulated responders (R), stimulated responders (R*) alone or in co-culture with Tregs, and calculated percent suppression. Average suppressive potential over several independent experiments is quantified (right). Significance comparing the WT Tregs with following Tregs: IPEX, FOXP3 knockout (KO), FOXP3$^{FL}$ edited, FOXP3$^{FLco}$ edited, and FOXP3$^{FLcoW}$ edited (mean±SD, one-way ANOVA, Tukey's multiple comparisons).
Figure 3:
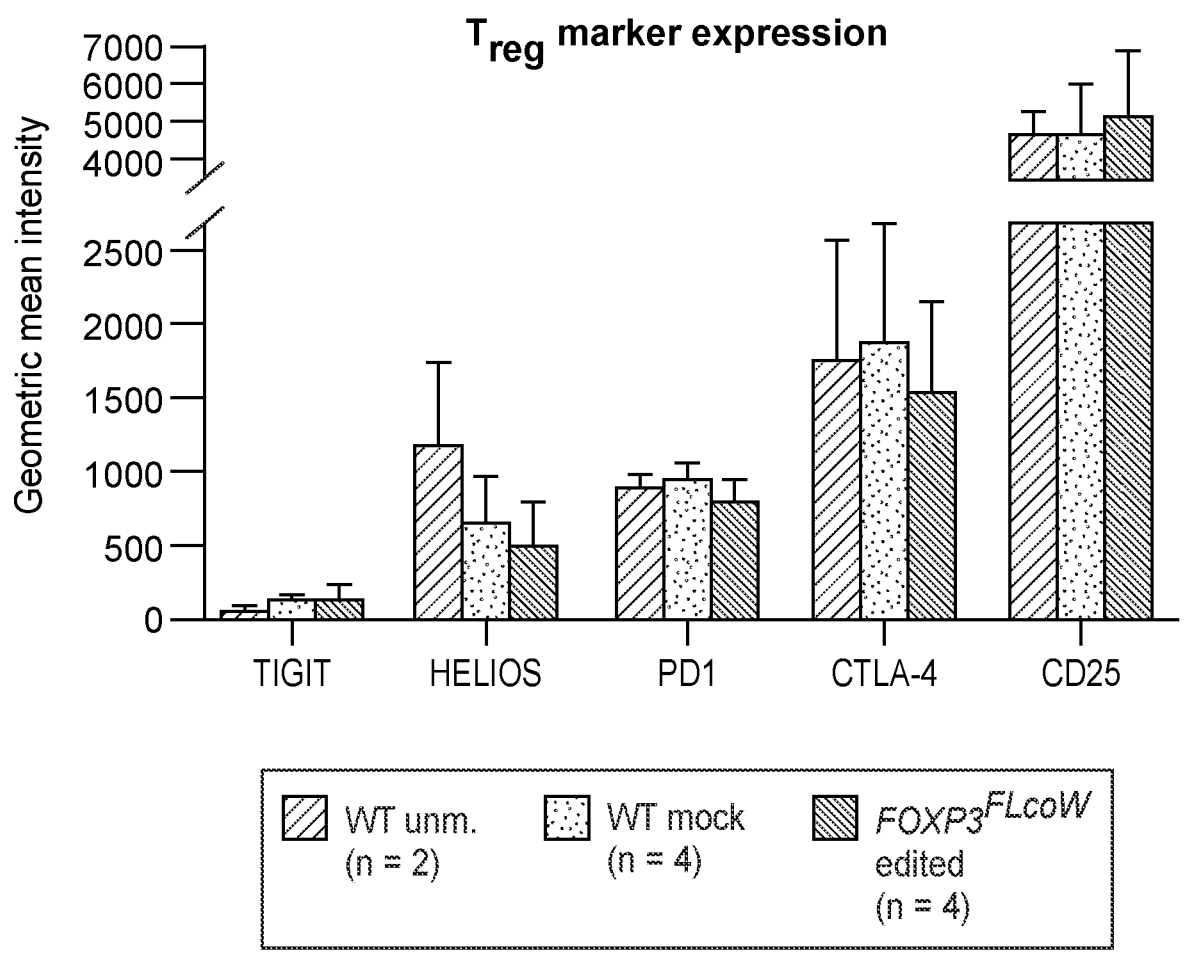

The present disclosure provides genetically modified cells and methods of producing such cells. Also provided are methods of editing the genome of such cells. The genetically modified cells of the disclosure are genetically modified such that their genome includes an integrated heterologous FOXP3 coding nucleic acid at one or more positions within the genome, operably linked to the native FOXP3 promoter present in the genome. In many embodiments, the newly integrated FOXP3 sequence replaces a mutated sequence present in the genome with a wild-type sequence.

A CRISPR/Cas protein (also referred to herein as a CRISPR/Cas endonuclease) interacts with (binds to) a corresponding guide RNA to form a ribonucleoprotein (RNP) complex (referred to herein as a CRISPR/Cas complex) that is targeted to a particular site (a target sequence) in a target genome via base pairing between the guide RNA and a target sequence within the target genome. A guide RNA includes (i) a nucleotide sequence (a guide sequence) that is complementary to a sequence (the target site) of a target DNA and (ii) a protein-binding region that includes a double stranded RNA (dsRNA) duplex and bind to a corresponding CRISPR/Cas protein. The guide RNA can be readily modified in order to target any desired sequence within a target genome (by modifying the guide sequence). Suitable guide RNA sequences are provided, for example, in Table 1. A wild type CRISPR/Cas protein (e.g., a Cas9 protein) normally has nuclease activity that cleaves a target nucleic acid (e.g., a double stranded DNA (dsDNA)) at a target site defined by the region of complementarity between the guide sequence of the guide RNA and the target nucleic acid. The term "CRISPR/Cas protein," as used herein, includes wild type CRISPR/Cas proteins, and also variant CRISPR/Cas proteins, e.g., CRISPR/Cas proteins with one or more mutations in a catalytic domain rendering the protein a nickase.

To generate a genetically modified cell of the present disclosure, a heterologous nucleic acid is integrated into the genome of a cell, which for the purposes of the present disclosure is typically a human hematopoietic cell. The heterologous nucleic acid can be any desired length, but will comprise a FOXP3 coding sequence. The term "heterologous" is a relative term. In some cases, the heterologous nucleic acid is heterologous to the genome because the exact sequence is present nowhere in the genome except for where the nucleic acid has integrated, although a highly similar sequence is usually present.

Many methods for integrated foreign nucleic acids into the genomes of various cell types will be known to one of ordinary skill in the art, and any convenient method can be used (e.g., a CRISPR/Cas system can be used to generate the genetically modified cells and organisms described herein). A nucleic acid that is integrated into the genome at one or more positions includes a CRISPR/Cas target sequence. In some cases, two or more nucleic acids (having the same CRISPR/Cas target sequence) are integrated into two or more different positions within the same locus (e.g., flanking a nucleotide sequence encoding a protein and/or an RNA, or a transcription control element). For example, both isoforms of FOXP3 may be integrated.

The term "locus" as used herein refers to a position (which position can be particular base pair location, or can be a range of from one base pair to another) within a genome of interest. For example, a locus can be a particular base pair position. As another example, a locus can be a range of base pair positions, e.g., the position in the genome that codes a particular protein or RNA that is transcribed (as an illustrative example, the FOXP3 locus is a protein-coding locus that is transcribed and encodes the FOXP3 protein). As used herein, the term protein-coding locus or RNA-coding locus generally includes the transcriptional control sequences that influence transcription of the locus. Thus, for example, the term "protein-coding locus" not only refers to the nucleotide sequences that have an open reading frame (ORF) and directly encode the protein, but also the promoter, the 5' UTR, the 3' UTR, etc.

A target DNA (e.g., genomic DNA) that can be recognized and cleaved by a CRISP/Cas protein (e.g., Cas9) is a DNA polynucleotide that comprises a "target site" or "target sequence." The terms "CRISPR/Cas target site" or "CRISPR/Cas target sequence" are used interchangeably herein to refer to a nucleic acid sequence present in a target DNA (e.g., genomic DNA of a cell) to which a CRISPR/Cas guide RNA can bind, allowing cleavage of the target DNA by the CRISPR/Cas endonuclease. The strand of the target DNA that is complementary to and hybridizes with the CRISPR/Cas guide RNA is referred to as the "complementary strand" or the "target strand" and the strand of the target DNA that is complementary to the "complementary strand" (and is therefore not complementary to the guide RNA) is referred to as the "non-complementary strand" or "non-target strand." A target sequence can be any desired length and, in some cases, can depend upon the type of CRISPR/Cas guide RNA and CRISPR/Cas protein that will be used to target the target sequence.

A feature that renders the target sequence functional (such that it can be recognized and cleaved by a CRISPR/Cas complex) is that it is adjacent to a protospacer adjacent motif (PAM), also referred to as a "PAM sequence." Once a nucleic acid is integrated into the genome (when generating a FOXP3 genetically modified cell), the CRISPR/Cas target sequence is adjacent to a PAM. The PAM can be present at that position in the genome prior to the integration (e.g., the nucleic acid can be integrated such that the CRISPR/Cas target sequence is inserted next to the PAM that was already present in the genome. In some cases, the PAM is not present at the desired position in the genome, and the PAM is instead present on the nucleic acid to be integrated. Such a heterologous nucleic acid would therefore include the CRISPR/Cas target sequence adjacent to a PAM sequence, and both the CRISPR/Cas target sequence and the PAM would be integrated into the genome.

A wild type CRISPR/Cas protein (e.g., Cas9 protein) normally has nuclease activity that cleaves a target nucleic acid (e.g., a double stranded DNA (dsDNA)) at a target site defined by the region of complementarity between the guide sequence of the guide RNA and the target nucleic acid. In some cases, site-specific targeting to the target nucleic acid occurs at locations determined by both (i) base-pairing complementarity between the guide nucleic acid and the target nucleic acid; and (ii) a short motif referred to as the "protospacer adjacent motif" (PAM) in the target nucleic acid. For example, when a Cas9 protein binds to (in some cases cleaves) a dsDNA target nucleic acid, the PAM sequence that is recognized (bound) by the Cas9 polypeptide is present on the non-complementary strand (the strand that does not hybridize with the targeting segment of the guide nucleic acid) of the target DNA. CRISRPR/Cas (e.g., Cas9) proteins from different species can have different PAM sequence requirements.

A nucleic acid that binds to a class 2 CRISPR/Cas endonuclease (e.g., a Cas9 protein; a type V or type VI CRISPR/Cas protein; a Cpf1 protein; etc.) and targets the complex to a specific location within a target nucleic acid is referred to herein as a "guide RNA" or "CRISPR/Cas guide nucleic acid" or "CRISPR/Cas guide RNA." A guide RNA provides target specificity to the complex (the RNP complex) by including a targeting segment, which includes a guide sequence (also referred to herein as a targeting sequence), which is a nucleotide sequence that is complementary to a sequence of a target nucleic acid.

Before the FOXP3 edited hematopoietic cells and their use in treatment of inflammatory conditions are further described, it is to be understood that this invention is not limited to a particular method or composition described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a cell" includes a plurality of such cells and reference to "the regulatory T cell-like cells" includes reference to one or more regulatory T cell-like cells and equivalents thereof, e.g. $CD4^{edFOXP3}$ cells, Treg-like cells, or engineered Tregs, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

"Tolerogenic" means capable of suppressing or down-modulating an adaptive or innate immunological response.

The term "biological sample" encompasses a clinical sample. The types of "biological samples" include, but are not limited to: tissue obtained by surgical resection, tissue obtained by biopsy, cells in culture, cell supernatants, cell lysates, tissue samples, organs, bone marrow, blood, plasma, serum, fine needle aspirate, lymph node aspirate, cystic aspirate, a paracentesis sample, a thoracentesis sample, and the like.

The terms "obtained" or "obtaining" as used herein can also include the physical extraction or isolation of a biological sample (e.g., comprising HSPC, lymphoid progenitors, $CD4^+$ T lymphocytes) from a subject. Accordingly, a biological sample comprising hematopoietic cells can be isolated from a subject (and thus "obtained") by the same person or same entity that subsequently isolates HSPC, $CD4^+$ T lymphocytes, etc. from the sample and produces $CD4^{edFOXP3}$ T cells (gene edited with CRISPR/Cas9 and FOXP3 homology donor vectors) from the original unmodified cells in the sample. When a biological sample is "extracted" or "isolated" from a first party or entity and then transferred (e.g., delivered, mailed, etc.) to a second party, the sample was "obtained" by the first party (and also "isolated" by the first party), and then subsequently "obtained" (but not "isolated") by the second party. Accordingly, in some embodiments, the step of obtaining does not comprise the step of isolating a biological sample.

In some embodiments, the step of obtaining comprises the step of isolating a biological sample (e.g., a pre-treatment biological sample, a post-treatment biological sample, etc.).

Methods and protocols for isolating various biological samples (e.g., a blood sample, a biopsy sample, an aspirate, etc.) will be known to one of ordinary skill in the art and any convenient method may be used to isolate a biological sample.

"Substantially purified" generally refers to isolation of a component of a sample (e.g., cell or substance), such that the component comprises the majority percent of the sample in which it resides. Typically, in a sample, a substantially purified component comprises at least 70%, preferably at least 80%-85%, more preferably at least 90-99% of the sample.

The terms "treatment", "treating", "treat" and the like are used herein to generally refer to obtaining a desired pharmacologic and/or physiologic effect. The effect can be prophylactic in terms of completely or partially preventing a disease or symptom(s) thereof and/or may be therapeutic in terms of a partial or complete stabilization or cure for a disease and/or adverse effect attributable to the disease. The term "treatment" encompasses any treatment of a disease in a mammal, particularly a human, and includes: (a) preventing the disease and/or symptom(s) from occurring in a subject who may be predisposed to the disease or symptom but has not yet been diagnosed as having it; (b) inhibiting the disease and/or symptom(s), i.e., arresting their development; or (c) relieving the disease symptom(s), i.e., causing regression of the disease and/or symptom(s). Those in need of treatment include those already inflicted as well as those in which prevention is desired (e.g., those with increased susceptibility to an autoimmune disease, etc.)

A therapeutic treatment is one in which the subject is inflicted prior to administration and a prophylactic treatment is one in which the subject is not inflicted prior to administration. In some embodiments, the subject has an increased likelihood of becoming inflicted or is suspected of being inflicted prior to treatment. In some embodiments, the subject is suspected of having an increased likelihood of becoming inflicted.

"Pharmaceutically acceptable excipient or carrier" refers to an excipient that may optionally be included in the compositions of the invention and that causes no significant adverse toxicological effects to the patient.

"Pharmaceutically acceptable salt" includes, but is not limited to, amino acid salts, salts prepared with inorganic acids, such as chloride, sulfate, phosphate, diphosphate, bromide, and nitrate salts, or salts prepared from the corresponding inorganic acid form of any of the preceding, e.g., hydrochloride, etc., or salts prepared with an organic acid, such as malate, maleate, fumarate, tartrate, succinate, ethylsuccinate, citrate, acetate, lactate, methanesulfonate, benzoate, ascorbate, para-toluenesulfonate, palmoate, salicylate and stearate, as well as estolate, gluceptate and lactobionate salts. Similarly salts containing pharmaceutically acceptable cations include, but are not limited to, sodium, potassium, calcium, aluminum, lithium, and ammonium (including substituted ammonium).

An "effective amount" of a composition comprising $HSPC^{edFOXP3}$ or $CD4^{edFOXP3}$ T cells (i.e., cells edited with CRISPR/Cas9 and FOXP3 homology donor vectors) is an amount sufficient to safely effect beneficial or desired results, such as an amount that suppresses activation and proliferation of effector T cells and increases immune tolerance. An effective amount can be administered in one or more administrations, applications, or dosages.

By "therapeutically effective dose or amount" of a composition comprising $HSPC^{edFOXP3}$ or $CD4^{edFOXP3}$ T cells is intended an amount that, when administered as described herein, brings about a positive therapeutic response, such as improved recovery from an inflammatory condition such as, but not limited to, an autoimmune manifestation, an allergy, graft-versus-host disease, and transplant rejection. Improved recovery may include a reduction in inflammation, pain, or autoimmune-induced tissue damage, or better graft tolerance and prolonged survival of transplanted cells, tissue or organs. Additionally, a therapeutically effective dose or amount may compensate for functional (e.g., IPEX syndrome) or quantitative Treg-deficiency and reduce the need for immunosuppressive or anti-inflammatory drugs. The exact amount required will vary from subject to subject, depending on the species, age, and general condition of the subject, the severity of the condition being treated, the particular drug or drugs employed, mode of administration, and the like. An appropriate "effective" amount in any individual case may be determined by one of ordinary skill in the art using routine experimentation, based upon the information provided herein. For example, an effective unit dose may be $10^6$ cells/kg, $3 \times 10^6$ cells/kg, $10^7$ cells/kg, $10^8$ cells/kg, $10^9$/kg, or more.

By "isolated" is meant, when referring to a polypeptide, that the indicated molecule is separate and discrete from the whole organism with which the molecule is found in nature or is present in the substantial absence of other biological macro molecules of the same type. The term "isolated" with respect to a polynucleotide is a nucleic acid molecule devoid, in whole or part, of sequences normally associated with it in nature; or a sequence, as it exists in nature, but having heterologous sequences in association therewith; or a molecule disassociated from the chromosome. The term "isolated" when referring to a cell, is a cell that is separate and discrete from the whole organism with which the cell is found in nature.

"Substantially purified" generally refers to isolation of a substance (compound, drug, polynucleotide, protein, polypeptide) such that the substance comprises the majority percent of the sample in which it resides. Typically in a sample, a substantially purified component comprises 50%, preferably 80%-85%, more preferably 90-95% of the sample. Techniques for purifying substances of interest are well-known in the art and include, for example, ion-exchange chromatography, affinity chromatography and sedimentation according to density.

The terms "recipient", "individual", "subject", "host", and "patient", are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, cows, sheep, goats, pigs, etc. Preferably, the mammal is human.

The term "unit dosage form," as used herein, refers to physically discrete units suitable as unitary dosages for human and animal subjects, each unit containing a predetermined quantity of the agents calculated in an amount sufficient to produce the desired effect in association with a pharmaceutically acceptable diluent, carrier or vehicle. The specifications for the unit dosage forms for use in the present invention depend on the particular compound employed and the effect to be achieved, the pharmacodynamics associated with each compound in the host, and the like.

"Recombinant" as used herein to describe a nucleic acid molecule means a polynucleotide of genomic, cDNA, viral, semisynthetic, or synthetic origin which, by virtue of its origin or manipulation, is not associated with all or a portion of the polynucleotide with which it is associated in nature. The term "recombinant" as used with respect to a protein or polypeptide means a polypeptide produced by expression of a recombinant polynucleotide. In general, the gene of interest is cloned and then expressed in transformed organisms, as described further below. The host organism expresses the foreign gene to produce the protein under expression conditions.

The term "transformation" or "transfection" refers to the insertion of an exogenous polynucleotide into a host cell, irrespective of the method used for the insertion.

"Recombinant host cells", "host cells," "cells", "cell lines," "cell cultures", and other such terms denoting microorganisms or higher eukaryotic cell lines cultured as unicellular entities refer to cells which can be, or have been, used as recipients for recombinant vector or other transferred DNA, and include the original progeny of the original cell which has been transfected.

"Operably linked" refers to an arrangement of elements wherein the components so described are configured so as to perform their usual function. Thus, a given promoter operably linked to a coding sequence is capable of effecting the expression of the coding sequence when the proper enzymes are present. Expression is meant to include the transcription of mRNA from a DNA or RNA template and can further include translation of a protein from an mRNA template. The promoter need not be contiguous with the coding sequence, so long as it functions to direct the expression thereof. Thus, for example, intervening untranslated yet transcribed sequences can be present between the promoter sequence and the coding sequence and the promoter sequence can still be considered "operably linked" to the coding sequence.

A "vector" is capable of transferring nucleic acid sequences to target cells (e.g., viral vectors, non-viral vectors, particulate carriers, and liposomes). Typically, "vector construct," "expression vector," and "gene transfer vector," mean any nucleic acid construct capable of directing the expression of a nucleic acid of interest and which can transfer nucleic acid sequences to target cells. Thus, the term includes cloning and expression vehicles, as well as viral vectors.

The terms "variant" refers to biologically active derivatives of the reference molecule that retain desired activity. In general, the term "variant" refers to molecules having a native sequence and structure with one or more additions, substitutions (generally conservative in nature) and/or deletions, relative to the native molecule, so long as the modifications do not destroy biological activity and which are "substantially homologous" to the reference molecule. In general, the sequences of such variants will have a high degree of sequence homology to the reference sequence, e.g., sequence homology of more than 50%, generally more than 60%-70%, even more particularly 80%-85% or more, such as at least 90%-95% or more, when the two sequences are aligned.

"Gene transfer" or "gene delivery" refers to methods or systems for reliably inserting DNA or RNA of interest into a host cell. Such methods can result in transient expression of non-integrated transferred DNA, extrachromosomal replication and expression of transferred replicons (e.g., episomes), or integration of transferred genetic material into the genomic DNA of host cells.

The term "derived from" is used herein to identify the original source of a molecule but is not meant to limit the method by which the molecule is made which can be, for example, by chemical synthesis or recombinant means.

A polynucleotide "derived from" a designated sequence refers to a polynucleotide sequence which comprises a contiguous sequence of approximately at least about 6 nucleotides, preferably at least about 8 nucleotides, more preferably at least about 10-12 nucleotides, and even more preferably at least about 15-20 nucleotides corresponding, i.e., identical or complementary to, a region of the designated nucleotide sequence. The derived polynucleotide will not necessarily be derived physically from the nucleotide sequence of interest, but may be generated in any manner, including, but not limited to, chemical synthesis, replication, reverse transcription or transcription, which is based on the information provided by the sequence of bases in the region (s) from which the polynucleotide is derived. As such, it may represent either a sense or an antisense orientation of the original polynucleotide.

Homology-directed repair (HDR) is a mechanism in cells to repair double-stranded and single stranded DNA breaks. Homology-directed repair includes homologous recombination (HR) and single-strand annealing (SSA) (Lieber. 2010 Annu. Rev. Biochem. 79:181-211). The most common form of HDR is called homologous recombination (HR), which has the longest sequence homology requirements between the donor and acceptor DNA. Other forms of HDR include single-stranded annealing (SSA) and breakage-induced replication, and these require shorter sequence homology relative to HR. Homology-directed repair at nicks (single-stranded breaks) can occur via a mechanism distinct from HDR at double-strand breaks (Davis and Maizels. PNAS (0027-8424), 111 (10), p. E924-E932).

In one aspect of the invention, CRISPR is used to edit pre-existing FOXP3 mutants in order to replace with a desired version/variant of FOXP3. CRISPR based genome editing methods provide advantages over traditional lentiviral methods of gene addition. Advantages include but are not limited to, increased breath of the cells types that can be transformed, allows for FOXP3 expression to be controlled by the endogenous FOXP3 promoter, allows locus specific replacement with correction of many different mutation types, etc.

FOXP3 Gene Edited Hematopoietic Cells

Compositions, methods, and kits are provided for producing and using engineered hematopoietic cells capable of expressing FOXP3. FOXP3 is a transcription factor essential for the function of natural Tregs in maintenance of immune tolerance and normal Teff function. CRISPR/Cas9-mediated gene editing of FOXP3 in $CD4^+$ T lymphocytes endows cells with Treg-like characteristics, including the ability to suppress immune responses of effector T cells and other immune cells. $CD4^{edFOXP3}$ Treg cells are useful for increasing immune tolerance to antigens in a subject such as alloantigens, autoantigens, and allergens. Accordingly, pharmaceutical compositions comprising such engineered $CD4^{edFOXP3}$ T cells, or compositions of stem and progenitor cells that can give rise to $CD4^{edFOXP3}$ T cells.

Methods of Generating FOXP3 Gene Edited Hematopoietic Cells

A CRISPR/Cas9 vector comprising a CRISPR/Cas9 system cuts the endogenous FOXP3 gene at the target site of the sgRNA. After cutting, the FOXP3 homology donor vector then replaces the endogenous copy of FOXP3 with the desired version/variant of FOXP3 contained within the FOXP3 homology donor vector using homology directed repair in a hematopoietic cell, converting them to gene edited cells. For example, nucleic acids encoding the forkhead box protein 3 (FOXP3) transcription factor can be inserted into the FOXP3 homology donor vector to create a vector capable of replacing the endogenous copy of FOXP3 with a desired version/variant following CRISPR/Cas9 cutting/editing.

In some embodiments, the recombinant FOXP3 homology donor vector comprises: a) a 5' homology arm; b) a polynucleotide encoding forkhead box protein 3 (FOXP3) or a variant thereof; c) a polyadenylation sequence d) a phosphoglycerate kinase 1 (PGK) promoter, wherein the PGK promoter is operably linked to the polynucleotide encoding a cell surface marker; e) a polynucleotide encoding a cell surface marker for in vitro selection and in vivo tracking of cells transduced with the vector; and f) a 3' homology arm.

In one embodiment, the cell surface marker is a truncated nerve growth factor receptor (tNGFR). In one embodiment, the recombinant FOXP3 homology donor vector comprises the nucleotide sequence of SEQ ID NO:2 or a sequence having at least about 80-100% sequence identity thereto, including any percent identity within this range, such as 81, 82, 83, 84, 85, 86, 87, 88, 89, 90, 91, 92, 93, 94, 95, 96, 97, 98, or 99% sequence identity thereto, wherein the recombinant FOXP3 homology donor vector is capable of generating a Treg-like cell by transfection of a CD4+ T lymphocyte.

The ability of constructs to produce FOXP3 can be empirically determined, for example, by using a real-time RT-PCR assay of FOXP3 mRNA levels or a Western Blot assay of FOXP3 protein levels. Additionally, the ability of the CRISPR/Cas9 and FOXP3 homology donor vector to confer physiologic Teff or Treg characteristics on CD4+ T lymphocytes can be evaluated with a proliferation or a suppression assay, respectively, in vitro (see Examples).

FOXP3 nucleic acid and protein sequences may be derived from any source. A number of FOXP3 nucleic acid and protein sequences are known. A representative example of a human FOXP3 sequences is presented in SEQ ID NO:1 and SEQ ID NO:2, and additional representative sequences including various isoforms of the FOXP3 transcription factor are listed in the National Center for Biotechnology Information (NCBI) database. See, for example, NCBI entries: Accession Nos. NM_001114377, NM_014009, NG_007392, XM_006724533, XM_017029567, NP_001107849, NP_054728, XP_016885056, and XP_006724596; all of which sequences (as entered by the date of filing of this application) are herein incorporated by reference. Any of these sequences or a variant thereof comprising a sequence having at least about 80-100% sequence identity thereto, including any percent identity within this range, such as 81, 82, 83, 84, 85, 86, 87, 88, 89, 90, 91, 92, 93, 94, 95, 96, 97, 98, or 99% sequence identity thereto, can be used to construct a FOXP3 homology donor construct, wherein the expressed variant FOXP3 retains biological activity, including transcription factor activity and the ability to convert CD4+ T lymphocytes into $CD4^{edFOXP3}$ T cells.

The hematopoietic cells can optionally be purified before or after gene editing by any method known in the art, including, but not limited to, density gradient centrifugation (e.g., Ficoll Hypaque, percoll, iodoxanol and sodium metrizoate), immunoselection (positive selection or negative selection for surface markers) with immunomagnetic beads or immunoaffinity columns, or fluorescence-activated cell sorting (FACS). For example, $CD4^+$ T lymphocytes or CD34+ HSPC can be isolated from apheresis products by immunomagnetic $CD4^+$ cell selection, cultured in the presence of IL-2 and IL-7, then transfected or transduced with a FOXP3 homology donor vector, followed by immunoselection for the cell surface marker (e.g., truncated NGFR)

expressed by the recombinant FOXP3 homology donor vector to separate gene edited cells from non-gene edited cells (see, Examples).

Hematopoietic stem cells can be obtained by harvesting from bone marrow, from peripheral blood or cord blood. Bone marrow is generally aspirated from the posterior iliac crests while the donor is under either regional or general anesthesia. Additional bone marrow can be obtained from the anterior iliac crest. A dose of $1 \times 10^8$ and $2 \times 10^8$ marrow mononuclear cells per kilogram is generally considered desirable to establish engraftment in autologous and allogeneic marrow transplants, respectively. Bone marrow can be primed with granulocyte colony-stimulating factor (G-CSF; filgrastim [Neupogen]) to increase the stem cell count.

Mobilization of stem cells from the bone marrow into peripheral blood by cytokines such as G-CSF or GM-CSF has led to the widespread adoption of peripheral blood progenitor cell collection by apheresis for hematopoietic stem cell transplantation. The dose of G-CSF used for mobilization is 10 μg/kg/day. In autologous donors who are heavily pretreated, however, doses of up to 40 μg/kg/day can be given. Mozobil may be used in conjunction with G-CSF to mobilize hematopoietic stem cells to peripheral blood for collection.

Such methods are well known in the art. The stem cells are optionally, although not necessarily, purified. Abundant reports explore various methods for purification of stem cells and subsequent engraftment, including flow cytometry; an isolex system (Klein et al. (2001) Bone Marrow Transplant. 28(11):1023-9; Prince et al. (2002) Cytotherapy 4(2): 137-45); immunomagnetic separation (Prince et al. (2002) Cytotherapy 4(2):147-55; Handgretinger et al. (2002) Bone Marrow Transplant. 29(9):731-6; Chou et al. (2005) Breast Cancer. 12(3):178-88); and the like. Each of these references is herein specifically incorporated by reference, particularly with respect to procedures, cell compositions and doses for hematopoietic stem cell transplantation.

Current guidelines indicate that the minimum dose required for engraftment is $1-2 \times 10^6$ CD34$^+$ cells/kg body weight for autologous and allogeneic transplants.

The cells which are employed may be fresh, frozen, or have been subject to prior culture. They may be fetal, neonate, adult, etc. Hematopoietic stem cells may be obtained from fetal liver, bone marrow, cord blood, blood, particularly G-CSF or GM-CSF mobilized peripheral blood, or any other conventional source. Cells for engraftment are optionally isolated from other cells, where the manner in which the stem cells are separated from other cells of the hematopoietic or other lineage is not critical to this invention. If desired, a substantially homogeneous population of stem or progenitor cells may be obtained by selective isolation of cells free of markers associated with differentiated cells, while displaying epitopic characteristics associated with the stem cells.

The ability of the resulting engineered Teff or Treg CD4$^{edFOXP3}$ cells to respond to activation or to suppress proliferation and activation of effector T cells and other immune cells can be assayed by methods well known in the art including, for example, without limitation, performing an in vitro suppression assay or $^3$H-thymidine assay that measures suppression of T cell proliferation by CD4$^{edFOXP3}$ T cells, or a flow cytometry-based suppression assay that measures suppression of proliferation and cytokine production in subpopulations of T cells and other immune cells (see, e.g., Thornton et al. (1998) J. Exp. Med. 1998. 188: 287-296, Schneider et al. (2011) Methods Mol. Biol. 707: 233-241, Baecher-Allan et al. (2005) Clin. Immunol. 115: 10-18, McMurchy et al. (2012) Eur. J. Immunol. 42:27-34; herein incorporated by reference.

Applications

Methods are provided for restoring a multilineage T cell compartment in individuals with mutated FOXP3, including, for example, IPEX. The methods described herein are also useful for treating various immune conditions and disorders benefitting from increased immunological tolerance, such as inflammatory conditions including for example, without limitation, Treg deficiency, autoimmune disorders, allergies, graft-versus-host disease, and organ or tissue transplantation. In some embodiments, polyclonal CD4$^{edFOXP3}$ T cells, which may be derived in vivo from transplanted HSPC$^{edFOXP3}$, comprising a plurality of different T cell receptors, are used for immunosuppression and promoting immune tolerance generally. In other embodiments, CD4$^{edFOXP3}$ T cells comprising a T cell receptor specific for an antigen of interest are used to dampen adaptive antigen-specific immune responses to the antigen of interest selectively.

The infusion of gene edited cells is a relatively simple process that is performed at the bedside. The gene edited cells are infused through a central vein over a period of several hours. Autologous products are frequently cryopreserved; if so they are thawed at the bedside and infused rapidly over a period of several minutes. If administering HSPC, the dose of HSC is at least about $10^5$ CD34$^+$ cells/kg body weight, at least about $0.5 \times 10^6$, at least about $10^6$, and up to about $2.5 \times 10^6$, $5 \times 10^6$, $7.5 \times 10^6$, $10^7$ CD34$^+$ cells/kg body weight.

For positive selection of CD34$^+$ cells, commercial instruments can be employed to remove the desired cells, using solid-phase, anti-CD34 monoclonal antibodies. With negative selection, monoclonal antibodies can be used to remove undesired cells, leaving stem cells in the graft.

Treg deficiency and autoimmune and other inflammatory conditions that may be treated with engineered HSPC or CD4$^{edFOXP3}$ T cells by the methods described herein include, but are not limited to, immune dysregulation polyendocrinopathy enteropathy X-linked (IPEX) syndrome. Other conditions associated with autoimmunity and undesirable inflammation include, for example, genetic conditions with Treg impairment and certain degree of Teff abnormality could be treated with similar approaches using other genes instead of FOXP3 (see Cepika A M, JACI 2019). Treatment of primates, more particularly humans is of interest, but other mammals may also benefit from treatment, particularly domestic animals such as equine, bovine, ovine, feline, canine, murine, lagomorpha, and the like.

Pharmaceutical Compositions

Pharmaceutical compositions can be prepared by formulating the FOXP3 edited hematopoietic cells into dosage forms by known pharmaceutical methods. For example, a pharmaceutical composition comprising FOXP3 edited hematopoietic cells can be formulated for parenteral administration, as liquids, suspensions, emulsions, and injections (such as venous injections, drip injections, and the like).

In formulation into these dosage forms, the FOXP3 edited hematopoietic cells can be combined as appropriate, with pharmaceutically acceptable carriers or media, in particular, sterile water and physiological saline, vegetable oils, resolvents, bases, emulsifiers, suspending agents, surfactants, stabilizers, vehicles, antiseptics, binders, diluents, tonicity agents, soothing agents, bulking agents, disintegrants, buffering agents, coating agents, lubricants, coloring agents, solution adjuvants, or other additives. The FOXP3 edited hematopoietic cells may be also used in combination with known pharmaceutical compositions, immunosuppressants, cytokines, or other therapeutic agents.

Usually, but not always, the subject who receives the FOXP3 edited hematopoietic cells (i.e., the recipient) is also the subject from whom the original, unmodified cells are harvested or obtained, which provides the advantage that the donated cells are autologous. However, FOXP3 edited hematopoietic cells can be obtained from another subject (i.e., donor), a culture of cells from a donor, or from established cell culture lines. FOXP3 edited hematopoietic cells may be obtained from the same species than the subject to be treated, and more preferably of the same immunological profile as the subject. Such cells can be obtained, for example, from a biological sample comprising FOXP3 edited hematopoietic cells from a close relative or matched donor, and the FOXP3 edited hematopoietic cells that are produced (i.e., gene editing with a CRISPR/Cas 9 vector and a FOXP3 homology donor vector) can be administered to a subject in need of treatment for an inflammatory condition.

In certain embodiments, the FOXP3 edited hematopoietic cells that are administered to a subject are derived from autologous or allogeneic cells. The patients or subjects who donate or receive the cells are typically mammalian, and usually human. However, this need not always be the case, as veterinary applications are also contemplated.

Administration

At least one therapeutically effective cycle of treatment with FOXP3 edited hematopoietic cells (i.e., HSPC, lymphoid progenitors or $CD4^+$ T lymphocytes gene edited with a CRISPR/Cas9 vector and a FOXP3 homology donor vector) will be administered to a subject for treatment of an inflammatory condition. By "therapeutically effective dose or amount" of a composition comprising FOXP3 edited hematopoietic cells is intended an amount that, when administered as described herein, brings about a positive therapeutic response, such as improved recovery from an inflammatory condition benefitting from increased immunological tolerance, such as an autoimmune disorder, an allergy, graft-versus-host disease, or a tissue transplant. Improved recovery may include a reduction in inflammation, pain, or autoimmune-induced tissue damage, decreased allergic response, or prolonged survival of transplanted tissue or organs. Additionally, a therapeutically effective dose or amount may compensate for Treg-deficiency (e.g., IPEX syndrome) and reduce the need for immunosuppressive or anti-inflammatory drugs.

In certain embodiments, multiple therapeutically effective doses of compositions comprising FOXP3 edited hematopoietic cells and/or one or more other therapeutic agents, such as other drugs for treating immune diseases or conditions, or other medications will be administered. The compositions of the present invention are typically, although not necessarily, administered via injection (subcutaneously, intravenously, intra-arterially, or intramuscularly), by infusion, or locally. Additional modes of administration are also contemplated, such as intraperitoneal, intrathecal, intralymphatic, intravascular, intralesion, transdermal, and so forth. The pharmaceutical compositions comprising FOXP3 edited hematopoietic cells and other agents may be administered using the same or different routes of administration in accordance with any medically acceptable method known in the art.

In another embodiment, the pharmaceutical compositions comprising FOXP3 edited hematopoietic cells are administered prophylactically, e.g., to prevent Treg deficiency, etc. Such prophylactic uses will be of particular value for subjects who have a disease or a genetic predisposition to developing an inflammatory condition, such as an autoimmune disease, inflammation, or allergy. For example, FOXP3 edited hematopoietic cells may be administered to a patient with an autoimmune disease to prevent a disease flare, or in IPEX patients with mixed donor chimerism and disease relapse.

Those of ordinary skill in the art will appreciate which conditions compositions comprising FOXP3 edited hematopoietic cells can effectively treat. The actual dose and number of doses to be administered will vary depending upon the age, weight, and general condition of the subject as well as the severity of the condition being treated, the judgment of the health care professional, and conjugate being administered. Therapeutically effective amounts can be determined by those skilled in the art, and will be adjusted to the particular requirements of each particular case.

Compositions comprising FOXP3 edited hematopoietic cells, prepared as described herein (again, preferably provided as part of a pharmaceutical preparation), can be administered alone or in combination with one or more other therapeutic agents for treating an immune disease or condition. Antibody conditioning may be used, or myeloablative conditioning as known in the art. Individuals nay be treated with combination therapies with other medications used to treat a particular condition or disease according to a variety of dosing schedules depending on the judgment of the clinician, needs of the patient, and so forth. The specific dosing schedule will be known by those of ordinary skill in the art or can be determined experimentally using routine methods. Exemplary dosing schedules include, without limitation, administration five times a day, four times a day, three times a day, twice daily, once daily, three times weekly, twice weekly, once weekly, twice monthly, once monthly, and any combination thereof. Preferred compositions are those requiring dosing no more than once a day.

Compositions comprising FOXP3 edited hematopoietic cells can be administered prior to, concurrent with, or subsequent to other agents. If provided at the same time as other agents, the FOXP3 edited hematopoietic cells can be provided in the same or in a different composition. Thus, the FOXP3 edited hematopoietic cells and one or more other agents can be presented to the individual by way of concurrent therapy. By "concurrent therapy" is intended administration to a subject such that the therapeutic effect of the combination of the substances is caused in the subject undergoing therapy. For example, concurrent therapy may be achieved by administering a dose of a pharmaceutical composition comprising FOXP3 edited hematopoietic cells and a dose of a pharmaceutical composition comprising at least one other agent, such as a drug for treating an immune disease or condition, which in combination comprise a therapeutically effective dose, according to a particular dosing regimen. Similarly, the FOXP3 edited hematopoietic cells and one or more other therapeutic agents can be administered in at least one therapeutic dose. Administration of the separate pharmaceutical compositions can be performed simultaneously or at different times (i.e., sequentially, in either order, on the same day, or on different days), as long as the therapeutic effect of the combination of these substances is caused in the subject undergoing therapy.

Kits

Any of the compositions described herein may be included in a kit. For example, hematopoietic$^{edFOXP3}$ cells (i.e., gene corrected CD4$^+$ T lymphocytes, gene corrected HSPC, etc.) may be included in a kit. Alternatively, a CRISPR/Cas9 vector and a FOXP3 homology donor vector, as described herein, for expression of FOXP3 hematopoietic cells to produce CD4$^{edFOXP3}$ T cells may be included in the kit. In some embodiments, untransduced hematopoietic cells are provided with the CRISPR/Cas9 RNP complex and the FOXP3 homology donor vectors separate. The kit may also comprise nucleotransfection agents, agents for purification of cells (e.g., microbeads for selection of transfected cells having the NGFR surface marker), agents for maintaining or culturing cells, such as media, and optionally one or more other factors, such as cytokines (e.g., IL-2), growth factors, antibiotics, and the like.

Such kits generally will comprise, in suitable means, distinct containers for each individual reagent or solution. The kit may comprise one or more containers holding the hematopoietic cells and/or CRISPR/Cas9 vector and FOXP3 homology donor vectors, and other agents. Suitable containers for the compositions include, for example, bottles, vials, syringes, and test tubes. Containers can be formed from a variety of materials, including glass or plastic. A container may have a sterile access port (for example, the container may be a vial having a stopper pierceable by a hypodermic injection needle).

The kit can further comprise a container comprising a pharmaceutically-acceptable buffer, such as phosphate-buffered saline, Ringer's solution, or dextrose solution. It can also contain other materials useful to the end-user, including other pharmaceutically acceptable formulating solutions such as buffers, diluents, filters, needles, and syringes or other delivery devices. The delivery device may be pre-filled with the compositions.

The kit can also comprise a package insert containing written instructions for methods of treating inflammatory conditions with the cells, as described herein. The package insert can be an unapproved draft package insert or can be a package insert approved by the Food and Drug Administration (FDA) or other regulatory body.

In one embodiment, the kit comprises a CRISPR/Cas9 vector and a FOXP3 homology donor vector comprising the components arranged as depicted in the vector map shown in FIG. 1A. In another embodiment, the kit comprises a recombinant FOXP3 homology donor vector, comprising a coding sequence for FOXP3, usually a full-length coding sequence. The coding sequence may be a cDNA, or may comprise one or more introns. The coding sequence can be modified, or diverged, to incorporate synonymous mutations at the nucleotide level according to the redundant codon usage system, to prevent premature recombination while still encoding for a wild-type protein. Generally the FOXP3 sequence encodes a functional, wild-type FOXP3 protein, although for research purposes a mutated form may be encoded. The FOXP3 protein may be one or both of the FOXP3 isoforms FOXP3$^{FL}$ (SEQ ID NO:1) and FOXP3$^{\Delta E2}$ (SEQ ID NO:2). The FOXP3 coding sequence is generally not linked to a promoter in the vector, and is expressed in the cell by the native FOXP3 promoter. The FOXP3 coding sequence may be operably linked to a polyadenylation sequence, including without limitation BGH polyadenylation signal. The homology vector optionally comprises a marker sequence, including without limitation a truncated nerve growth factor receptor (tNGFR) operably linked to a promoter, e.g. the phosphoglycerate kinase 1 (PGK) promoter. The homology donor vector further comprises a 5' and 3' arm of homology to the chromosomal site; where the homology arms may be centered on the cut site of the sgRNA.

In one embodiment, the recombinant FOXP3 homology donor vector comprises the nucleotide sequence of SEQ ID NO:3 or SEQ ID NO:4, or a sequence having at least about 80-100% sequence identity thereto, including any percent identity within this range, such as 81, 82, 83, 84, 85, 86, 87, 88, 89, 90, 91, 92, 93, 94, 95, 96, 97, 98, or 99% sequence identity thereto, wherein the recombinant FOXP3 homology donor vector is capable of gene correcting a mutated FOXP3 sequence in a hematopoietic cell of interest.

It will be apparent to one of ordinary skill in the art that various changes and modifications can be made without departing from the spirit or scope of the invention.

Experimental

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention.

The prototypical genetic autoimmune disease is immune dysregulation, polyendocrinopathy, enteropathy, X-linked (IPEX) syndrome, which is a severe, and often fatal, pediatric disease with limited treatment options. IPEX syndrome is caused by mutations in the forkhead box protein 3 (FOXP3) gene, which is a critical transcription factor required for thymic-derived regulatory T cell (Treg) and CD4+ effector T (Teff) cell function. As a monogenic immune disease, IPEX is an ideal candidate for a gene therapy approach whereby patient hematopoietic stem and progenitor (HSPC) cells or T cells are gene corrected ex vivo and reinfused in the patient. Here we describe a CRISPR-based FOXP3 gene correction approach that uses homology directed repair to insert a FOXP3 cDNA into the endogenous gene locus and permit regulated expression of wild-type FOXP3 protein irrespective of downstream mutations. We achieve efficient FOXP3 editing with high specificity and precision. We determine that gene edited Tregs and Teff cells maintain characteristic phenotypic markers and are functional in vitro. Additionally, we show that this strategy is suitable for IPEX patient cells with diverse mutations. Lastly, we demonstrate that edited HSPCs engraft in immunodeficient mice and maintain multi-lineage differentiation potential. These results clearly demonstrate the feasibility of gene correction, which will be instrumental for the development of therapeutic approaches for genetic autoimmune diseases such as IPEX syndrome.

To deliver the FOXP3 cDNA in a site-specific manner while preserving endogenous regulation, we propose gene editing with the clustered regularly interspaced short palindromic repeat (CRISPR)/CRISPR-associated protein 9 (Cas9) system. In general, this one-size-fits-all cDNA insertion approach is designed to benefit all or the majority of patients, given that the causative mutations are located downstream of the insertion site. We hypothesized that this site-specific approach would permit gene delivery to patient-derived HSPCs for an autologous transplant. This gene correction approach provides a more complete and long-term treatment for IPEX syndrome and circumvent the need for matched hematopoietic stem cell donors. Here, we combine the CRISPR system with a DNA repair homology donor to insert the FOXP3 cDNA into the endogenous locus via homology directed repair (HDR). We report that this gene editing platform can accurately and specifically target FOXP3 in HSPCs and that edited HSPCs maintain normal differentiation potential in vitro and in vivo in immunodeficient mice. We demonstrate that both Tregs and Teff cells retain their key biologic properties when the cDNA is inserted into the endogenous locus, including normal proliferation of Teff cells. We show that the FOXP3 gene can be corrected in cells from IPEX patients with diverse mutations, which demonstrates the feasibility of a CRISPR-based FOXP3 gene correction approach for IPEX syndrome.

Example 1

The FOXP3 locus is efficiently and precisely edited by CRISPR in human HSPCs and T cells. To achieve gene editing at the FOXP3 locus, we designed a CRISPR-system targeting the FOXP3 gene downstream of the translation start codon in exon 1 and a corresponding HDR donor containing FOXP3 cDNA (FIG. 1A). The donor construct was designed to insert a codon diverged FOXP3 cDNA and restore wild-type FOXP3 protein expression in patient cells with diverse and scattered FOXP3 mutations. The gene replacement donor template was also designed to knock-in a marker gene, the truncated nerve growth factor receptor (tNGFR), which is used clinically as a surface marker for selection and tracking of genetically engineered cells. We placed tNGFR under the control of a constitutive promoter such that it would be expressed independently of FOXP3. Polyadenylation (pA) signals were included in the construct to ensure termination and inactivation of the downstream endogenous gene elements. In addition to the full length FOXP3 cDNA construct (FOXP3FL), we also developed two similar experimental constructs including a FOXP3 cDNA of a naturally occurring alternatively spliced isoform of FOXP3 lacking exon 2 (FOXP3dE2) and a FOXP3 knockout (FOXP3KO) construct that disrupts the FOXP3 gene by inserting only the tNGFR maker gene flanked by pA signals (FIG. 7A).

We screened FOXP3 CRISPR single-guide RNA (sgRNAs) for on-target cutting activity in immortalized K562 cells (FIG. 1B, FIG. 7B, and Table 1). The sgRNAs 1 and 2 triggered the highest on-target activity (26±7% and 20±5%, respectively, mean±SD, n=4) (FIG. 1B) as indicated by the frequency of insertion deletion (indel) mutations detected by TIDE analysis (21). Of the sgRNAs screened, sgRNA 2 was selected due to a combination of its on-target activity, safe predicted off-target profile, location in the coding sequence of the gene, and proximity to the start codon. Cutting efficiency of sgRNA 2 was 28±6% in human CD34+ HSPCs and 88±7% in CD4+ T cells (mean±SD, n=4), thus validating that the CRISPR system efficiently targets FOXP3 in the primary cells of interest (FIG. 1C-D).

Figure 8:
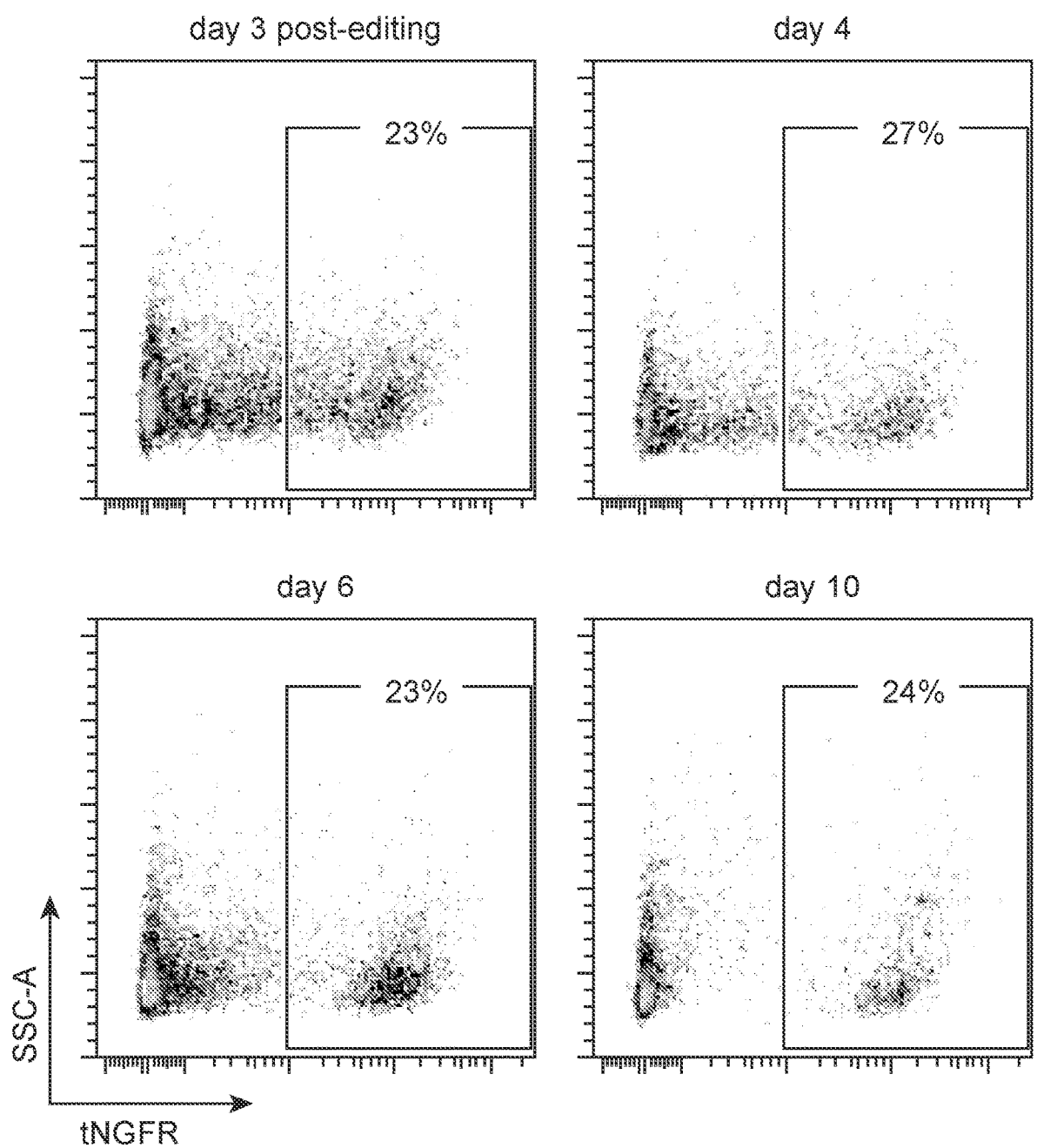
FIG. 8. The FOXP3 gene is precisely edited using CRISPR-mediated homology directed repair. (Corresponding to FIG. 2) (A) Precise targeting of the FOXP3 gene shown by an alternative in-out PCR strategy with forward primer (FP) in tNGFR and the reverse primer (RP) in the endogenous FOXP3 gene outside of the 3' arm of homology. Band representing successful recombination observed from FOXP3$^{FL}$ and FOXP3$^{KO}$ gene edited HSPCs, both of which contain the tNFGR cassettes (adjacent lanes represent biological replicates). Control band targeting non-modified FOXP3 region. (B) FOXP3 editing rates by tNGFR in cord blood-derived HSPCs edited with FOXP3$^{dE2}$ or FOXP3$^{KO}$ constructs (mean±SD). (C) Comparison of editing frequency by two methods of detection: FACS for tNGFR and quantitative in-out PCR using Digital Drop PCR (ddPCR) (three FOXP3$^{FLcoW}$ edited HSPC cell donors each tested in parallel by both methods). (D) Time course of tNGFR expression by flow cytometry on days post-editing, showing an initial tNFGR intermediate population that is resolved over time. (E) Off-target sites predicted bioinformatically using the COSMID tool. Pie chart of the gene region of the predicted off-target sites, showing the majority of sites (96%) in non-coding regions of the genome. (F) Ten off-target sites from GUIDE-seq oligo capture assay in U2OS cells with the closest gene name and number of sequencing reads per site. The FOXP3 sgRNA (plus PAM) sequence shown above and mismatches with off-target sites are highlighted. The number of reads in the FOXP3 on-target site shown for comparison.

Using FOXP3 sgRNA 2, we edited the allele via the HDR-mediated pathway by transducing HSPCs with a FOXP3 DNA repair donor delivered as a recombinant adeno-associated virus of serotype 6 (rAAV6). Similarly, we gene edited CD4+ T cells to enable functional testing on T cells. We detected successful HDR as evidenced by an in-out PCR amplification of genomic DNA (FIGS. 2A and 8A). Precise insertion and the FOXP3 cDNA sequence was confirmed by sequencing analysis (Table 1). Rates of HDR-mediated editing detected by tNGFR expression were 14±7% in primary CD4+CD25high Tregs (n=14), 17±5% in the immortalized MT-2 Treg-like cell line (n=7) (24), 24±10% in CD4+CD25-/low Teff cells (n=21), and 29±8% in HSPCs (n=27) (FIG. 2B). Testing of the alternative constructs, FOXP3dE2 and FOXP3KO, in HSPCs revealed average HDR rates of 26±9% and 23±5% respectively (FIG. 8B). To confirm that tNGFR expression was an accurate measure of editing rates, editing was performed on HSPCs from three cell donors and editing in each donor was tested in parallel by both tNGFR expression and by a quantitative in-out PCR using the Digital Droplet PCR (ddPCR) system (19). We found concordance between the two methods of editing detection, 25±2% editing for tNGFR flow cytometry and 29±5% for ddPCR (n=3), confirming the accuracy of detection (FIG. 8C). Mock treated cells were nucleofected and transduced with rAAV-donor templates in the absence of CRISPR, and showed low levels of background episomal tNGFR expression (FIG. 2C and FIG. 8D). Enrichment of edited cells using the tNGFR maker resulted in a population consistently above 90% purity (FIG. 2C), confirming that tNGFR could be used to isolate a pure population of edited cells.

Example 2

The CRISPR System Enables Specific FOXP3 Gene Editing in HSPCs.

We investigated off-target activity using three complementary methods: bioinformatic prediction, a double strand break (DSB) capture assay, and next generation sequencing (NGS). Initially, 58 potential off-target sites were predicted by bioinformatic in silico prediction using the CRISPR Search with Mismatches, Insertions and/or Deletions (COSMID) tool (25), of which 96% were in non-coding regions of the genome (FIG. 8E, Table 8). Ten off-target sites were identified using DSB capture by GUIDE-seq (26) in the U2OS cell line, of which seven were also predicted by in silico analysis (FIG. 2D and FIG. 8F). The 61 sites predicted by the combination of COSMID and GUIDE-seq were then evaluated in FOXP3 edited HSPCs by NGS. Four sites were validated by NGS, three of which were identified by all three methods. The four sites identified as off-targets were ranked as 1, 3, 4, and 14 by the COSMID algorithm. When excluding a mismatch at the 5' distal nucleotide, none of the validated sites had more than three mismatches. As compared to the NGS-identified indel rates in the FOXP3 gene of 42% and 44% in edited cord blood and bone marrow-derived HSPCs, respectively, all off-target sites had less than 2% targeting (FIG. 2E). None of the validated sites were in coding regions of genes, and based on gene annotation, none of the sites would have a clear impact on hematopoiesis or cell cycle regulation in hematopoietic cells. The results from this off-target analysis suggest that the FOXP3 CRISPR system is a relatively specific platform for gene editing in hematopoietic cells.

Example 3

FOXP3 Edited Tregs Express Persistent FOXP3 Protein and Display Treg Phenotype and Function.

Figure 9:
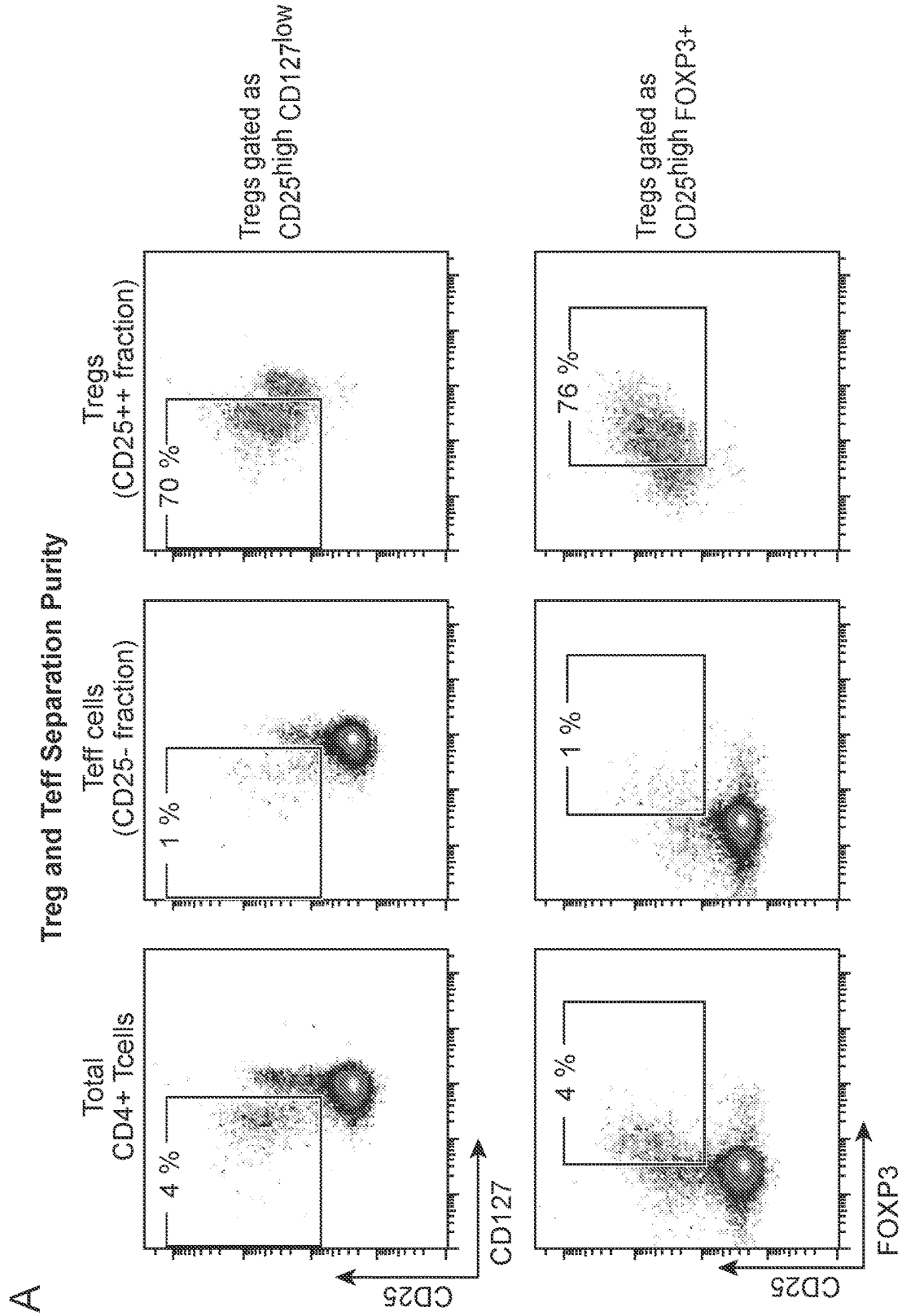
FIG. 9. Tregs and Teff cell populations are effectively separated prior to CRISPR-based editing. (Corresponding to FIG. 3) (A) Purity of the fractionated Treg and Teff cell samples from peripheral blood shown by flow cytometry after anti-CD25 magnetic bead separation using two serial columns (CD25++). Representative flow cytometry plots showing the total population of CD4+ T cells prior to separation (left panel); Teff cell CD25-fraction (middle panel); and CD25++ Treg-enriched fraction (right panel) stained for Tregs in two parallel gating strategies. (B) Frequency of TSDR demethylated Tregs by epigenetic bisulfite qPCR. Shown are CD25− fraction after anti-CD25 magnetic bead separation enriched for Teff cells, CD25++ fraction enriched for Tregs, and MT-2 Treg cell line for comparison.

We next evaluated our FOXP3 cDNA insertion strategy in Tregs, the major cell type that expresses FOXP3 and is implicated in IPEX syndrome. We used the immortalized MT-2 Treg cell line and primary peripheral blood-derived Tregs separated by CD25 enrichment beads. The purity of the primary Tregs was confirmed by flow cytometry and epigenetic TSDR demethylation (FIG. 9A-B). We initially tested FOXP3 expression in MT-2 cells and observed that FOXP3FL edited cells expressed FOXP3 protein, but at a lower level compared to unmodified MT-2 cells (FIG. 3A and FIG. 10A). In contrast, editing with the FOXP3KO construct led to complete loss of FOXP3 protein expression as predicted (FIG. 10B). Insertion of the second isoform of FOXP3 (FOXP3dE2) led to approximately 50% FOXP3 expression relative to WT cells (FIG. 11A), revealing that delivery of either isoform cDNA individually can support a similar level of FOXP3 expression in Tregs. To improve FOXP3 protein expression, we designed two additional constructs: a codon optimized FOXP3 cDNA construct (FOXP3FLco) and the codon optimized FOXP3 construct followed by a woodchuck hepatitis virus posttranscriptional regulatory element (FOXP3co+WPRE or FOXP3FLcoW), added to increase mRNA stability and protein translation (20) (FIG. 3B). The FOXP3co construct yielded similar FOXP3 protein levels to the FOXP3FL construct, whereas the FOXP3FLcoW construct resulted in moderately increased FOXP3 protein expression levels (FIG. 3C).

We next evaluated FOXP3 expression in human peripheral blood-derived CD4+ CD25high Tregs. The pattern of FOXP3 expression from the different donor constructs in MT-2 cells was reflected in peripheral blood-derived Tregs. Tregs edited with the FOXP3FL cDNA expressed a lower level of FOXP3 protein, and a modest increase in FOXP3 protein expression from the FOXP3FLcoW construct was observed (FIG. 3D). While the various cDNA donors were not able to fully reach wild-type levels of FOXP3 protein expression in the MT-2 Treg cell line or primary Tregs, we hypothesized that this level of FOXP3 protein expression might still be sufficient to restore Treg function.

Immunophenotypic analysis for Treg cell markers, including TIGIT, HELIOS, PD1, CTLA-4, and CD25, revealed that all markers were expressed in FOXP3 edited Tregs (FIG. 3E). The average intensity of HELIOS was decreased after editing, but there was no significant difference in HELIOS expression between edited and mock treated samples. Overall, the expression levels of all Treg makers were similar in WT and edited Tregs with no statistically significant differences observed (FIG. 3E). These results suggest that the CRISPR edited Tregs maintain the expression of key proteins characteristic of WT Tregs.

Figure 11:
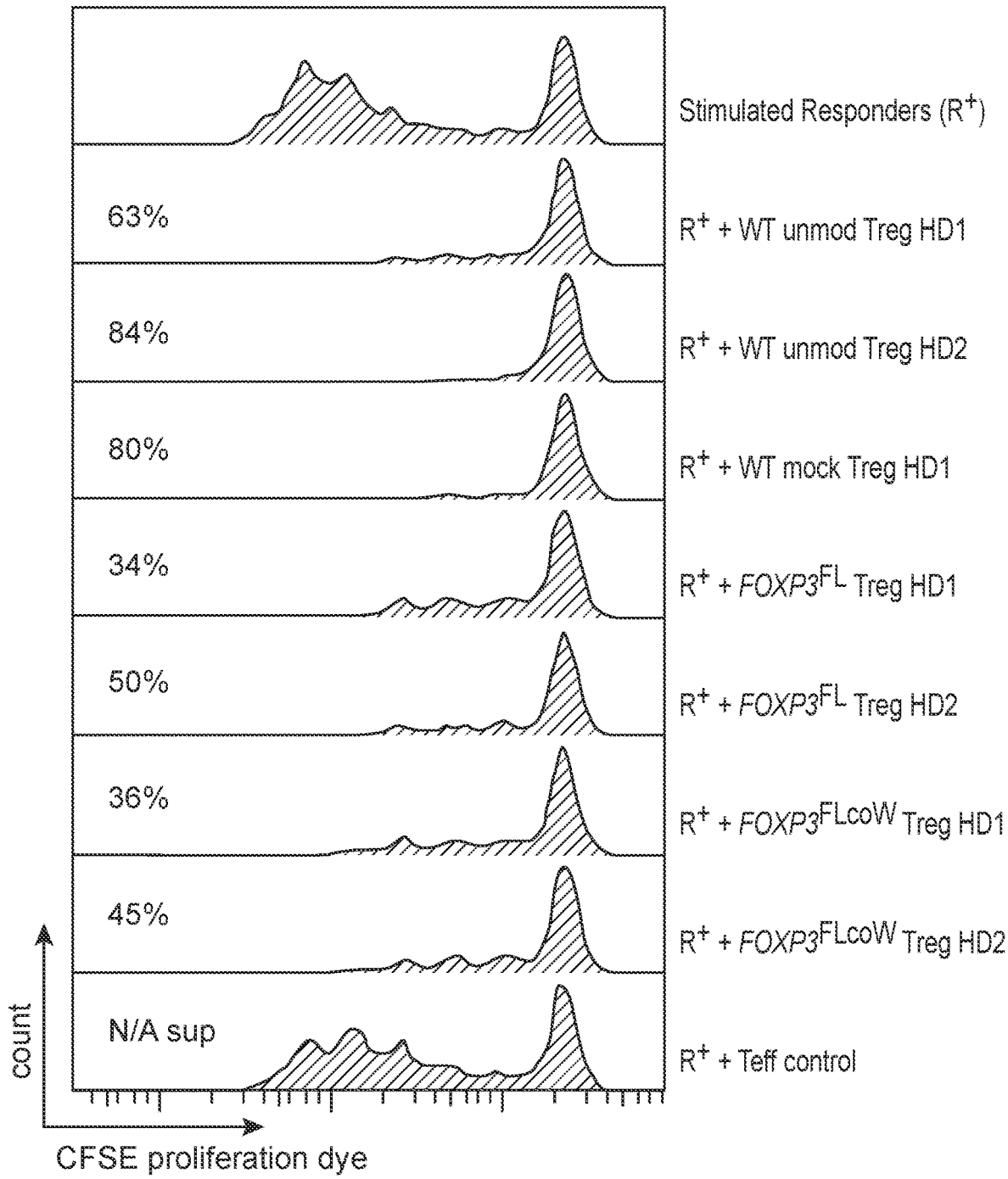
FIG. 11. Tregs edited with different constructs display comparable amounts of FOXP3 function and in vitro suppressive capacity. (Corresponding to FIG. 3) (A) FOXP3 protein expression by flow cytometry in FOXP3$^{dE2}$ edited Tregs compared with wild-type mock treated Tregs (mean±SD, n=2, p<0.05). Data represented as the ratio of FOXP3 median fluorescent intensity (MFI) relative to WT unmodified Tregs, showing roughly half expression (similar to full length cDNA expression). (B) Suppression assay comparing Tregs edited with cDNAs of the two FOXP3 isoforms, FOXP3$^{FLcoW}$ and FOXP3$^{dE2}$. The percent calculated suppression shown to the left. Graph to the right showing quantified suppressive capacity of three matched Tregs samples edited in parallel with the two constructs, showing that both isoforms support a similar level of suppressive function in Tregs. (C) Suppression assay testing the function of Tregs from two healthy donors (HD) edited with FOXP3$^{FL}$ and FOXP3$^{FLcoW}$. The calculated percent suppression of CFSE-labeled stimulated responders (R*) is shown to the left. As a negative control, cultured Teff cells from a parallel FOXP3 editing experiment were used in place of Tregs and were shown to not be suppressive (N/A). (D) Suppression assay demonstrating that FOXP3$^{FLcoW}$ edited Teff cells lack suppressive function as anticipated. The proliferation rate of stimulated responders (R*) is similar to that of responders co-cultured with WT mock treated or FOXP3$^{FLcoW}$ edited Teff cells.
Figure 11:
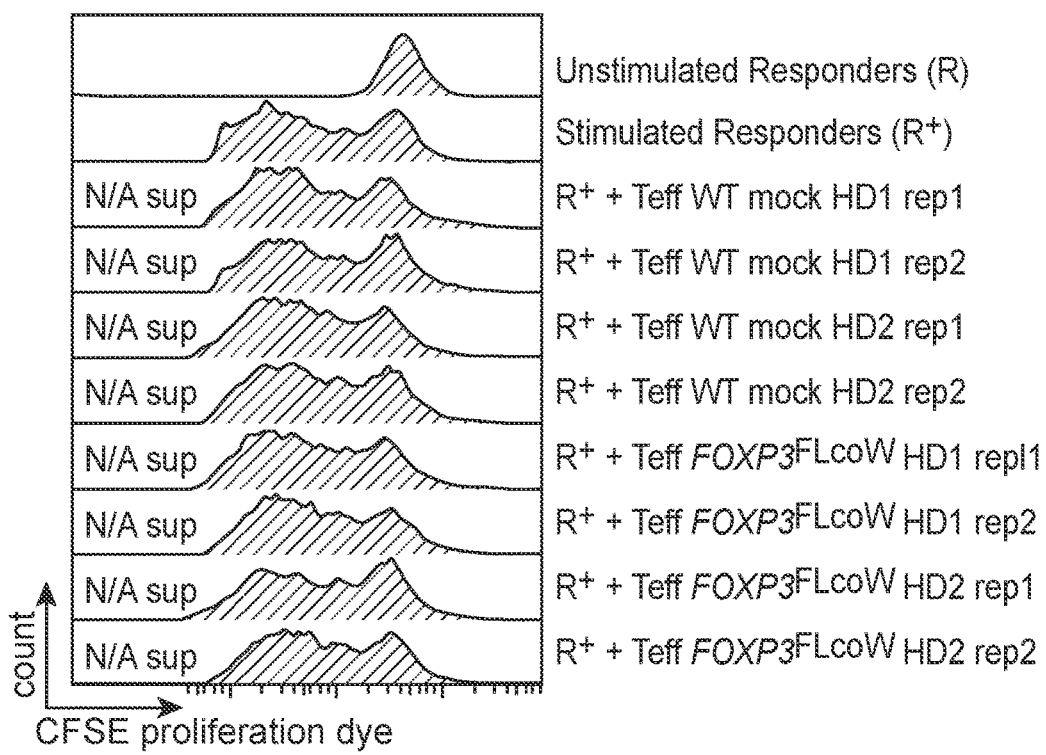

We next tested the function of gene edited Tregs and their hallmark ability to suppress the proliferation of activated Teff cells in a co-culture suppression assay. WT Tregs from healthy donors displayed suppression capacity at an average of 69±17% (mean±SD) (FIG. 3F). In contrast, IPEX Tregs and FOXP3 knockout Tregs displayed diminished suppression at rates of 7±3% and 8±7%, respectively (FIG. 3F). Tregs that were edited with the various FOXP3 cDNA knock-in constructs all displayed suppressive function, although not fully reaching the level of WT Tregs (FOXP3FL 45±12%, n=7, *p<0.05 versus WT; FOXP3co 43±16%, n=2, p=ns; FOXP3FLcoW 50±5%, n=4, p=ns) (FIG. 3F). In addition, we tested the suppressive function of FOXP3dE2 Tregs and found them to perform comparably to FOXP3FL and FOXP3FLcoW edited Tregs (FIG. 11B-C). As a negative control, FOXP3FLcoW edited Teff cells that were cultured and edited in parallel were tested and found to lack suppressive function (FIG. 11C-D). Given the ability to suppress Teff proliferation and the relatively higher FOXP3 expression, we selected the FOXP3FLcoW construct for subsequent functional testing. Overall, FOXP3 cDNA knock-in Tregs displayed suppressive function that overlapped with lower normal range of suppressive function observed in WT Tregs from different donors, suggesting that editing might be sufficient to restore suppressive capacity to non-functional Tregs Example 4

FOXP3 Gene Editing Permits Physiologically Regulated FOXP3 Expression and Preserved Function in Teff Cells.

Figure 12:
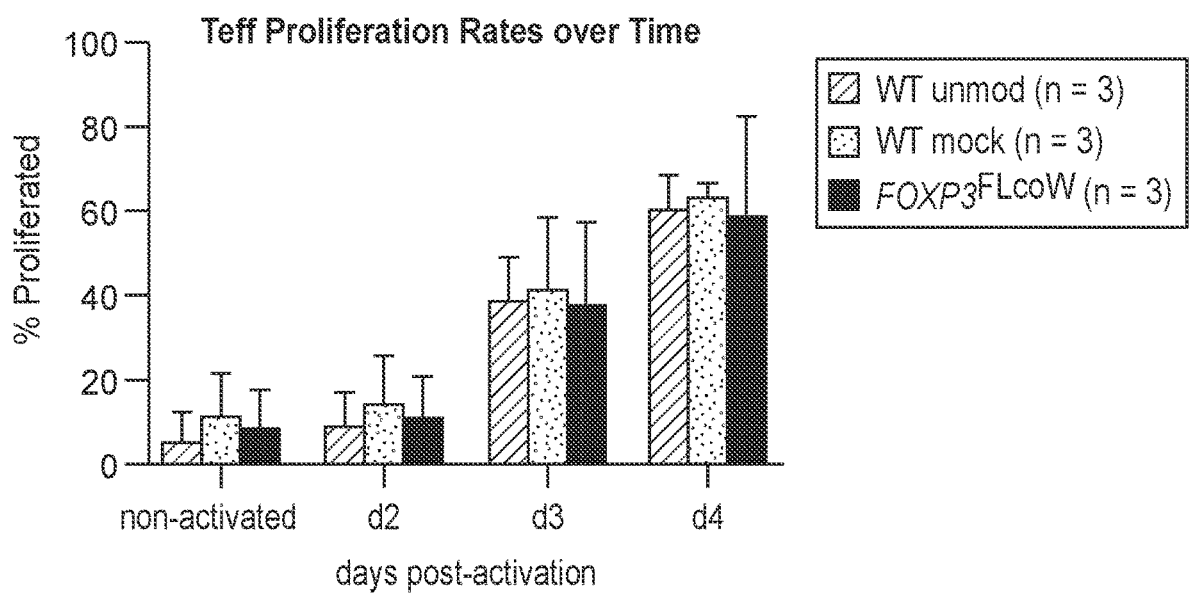
FIG. 12. FOXP3 gene editing preserves Teff cell proliferative function. (Corresponding to FIG. 4) Time course of proliferation of Teff cells after activation with anti-CD3/28 beads (1:100 bead:cell ratio), showing progressive proliferation on subsequent days 2, 3, and 4 post-activation. Non-activated cells included for comparison and show some residual proliferation due to pre-editing activation and culturing. The wild-type Teff cells are compared to FOXP3$^{FLcoW}$ edited Teff with no statistically significant differences observed (mean±SD, n=3, p=ns).

Because Teff cells transiently express FOXP3 upon TCR activation, we monitored FOXP3 protein expression in FOXP3 edited Teff cells by flow cytometry over a two week time course after activation. In non-activated cells, a low level of background FOXP3 expression was observed, likely due to the pre-editing activation and culturing (FIG. 4A). Upon TCR-mediated re-activation, FOXP3 expression in both edited cells and controls was induced and nearly doubled by day three before gradually returning to baseline (FIG. 4A). Overall, the regulation of FOXP3 expression in Teff cells closely mirrored that in WT controls without statistically significant differences, confirming that endogenous regulation of expression was preserved. In addition to FOXP3 expression, we evaluated the cytokine production profile and proliferation potential of gene edited Teff cells and controls to demonstrate that the intrinsic regulatory effect of FOXP3 was maintained. High levels of interferon-gamma (IFN-γ) and low levels of IL-2 were produced in both WT and FOXP3 edited Teff cells (FIG. 4B). Interleukin-17 (IL-17) production was higher in FOXP3 edited Teff cells, but not statistically different as compared to the WT control (FIG. 4B). In addition, all edited and non-edited Teff cells displayed similar kinetics of activation-induced proliferation over time that was dependent on the strength of activation (FIG. 4C and FIG. 12). Together, these results indicate that FOXP3 edited Teff cells maintain physiological regulation of FOXP3 expression, cytokine production, and proliferation.

Example 5

CRISPR-Based Editing Restores Functional FOXP3 Expression to IPEX Patient Tregs and Teff Cells.

Figure 5:
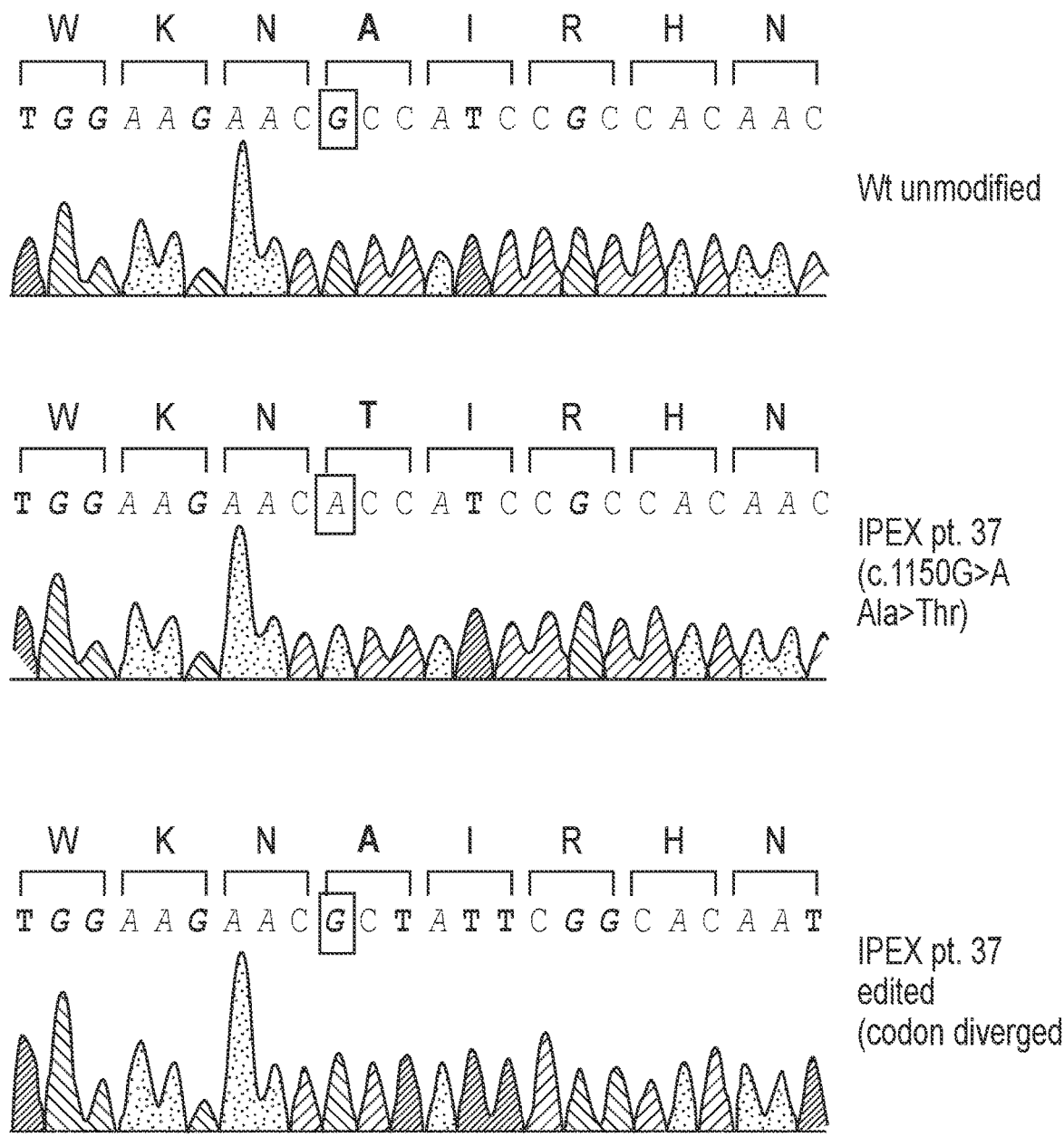
FIG. 5. CRISPR-based editing enables FOXP3 gene correction in IPEX patient cells. (A) Schematic of FOXP3 gene highlighting mutations of patients involved in this study. (B) Editing of IPEX and HD T cells observed at the DNA level by in-out PCR strategy. Forward primer is in the tNGFR cassette and the reverse primer is in the FOXP3 gene locus outside the 3' arm of homology. Positive and negative fractions after tNGFR enrichment (+/−) analyzed by PCR. (C) Flow cytometry plots of tNGFR staining. (D) Expression of FOXP3 mRNA demonstrated by RT-PCR in activated IPEX and HD T cells (schematic mRNA isoforms shown to the right of corresponding PCR product bands). After ladder, first lane represents WT cells with two naturally occurring alternatively spliced isoforms, FL and dE2. The second lane shows aberrant skipping of E1 in IPEX pt24 mRNA that results in truncated transcripts. The third lane shows edited IPEX cells with restoration of the FL mRNA. (E) Sanger sequencing showing c.1150G>A mutation in the mRNA of pt37, resulting in an Ala>Thr change, and CRISPR-based insertion of divergent FOXP3 cDNA restoring correct amino acid sequence. (F) Proliferation of Teff cells in response to activation measured by the proliferation assay, comparing HD WT cells and IPEX pt78 cells. Quantification of average proliferation response of Teff cells from proliferation assay at day 3. (G) Functional testing of gene edited IPEX Tregs using the in vitro suppression assay. Flow cytometry plots of CFSE-stained Teff responder cells (R) cultured with or without Tregs. Calculated suppressive potential shows diminished suppressive function of IPEX patient 64 Tregs, which was partially restored by FOXP3 gene editing.
Figure 5:
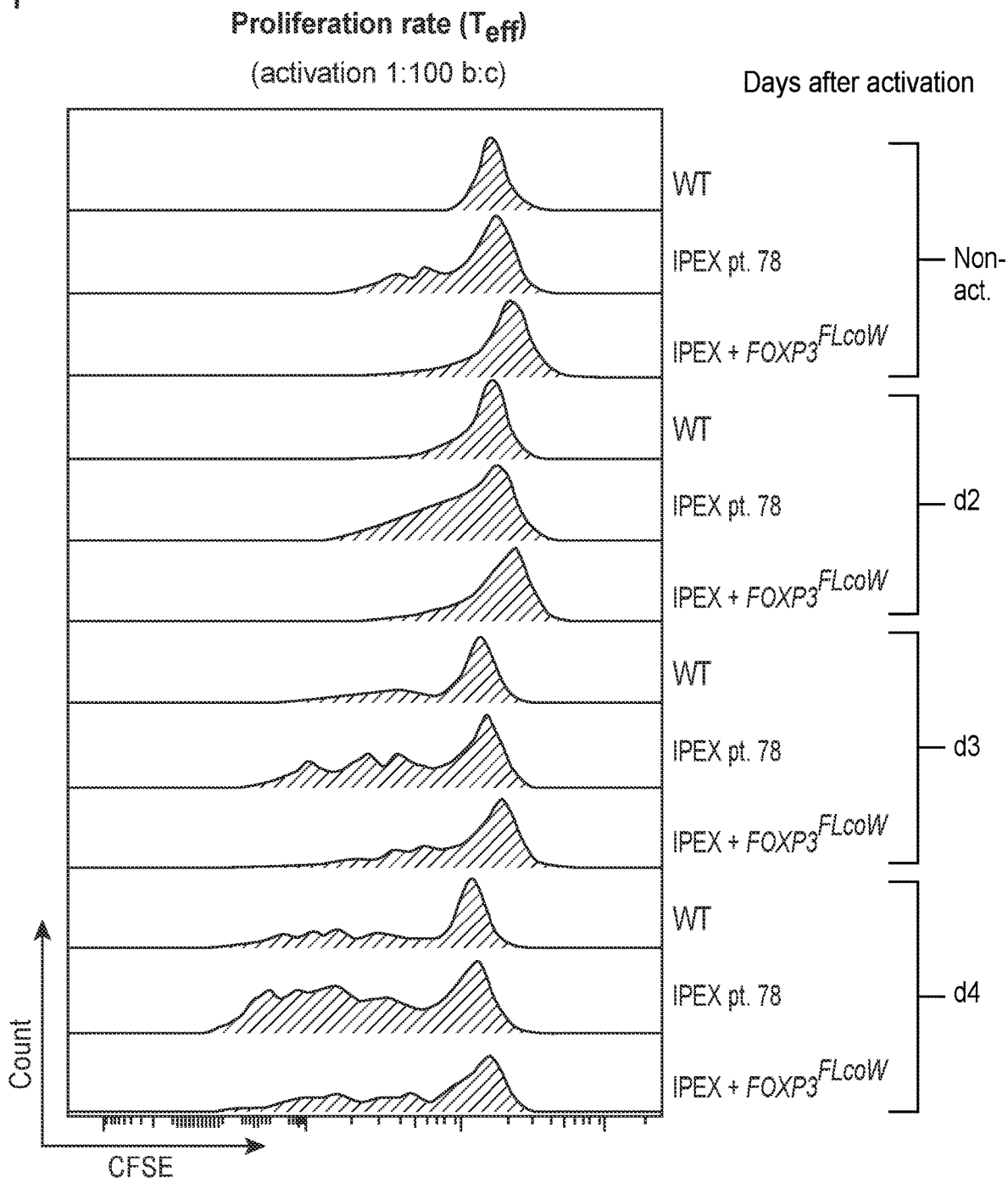

We obtained cells from six IPEX patients including two sets of brothers with identical pathologic mutations (mutation locations depicted in FIG. 5A; see Table 9 for patient information). Mutations ranged from point mutations to complete abrogation of gene expression.

Gene editing of IPEX T cells using the FOXP3 CRISPR system resulted in precise HDR-mediated editing as revealed by in-out PCR of the edited locus (FIG. 5B).

Additionally, HDR rates determined by tNGFR expression revealed that IPEX cells could all be targeted with comparable efficiency as healthy donor cells (FIG. 5C, editing rates for IPEX pt. 24 and 64 shown and were reproduced in pt. 37, 65, 77, and 78). Gene editing restored expression of FOXP3 in gene edited IPEX T cells harboring different mutations.

We edited IPEX patient 24 (pt.24) cells, which harbor a c.210+1G>C mutation that disrupts the exon-intron boarder of the first coding exon and leads to aberrant exon 1 (E1) skipping (27). FOXP3 mRNA isoforms in this patient are shorter due to the missing E1 as shown by RT-PCR (FIG. 5D). Gene editing of FOXP3 in IPEX pt. 24 cells with the full length FOXP3 cDNA construct restored expression of the full length FOXP3 mRNA isoform (FIG. 5D). We also analyzed mRNA expression after gene editing of T cells from IPEX pt. 37, carrying a c.1150G>A mutation that leads to an alanine to threonine amino acid change. RT-PCR and Sanger sequencing revealed that the edited pt. 37 cells expressed FOXP3 mRNA from the inserted FOXP3 codon diverged cDNA construct, as confirmed by a restoration of a codon encoding for the correct alanine residue (FIG. 5E). Additionally, the entire mRNA was sequenced to ensure that precise HDR-mediated FOXP3 cDNA insertion led to the predicted full length mRNA encoding WT FOXP3 protein. Together, these results provide evidence that the FOXP3 CRISPR system can be used to restore expression of FOXP3 in T cells from IPEX patients with diverse mutations. We next evaluated proliferative responses of FOXP3 gene edited Teff cells from IPEX pt. 77 and 78. Compared with WT healthy donor Teff cells, the Teff cells from both pt. 77 and 78 proliferated at an accelerated rate (FIG. 5F), consistent with previous findings that FOXP3 loss leads to hyperproliferation (12). FOXP3 gene editing was able to normalize proliferation rates closer to the level of healthy donor Teff cells, showing that restoration of FOXP3 expression reestablished regulation of proliferation in IPEX Teff cells (FIG. 5F). To test for restoration of Treg suppressive activity in IPEX cells, we gene edited Tregs of IPEX pt. 64. The WT Tregs from healthy donors displayed suppressive function (40%) in co-culture conditions with Teff responder cells, whereas IPEX pt. 64 Tregs showed diminished suppressive function (4%) (FIG. 5G). Gene editing of IPEX pt. 64 Tregs with the FOXP3FLcoW construct was able to increase suppressive function (32%) near the levels typical of healthy donor edited cells (FIG. 5G), and these results were confirmed on two independent blood draws. Taken together, the results from functional analyses of edited IPEX Treg and Teff cells show that FOXP3 correction using the CRISPR system restores physiological regulation of wild-type FOXP3 expression and has the potential to provide a functional benefit to IPEX patient cells.

Figure 6:
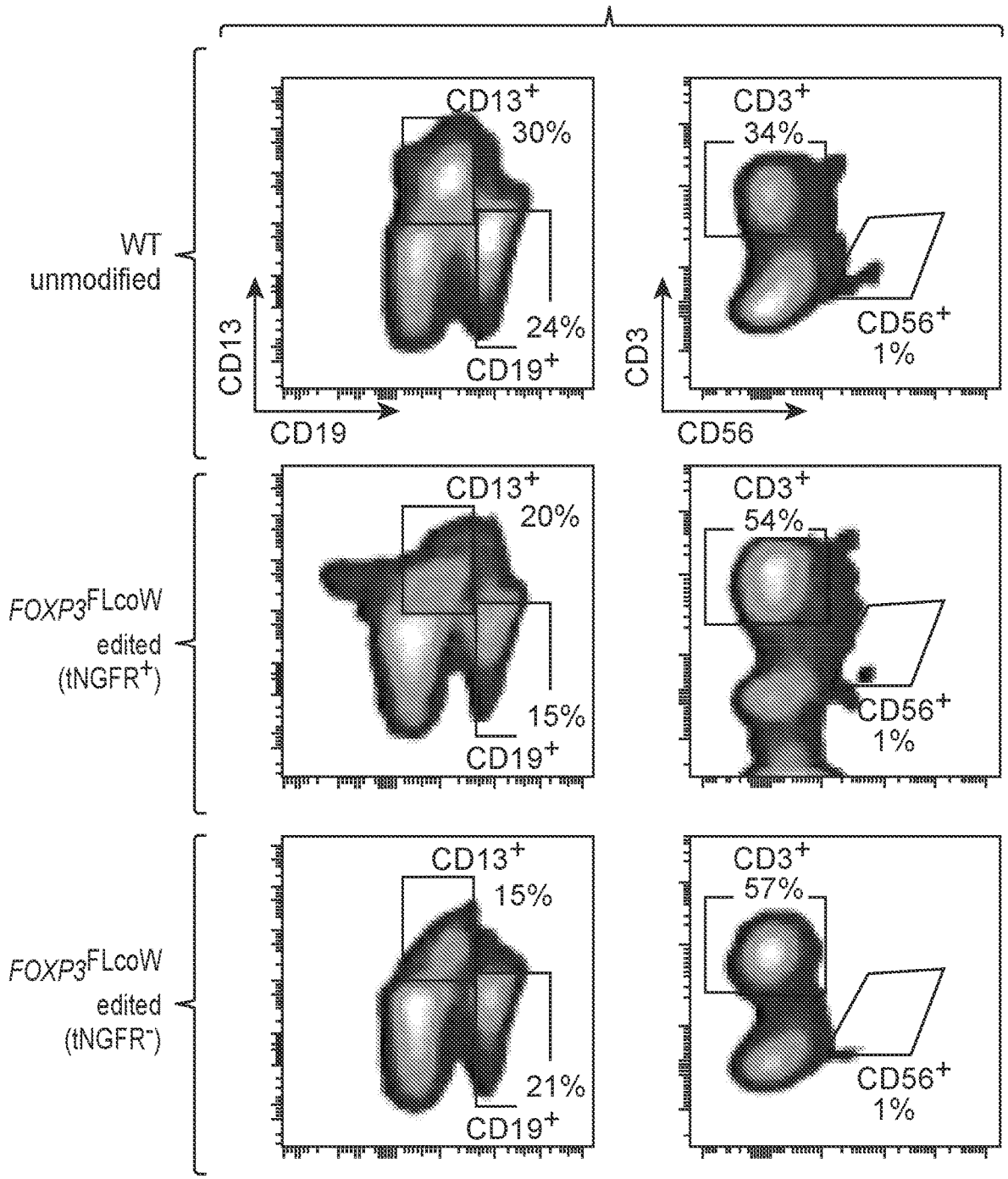
FIG. 6. FOXP3 edited HSPCs undergo multilineage hematopoietic differentiation and engraft in vivo. (A) Differentiation potential of edited HSPCs tested by the in vitro colony forming unit (CFU) assay. Four resulting hematopoietic progenitor colony types: CFU-E (mature erythroid progenitors), CFU-GEMM (granulocyte, erythrocyte, macrophage, megakaryocyte), BFU-E (primitive erythroid progenitors), and CFU-GM (granulocyte and macrophage progenitors). Representative images of colonies from the CFU assay, showing similar morphology (10× magnification). (B) Experimental timeline of hu-mouse study using NSG-SGM3 mice. (C) Human engraftment kinetics in the peripheral blood of hu-mice at corresponding weeks post-injection. Engraftment measured by flow cytometry for hCD45 marker on human cells, and frequency quantified relative to the total of human (hCD45+) and mouse (mCD45+) cells (mean±SD). (D) Representative flow cytometry plots of engrafted human hematopoietic subsets in the bone marrow (left) and spleen (right) of hu-mice at 14 weeks post-injection by flow cytometry. Populations gated out of human cells (hCD45+). FOXP3 edited samples were divided into tNGFR+ and tNGFR− gates for comparability. (E) Quantification of human hematopoietic lineages by flow cytometry with each symbol representing a single mouse (mean±SD). In spleen, the CD8+, CD4+, and CD4+ CD8+ double positive (DP) populations were gated out of CD3+ T cells. The CD25+ FOXP3+, naive CD45RA+, and memory CD45RA− populations were gated out of CD4+ single positive T cell subset.
Figure 6:
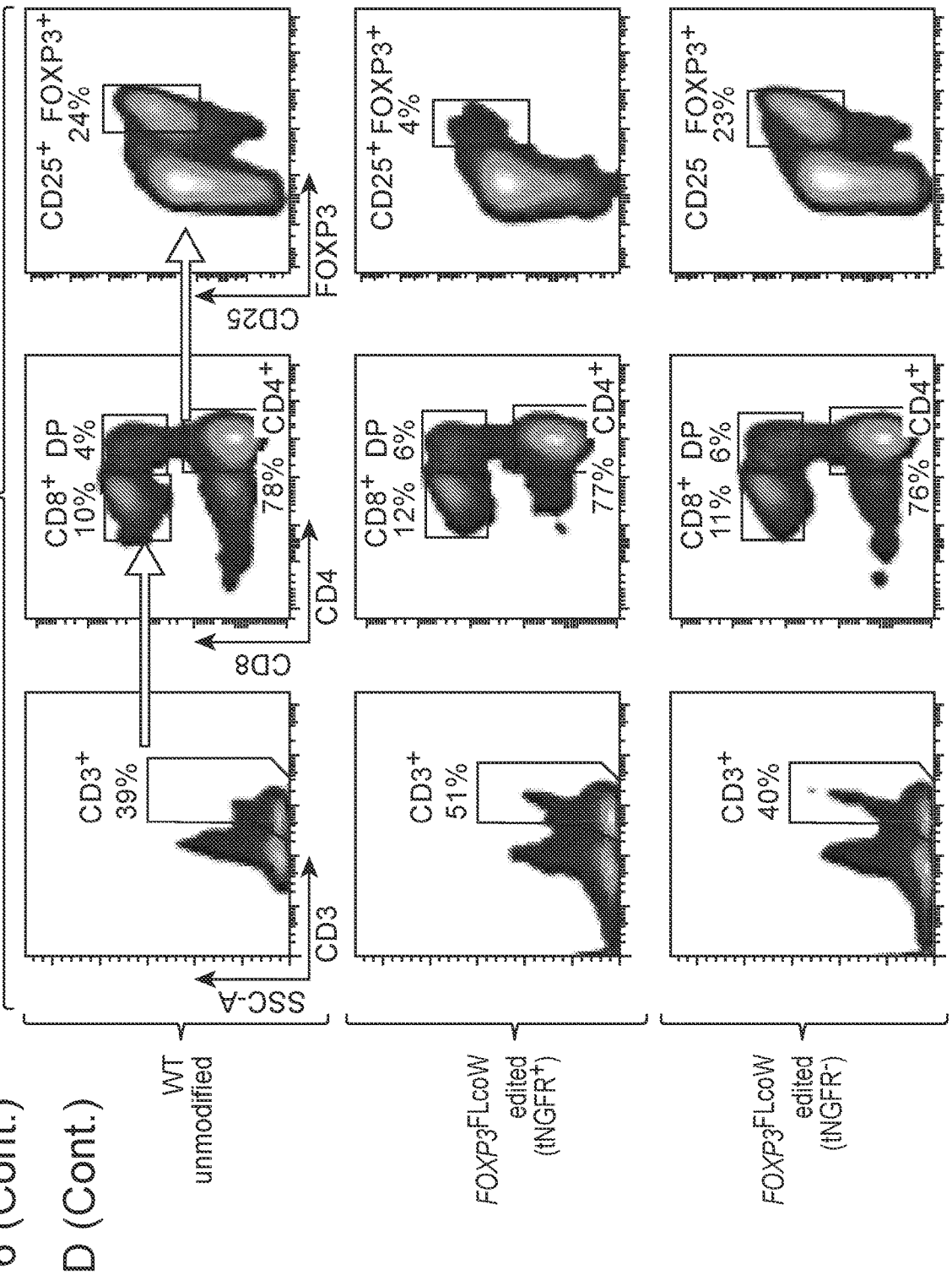
Figure 13:
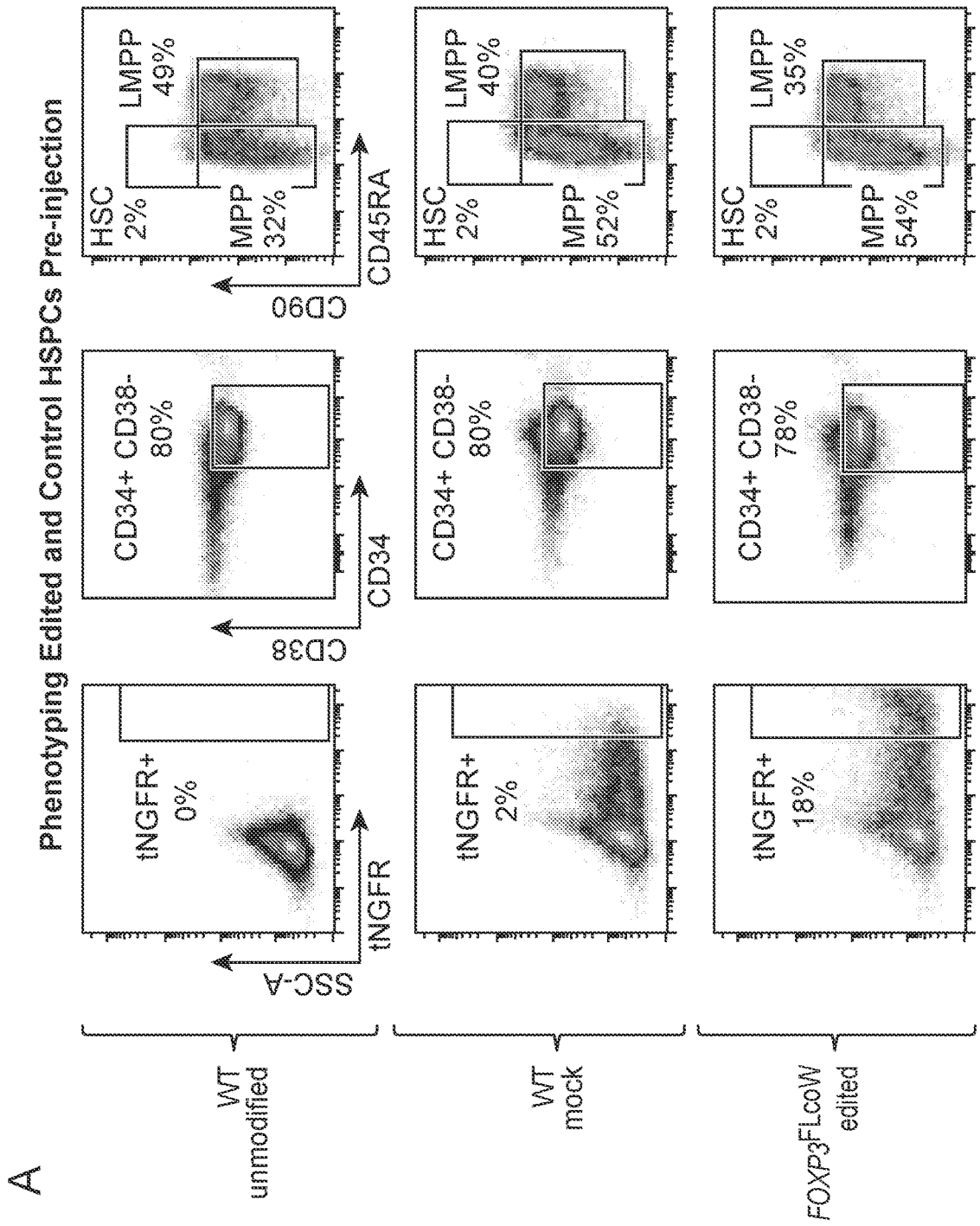
FIG. 13. FOXP3 edited HSPCs retain multi-lineage engraftment and differentiation potential. (Corresponding to FIG. 6) (A) Phenotypic analysis of edited and control HSPCs pre-injection by flow cytometry, evaluating editing rates (tNGFR+), CD34+ purity, and different HSPC subsets including lymphoid-primed multipotent progenitors (LMPP, CD34+CD38− CD45RA+CD90−/v), multipotent progenitors (MPP, CD34+CD38−CD45RA−CD90−), and HSCs (CD34+CD38−CD45RA−CD90+). (B) Survival curve of mice engrafted with HSPCs from 3 experimental conditions over time. (C) Persistence of edited tNGFR+ cells engrafted in the hu-mouse at wk 14 demonstrated by flow cytometry. (D) Quantification of tNGFR+rates in hu-mouse bone marrow at wk 14 showing different cord blood HSPC donors. (E) Genomic analysis showing percentage of cells with unmodified wild-type FOXP3 alleles (blue), alleles edited by NHEJ and containing indel mutations (gray, TIDE analysis), and alleles edited by HDR (red, ddPCR in-out PCR). Shown is the genotype of HSPCs pre-injection (left) and in hu-mouse bone marrow at wk 14, demonstrating that FOXP3 edited cells do not expand abnormally in vivo. (F) Functional testing of in vivo-differentiated CD4+ CD25− Teff cells sorted from the hu-mouse spleen. CFSE-stained Teff cells were stimulated with 1:100 and 1:25 b:c ratio using anti-CD3/28 beads and the proliferation rate was monitored by flow cytometry at day 4 post-stimulation. FOXP3 edited Teff cells were sorted into tNGFR+ and tNGFR− fractions. Human peripheral blood-derived Teff cells were included for reference. (G) Suppression assay on CD4+CD25+ Tregs sorted from hu-mouse spleen. Flow cytometry plots of CFSE-stained responders stimulated with 1:25 b:c ratio. FOXP3 edited Tregs were sorted into tNGFR+ and tNGFR fractions and co-cultured with responders.
Figure 13:
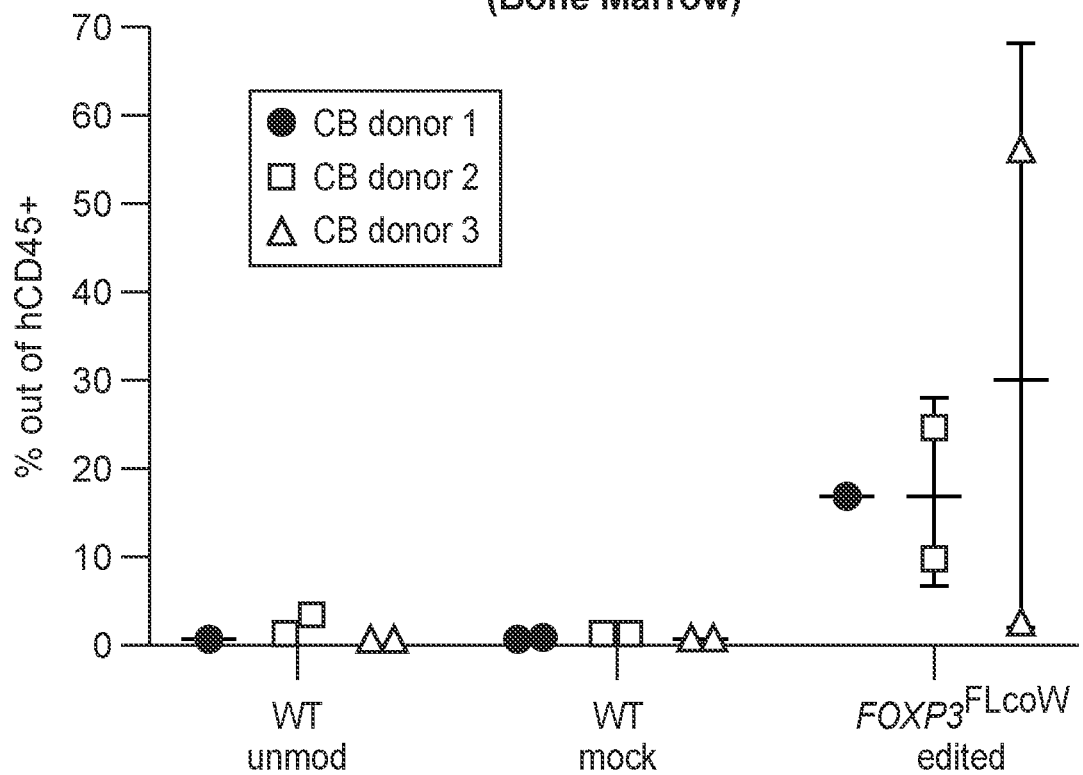
Figure 13:
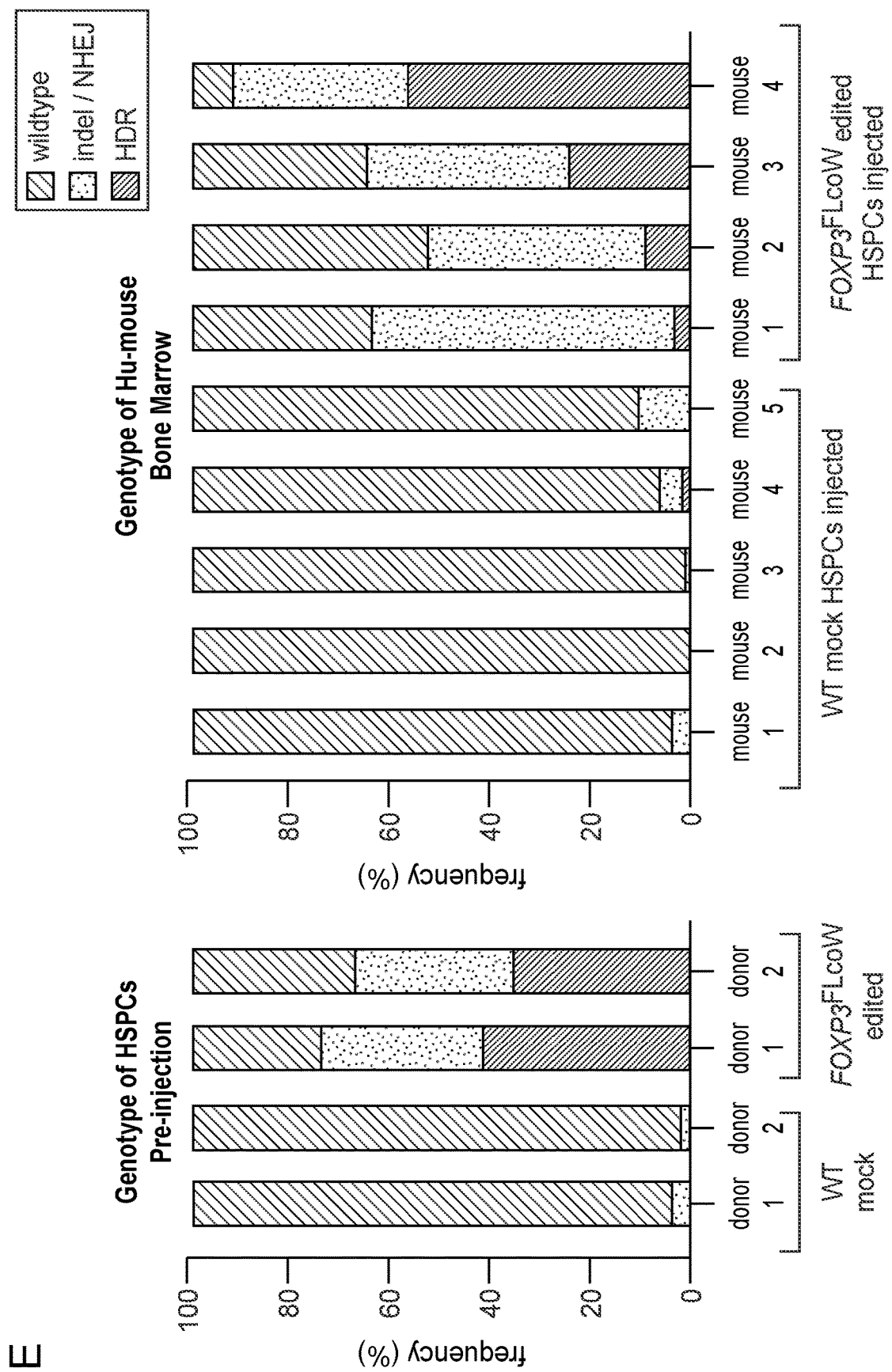

We then evaluated the differentiation potential of FOXP3 edited HSPCs using in vitro and in vivo approaches to confirm safety and feasibility. We performed in vitro colony-forming unit (CFU) assays to test the short term differentiation of FOXP3 edited HSPCs into myeloid and erythroid lineages. As compared to WT controls, the FOXP3 edited HSPCs differentiated into hematopoietic progenitor colonies at similar rates with no statistically significant differences (FIG. 6A). We then tested the in vivo engraftment and multi-lineage reconstitution of edited HSPCs in a humanized mouse (hu-mouse) model. FOXP3FLcoW edited and control HSPCs (WT unmodified and WT mock) were injected into the liver of three to four day old neonatal immunodeficient mice, and engraftment was monitored over a 14 week time course (FIG. 6B). The NSG-SGM3 strain of mice was selected for engraftment studies due to their expression of several human cytokines and their reported higher proportion of FOXP3+ Tregs relative to standard NSG mice (28). Prior to injection, edited HSPCs were phenotyped by flow cytometry for purity (%0D34+) and markers of hematopoietic progenitor subsets (FIG. 13A). Gene edited and control HSPCs from three cord blood donors were injected, without prior enrichment for tNGFR, into three corresponding litters of mice. A total of 27 mice were injected, including ten FOXP3FLcoW edited, nine WT unmodified, and eight WT mock conditions. The overall survival of the mice over the course of the study was comparable among conditions (FIG. 13B). Human cell engraftment, determined by flow cytometry analysis of hCD45+ expression, steadily increased over time in the peripheral blood of the mice and was found to be comparable among conditions with no statistically significant differences (FIG. 6C).

Multi-lineage human engraftment was observed in the peripheral blood, bone marrow, and spleen in all experimental mice (FIG. 6D-E). The tNGFR+ edited cells persisted in vivo (FIG. 13C-E), although three mice were excluded for having less than 5% tNGFR+ cells. Analysis of editing rates comparing the proportion of alleles edited by HDR (cDNA insertion) and NHEJ (indels) relative to WT alleles in the bone marrow of the mice revealed similar proportions to that of the edited HSPCs prior to injection with no apparent abnormal expansion of edited cells (FIG. 13E). The hematopoietic lineages were analyzed by flow cytometry and among the edited conditions, the cells were sub-gated into tNGFR+ and tNGFR− fractions for comparison (FIG. 6D-E). We observed the presence of CD34+ HSPCs, CD56+ NK cells, CD13+ myeloid cells, CD19+ B cells, and CD3+ T cells in the bone marrow of FOXP3FLcoW edited (tNGFR+ and tNFGR− fraction) and control mice (FIG. 6D-E). T cell subsets were further evaluated in the spleen, with CD3+, CD4+ single positive, CD8+ single positive, CD4+CD8+ double positive, CD4+CD25+FOXP3+ Tregs, memory CD4+CD45RA−, and naive CD4+CD45RA+ T cells all present in both FOXP3FLcoW edited (tNGFR+ and tNFGR− fraction) and control mice (FIG. 6D-E). Some differences in the frequencies of cell subsets were observed between conditions, such as higher proportion of CD3+ cells and a lower proportion of CD25+FOXP3+ cells in the tNGFR+ fraction. However no overt changes to immune reconstitution were observed and each hematopoietic cell lineage was represented among the different experimental conditions (FIG. 6E).

To test the function of Tregs and Teff cells derived from in vivo differentiation of edited HSPCs, we sorted CD3+ CD4+ Tcells from hu-mouse spleens and separated them into CD25high (Treg) and CD25low (Teff) fractions. The Treg and Teff fractions from the edited conditions were further sorted into tNGFR+ and tNGFR− fractions. The purity of FOXP3+ Tregs within the CD25high-sorted fraction was tested by epigenetic TSDR demethylation analysis and found to be above 78% for the WT unmodified, mock, and FOXP3FLcoW edited tNGFR−, and undefined for tNGFR+ fraction due to low cell count. Teff cells derived from the hu-mouse were found to proliferate at comparable rates to control human peripheral blood-derived Teff cells (FIG. 13F). Among hu-mouse-derived Teff cells, all conditions proliferated at similar rates in a dose-dependent manner relative to the strength of activation (FIG. 13F). Additionally, the CD25high-sorted cells were found to be suppressive upon co-culture with responder Teff cells, and the FOXP3FLcoW edited Tregs displayed comparable suppressive capacity to WT controls (FIG. 13G). Overall, these results demonstrate that FOXP3 edited HSPCs can engraft in

Discussion

Monogenic immune and blood disorders are prime candidates for gene therapy approaches that target autologous HSPCs. Traditionally, viral vectors, such as lentiviral vectors, that integrate gene cDNAs semi-randomly in the genome have been used for gene therapy. While lentiviral vectors have proven to facilitate efficient gene delivery and are now being widely tested in clinical trials, they are limited in their ability to preserve locus-specific endogenous regulation of gene expression. For this reason, site-specific gene editing has been emerging as a therapeutic approach for the delivery of genes that are regulated by a complex network of non-coding elements. Here, we developed a gene editing approach for IPEX syndrome, which is a prototypical genetic autoimmune disease with unmet medical need. We harnessed site-specific gene editing by the CRISPR system to insert a FOXP3 cDNA into the endogenous gene locus, preserving spatiotemporal regulation by endogenous regulatory elements.

Using the CRISPR methodology, we efficiently and specifically edited FOXP3 in HSPCs, and in the two main cell types that express FOXP3, Tregs and Teff cells. FOXP3 edited HSPCs did not express FOXP3 protein, whereas edited Teff cells transiently expressed FOXP3 after activation, and edited Tregs persistently expressed FOXP3. This cell-type specific expression is consistent with endogenous expression patterns. Edited HSPCs maintained their differentiation potential and displayed a safe off-target profile. Transient FOXP3 expression in Teff cells from healthy donors and IPEX patients allowed for maintenance of normal proliferative potential and cytokine production capacity. Persistent expression of FOXP3 in Tregs preserved their phenotype and ability to suppress T cell function. The level of FOXP3 expression in edited Teff cells closely mirrored that of WT cells, while edited Tregs displayed partial FOXP3 protein expression. This cell type distinct result could be attributed to the fact that Tregs physiologically express a much higher level of FOXP3 than activated Teff cells. Although the level of FOXP3 expression in edited Tregs led to average suppressive function less than that of WT Tregs from normal donors, the suppressive rates of edited cells were still within the lower range of non-edited normal donor function. The range in suppressive function among healthy donor Tregs highlights the variability of in vitro regulatory function among individuals. Importantly, restoration of a similar level of FOXP3 expression in IPEX patient Tregs was sufficient to reestablish suppressive activity in co-culture with Teff cell responders.

By utilizing the CRISPR system, we avoided the delivery of FOXP3 under a constitutive promoter and subsequent FOXP3 overexpression, as in our previously developed LV-EF1α-FOXP3 vector platform. The CRISPR gene editing approach prevents the detrimental effects on HSPC proliferation and differentiation caused by FOXP3 constitutive overexpression. In general, limitations of LV-mediated delivery include the effect of vector copy number on transgene expression and the potential for position effect variegation. For example, the therapeutic gene could be silenced if positioned into a non-expressed locus, or overexpressed if integrated into a site proximal to a strong promoter or enhancer. Additionally, the semi-random insertion of the transgene promoter and enhancer elements into the genome may raise concerns of inadvertently activating proto-oncogenes or genes that would be detrimental to hematopoiesis. These concerns underscore the benefits of site-specific gene editing as a more precise method for therapeutic gene delivery.

In this study, the CRISPR system enabled efficient HDR-mediated editing of FOXP3 in HSPCs, the cell type used for autologous HSPC transplantation and long term reconstitution of the immune system. In HSPCs, the overall targeted integration frequency was 29±8% when using tNGFR marker to identify targeted cells. In prior studies, we observed that targeting frequency increased to 50% or greater when the HDR donor was shortened by removal of the tNGFR marker gene. While the tNGFR marker facilitates enrichment of edited cells for functional testing, it may not always be necessary in clinical settings. The marker gene could potentially be removed to improve editing rates if it becomes apparent that selection and tracking of tNGFR expressing cells is not essential.

HSPCs can be used for autologous transplant, or CRISPR system could be applied to adoptive cell therapy using differentiated T cells or T cell precursor cells. Additionally, the efficient CRISPR-based editing of T cells facilitated functional testing of edited Tregs and Teff cells. The T cell functional assays performed in this study used the codon optimized divergent FOXP3 cDNA sequence followed by a WPRE element, which was expected to provide optimal protein expression. Different codon diverged sequences can be used in Tregs, and modifications to the CG content of the cDNA could be examined. Expression from the endogenous FOXP3 gene and translation of FOXP3 protein may be enhanced by endogenous intron-exon splice sites and 3'UTR elements. Modifications to the construct aimed at improving expression can include incorporation of short exogenous intronic sequences or 3'UTRs from genes highly expressed in Tregs.

Based on the knowledge that two major spliced isoforms of FOXP3 are expressed in human T cells, FOXP3$^{FL}$ and FOXP3$^{dE2}$, both isoforms may be required to reach wild-type levels of FOXP3 expression in Tregs. CRISPR-mediated knock-in uses endogenous FOXP3 promoters and enhancers and allows each isoform to be expressed individually under physiological conditions. Although expression of each isoform was only ~50-60% of wild-type levels, each isoform alone at that level was able to support suppressor function within the lower range of healthy donor cells. Nonetheless, the ability to deliver individual isoforms into the endogenous locus allows the FOXP3 CRISPR system to be used as a tool to investigate the FOXP3$^{FL}$ and FOXP3$^{dE2}$ isoforms individually. For therapeutic purposes, co-delivery of both FOXP3$^{FL}$ and FOXP3$^{dE2}$ cDNAs and subsequent simultaneous expression of both isoforms in may find use.

The FOXP3 CRISPR system was similarly used as a tool to study the effects of complete FOXP3 knockout (FOXP3$^{KO}$). We observed that FOXP3 loss in Tregs ablated suppressive function. The tNGFR marker was used to isolate a pure population of FOXP3$^{KO}$ cells for functional analysis. The ability to purify FOXP3 null cells makes this approach superior to an incomplete knockdown or heterogeneous indel-mediated knockout of FOXP3 as previously used to investigate the effects of FOXP3 loss. Thus, the FOXP3 CRISPR system allows for the creation of IPEX-like cell models in more readily available healthy donor cells. Similarly, the CRISPR system can be used to knock-in FOXP3 cDNAs harboring patient-specific mutations, that provide insight into the molecular mechanisms underlying the heterogeneity of clinical presentation in IPEX syndrome.

While FOXP3 loss in both FOXP3K$^{KO}$ and IPEX Tregs abrogated suppressive function, FOXP3 cDNA knock-in Tregs displayed in vitro function and maintained characteristic Treg phenotypic markers. Transplanted IPEX patients with low overall chimerism of donor cells can still undergo tremendous disease regression, especially due to the fact that the Treg compartment shows a selective advantage toward donor cells. Similarly, carrier mothers display a selective advantage in the Treg compartment such that the mutated FOXP3 allele is predominantly located in the inactivated X chromosome, while the wild-type allele of FOXP3 is expressed from the active X chromosome in the Treg compartment. These observations highlight the selective advantage of cells harboring a wild-type copy of FOXP3, and demonstrate that a small subset of WT Tregs can exert a strong protective effect against autoimmunity. Indeed, we observed that FOXP3 CRISPR gene editing of IPEX cells led to several improvements, including restoration of wild-type FOXP3 expression, increased Treg suppressive function, and normalization of Teff cell proliferation rates.

We evaluated the differentiation potential of FOXP3 edited HSPCs using a combination of in vitro and in vivo testing. The differentiation of edited HSPCs into myeloid and erythroid lineages was confirmed in vitro. The in vivo studies demonstrated engraftment and multilineage hematopoietic reconstitution and allowed us to observe lymphocyte lineages in more depth. The gene edited cells (tNGFR+ population) persisted in vivo, although in some mice the percentage of tNGFR+ cells was lower than that in the edited HSPC population pre-injection. This decrease could be due to several factors including the previously observed preferential editing of short term progenitor cells over long term HSCs and the decrease in cell viability post-gene editing. However, the lack of expansion of edited cells alleviates any general concerns of clonal expansion of genetically modified cells. This notion is further underscored by the comparable survival rates of hu-mice engrafted with edited and non-edited HSPCs over the course of the study. While there were some differences in cell population frequencies among conditions, there were no major changes or skewing in immune reconstitution. A decrease in the proportion of FOXP3+ CD25+ cells in the tNGFR+ edited condition was found, possibly due to lower FOXP3 protein expression in edited cells. However, edited FOXP3+ Tregs isolated from the hu-mouse spleen were found to possess similar suppressive capacity as WT counterparts. Additionally, hu-mouse-derived FOXP3 edited Teff cells were found to be functional in vitro and proliferate at comparable rates to WT Teff cells. These functional assays demonstrate that FOXP3 edited HSPCs retain the capacity to give rise to functional Tregs and Teff cells in vivo.

These results demonstrate the utility of the FOXP3 CRISPR system to gene correct autologous HSPCs, T cell precursors, or Treg cells directly for clinical purposes. The CRISPR system can be used for FOXP3 gene repair in IPEX HSPCs for autologous transplantation, circumventing the need to find immunologically matched HSPC donors and lowering the risks associated with transplantation. More broadly, the translation of a CRISPR- based therapy for IPEX syndrome paves the way for similar therapeutic approaches in other primary immunodeficiencies with autoimmunity.

Materials and Methods

Cell Isolation and Culture.

All research on cells from IPEX patients and healthy donor controls was approved by the Stanford University Institutional Review Board (in accordance with the IRB-approved protocol, IRB-34131) or by the IRB of the Ospedale San Raffaele (Protocol TIGET06). Written informed consent was obtained from all patients or patient families. Additional healthy donor HSPCs were isolated from umbilical cord blood donors provided by the Binns Program for Cord Blood Research at Stanford University or purchased commercially from AllCells or StemCell Technologies. For HSPC isolation from cord blood and bone marrow, mononuclear cells were first obtained by Ficoll-Paque (GE Healthcare) density gradient separation followed by ammonium chloride red blood cell lysis (StemCell Technologies). HSPCs were next purified by magnetic cell isolation using the CD34 MicroBead UltraPure Kit (Miltenyi Biotec) according to manufacturer's recommendations, and plated at a cell concentration of 2.5×10$^5$ cells/ml.

The HSPCs were cultured at 37° C. with 5% $CO_2$ and low oxygen (5% $O_2$) in StemSpan SFEM II medium (StemCell Technologies) supplemented with 100 ng/ml SCF (PeproTech), 100 ng/ml IL-6 (PeproTech), 100 ng/ml TPO (PeproTech), 100 ng/ml Flt3L (PeproTech), 750 nM StemRegenin1 (StemCell Technologies), and 35 nM UM171 (StemCell Technologies). Additional healthy donor Treg and Teff cells were obtained from the Stanford Blood Center, and peripheral blood mononuclear cells (PBMCs) were isolated by Ficoll-Paque density gradient separation. All edited cells were from male donor origin to match male IPEX patient samples, with the exception of few female mock controls. Tregs and Teff cells were separated by magnetic bead isolation using the CD4+CD25+ Regulatory T Cell Isolation Kit (Miltenyi Biotec) according to the manufacturer's protocol. Both cell fractions were activated with 10 ug/ml immobilized plate-bound anti-CD3 (OKT3 mAb, Miltenyi) with soluble 1 ug/ml anti-CD28 mAb (NA/LE, BD) for 2 to 3 days prior to editing and then switched to non-activation conditions.

Tregs were cultured in X-VIVO 15 (Lonza) with 5% human serum from male AB plasma (Sigma-Aldrich), 300 U/ml IL-2 (PeproTech), and 100 nmol rapamycin (StemCell Technologies, only added for certain experiments). Teff cells were cultured in X-VIVO 15, 5% human serum, and 50 U/ml IL-2. The Tregs and Teff cells were cultured at 37° C. with 5% $CO_2$ and ambient oxygen levels. Treg-like MT-2 cells were cultured in X-VIVO 15 with 5% human serum and 1% penicillin/streptomycin. K562 cells (ATCC) were cultured in RPMI medium (Thermo Fisher) with 10% FBS (Fisher Scientific) at 37° C. with 5% $CO_2$ and ambient oxygen levels. For all cells, fresh medium was added every 2 to 3 days.

Screening of sgRNA Efficiency by TIDE Analysis.

CRISPR chimeric sgRNA were designed using the Desktop Genetics web based tool (MIT) and cloned into expression vectors using the px330 plasmid backbone (Addgene). The sgRNAs were placed under the human U6 promoter in the px330 plasmid, which also contained an expression cassette for human codon-optimized SpCas9. For paired sgRNA nickase experiments, the sgRNAs were cloned into the px335 plasmid (Addgene) containing the Cas9 nickase expression cassette, and were co-delivered as paired plasmids. For the initial screen, 2 ug of sgRNA/Cas9 plasmid DNA was nucleofected into 1 million K562 cells using the Lonza Nucleofector 2b (program T-016). For each reaction, 100 uL of nucleofection solution was used (100 mM KH$_2$PO$_4$, 15 mM NaHCO$_3$, 12 mM MgCl$_2$. 6H$_2$O, 8 mM ATP, 2 mM glucose (pH 7.4)). The cells were cultured for 2-4 days and genomic DNA was extracted using QuickExtract DNA Extraction Solution (Epicentre) according to manufacturer's recommendations. The site of DNA cleavage was PCR amplified using Herculase II fusion polymerase (Aligent Technologies) and primers flanking the region 5'-CTAGAGCTGGGGTGCAACTATGG-3' and 5'-GACTACAATACGGCCTCCTCCTCTC-3'. The PCR amplicons were gel purified (Qiagen) and sequenced by Sanger sequencing using the forward primer 5'-CTAGAGCTGGGGTGCAACTATGG-3'. The resulting sequences were used to calculate indel frequencies using the TIDE analysis web based software (https://tide.nki.nl/). A list of all sgRNA and primer sequences is provided in Table 1.

FOXP3 Homology Donor Design.

The FOXP3 cDNA sequence was modified, or diverged, to incorporate synonymous mutations at the nucleotide level according to the redundant codon usage system to prevent premature recombination while still encoding for the wild-type FOXP3 protein. A constitutive Phosphoglycerate Kinase (PGK) promoter was positioned upstream of the tNGFR gene such that the marker would be expressed in all edited cells independent of FOXP3 expression. A strong Bovine Growth Hormone (BGH) polyadenylation signal (pA) was positioned after the FOXP3 cDNA, and another pA was included after the tNGFR marker gene to allow independent expression of the FOXP3 cDNA and tNGFR, and to ensure inactivation of the remaining endogenous FOXP3 locus. The homology arms were centered on the cut site of the sgRNA 2. The 3'arm (right arm) started at the cut site and reached approximately 650 bp downstream of the cut site, whereas the 5' arm (left arm) included a region approximately 600 bp upstream of the cut site. The FOXP-3$^{FLcoW}$ construct contained a shorter synthetic pA site in place of the BGH pA and shorter arms of homology to accommodate the addition of a WPRE element while maintaining an overall similar donor length.

Production of rAAV-FOXP3 Homology Donors.

All FOXP3 homology donors were cloned into pAAV-MCS AAV vectors (Agilent Technologies) containing AAV inverted terminal repeats. Cloning was performed using NotI restriction digest (NEB) followed by ligation with T4 DNA ligase (NEB). Plasmid preparation was performed by transforming plasmids into Stbl3 *E. coli* (Life Technologies) and extracting plasmid DNA with Endotoxin-Free Maxi Prep kits (Qiagen). For rAAV production, pAAV-FOXP3 plasmids were co-transfected with rAAV6 helper plasmid DNA into the 293FT Cell Line (Life Technologies). After 72 hr, rAAV6-FOXP3 viral particles were extracted using the AAVpro kit (Clontech, Takara) according to manufacturer's instructions. The viral stocks were titered using qPCR with primers and probe annealing to the ITRs. Briefly, the rAAV genomic DNA was isolated using QIAamp MinElute Virus Spin Kit (Qiagen), qPCR was performed on the Roche LightCycler 480, and viral titer (vector genomes per uL) was calculated using a standard curve generated from a circular pAAV-MCS-donor plasmid of known concentration.

Gene Editing by Nucleofection and rAAV Transduction.

Gene editing of primary human HSPCs, Tregs, and Teff cells was performed using synthetic sgRNA 2 (5'-AGGACCCGATGCCCAACCCC-3') complexed to SpCas9 protein (IDT) as an RNP system. The sgRNA was synthesized as a 100-mer RNA molecule with 2'-O-methyl 3'phosphorothioate (MS) chemical modifications at the three terminal nucleotides on the 5' and 3' ends (SEQ ID NO:2) (5'-2'OMe(A(ps)G(ps)G(ps))ACC CGA UGC CCA ACC CCG UUU UAG AGC UAG AAA UAG CAA GUU AAA AUA AGG CUA GUC CGU UAU CAA CUU GAA AAA GUG GCA CCG AGU CGG UGC UUU 2'OMe(U(ps)U(ps)U)-3', ps indicates phosphorothioate, 2'OMe indicates 2'-O-methyl). The sgRNAs were purified by reversed phase high-performance liquid chromatography (HPLC) and quantified by mass spectrometry. The sgRNAs were purchased from TriLink Biotechnologies, and in later experiments, from Synthego (not HPLC purified), and editing rates triggered by sgRNAs from the two respective companies were comparable when tested in parallel. The sgRNA was complexed with Cas9 for 10 min at 25° C. at an approximate Cas9: sgRNA molar ratio of 1:2.5, using 8 ug of sgRNA and 15 ug of Cas9 per 100 uL nucleofection solution containing 2.5×10$^5$ to 1×10$^6$ cells. After switching to high fidelity (HiFi) Cas9 (IDT) that showed slightly lower efficiency in parallel experiments, the amount of HiFi Cas9 was increased and the molar ratio was adjusted to 1:1.8, using 8 ug of sgRNA with 22 ug of HiFi Cas9 per 100 uL nucleofection solution. The sgRNA/Cas9 complexes were nucleofected into Tregs and Teff cells after 2-3 days of activation using the P3 Primary Cell Nucleofection Kit (Lonza) and the Lonza Nucleofector 4D (program E-0115). On the day of nucleofection, additional antibiotic (Pen/Strep) was removed from the medium, and rapamycin was removed from the Treg medium. The following day, media was changed and antibiotic/rapamycin was replaced. For HSPC editing, the cells were nucleofected using the P3 Primary Cell Nucleofection Kit (Lonza) and the Lonza Nucleofector 4D (program DZ-100). For analysis of indel frequencies, genomic DNA was extracted using QuickExtract DNA Extraction Solution (Epicentre) and TIDE analysis was performed as described above. For HDR experiments, rAAV6-FOXP3 donor transduction was performed following nucleofection at an MOI of 1×10$^5$ to 1×10$^6$ viral genomes per cell. After 24 hr of transduction, the medium was changed to remove excess viral particles.

Assessment of HDR-Mediated Targeted Integration by Flow Cytometry and in-Out PCR.

To assess HDR at the genomic level, in-out PCR was performed 2-4 days post-editing using a forward primer outside of the 5' arm of homology (5'-ATGTCAGCTCGGTCCTTCCA-3') and a reverse primer inside the inserted divergent cDNA construct (5'-TGGCATAGGATTAAGGGAACTG-3'). A second in-out PCR strategy targeting the 3'end used a forward primer inside the inserted tNGFR+ region (5'-AGCCTTCAAGAGGTG-GAACA-3') of the construct and a reverse primer in the endogenous FOXP3 locus outside of the 3'arm of homology (5'-AGGCCATCCTGATCCTCAC-3'). As a control for the presence of genomic DNA, a PCR strategy targeting a downstream, unmodified region of FOXP3 was performed (forward primer: 5'-TGCCTCCTCTTCTTCCTTGA-3', reverse primer: 5'-GAG CCTCGAAAACCCTGACT-3'). Herculase II fusion polymerase (Aligent Technologies) was used for all PCR amplification steps. The resulting PCR products were resolved by agarose gel electrophoresis. For absolute quantification of genomic integration events at the DNA level, an in-out PCR strategy quantified using the Digital Droplet PCR (ddPCR, BioRad) system was used. For ddPCR, we used two primer/probe sets: the first for the edited region of the FOXP3 locus (forward primer: 5'-GG-GAGGATTGGGAAGACAAT-3', FAM-labeled probe: 5'-TCAGAGATTGGAGGCTCTCC-3', reverse primer: 5'-ACAATACGGCCTCCTCCTCT-3'), and a second primer/probe control set targeting a non-modified region of the FOXP3 gene used as a reference (forward primer: 5'-CACCGAAATCGGTATTAGTTTG-3', HEX-labeled probe: 5'-CAGTTCTGGAGGCCAGAGTC-3', reverse: 5'-CCCGGGGGAGTATAGAAGG-3'). The two regions were amplified and quantified as previously described with modifications (19). The PCR reaction used 100 ng of genomic DNA digested with BamHI-HF (10U) and an annealing temperature of 62° C. The percentage targeting was calculated as the ratio of FAM (targeted allele) to HEX signal.

Enrichment of tNFGR+ Edited Cells.

Edited tNFGR+ cells were enriched by fluorescence-activated cell sorting (FACS) 2-4 days post-editing on a FACS Aria II SORP (BD Biosciences). Cells were stained with anti-NGFR/CD271 mAb (Biolegend, clone ME20.4, PE-Cy7-conjugated or APC-conjugated). When edited cells were present at low cell numbers, magnetic bead cell isolation was used to increase yield and avoid cell loss associated with FACS sorting. Positive selection of tNGFR+ cells was performed using CD271 (tNGFR) Microbead Kit (Miltenyi Biotech) according to the manufacturer's instructions. Briefly, cells were magnetically labeled with anti-tNGFR Microbeads and separated on an MS or LS column in the magnetic field of a MACS separator. Columns were washed, eluted, and the cells were passed through a second column to increase purity.

Off-Target Analysis.

Off-target sites were bioinformatically predicted using the in silico COSMID prediction tool. For in vitro off-target analysis, GUIDE-seq was performed as previously described. In brief, the px330-FOXP3-sgRNA2-Cas9 plasmid was electroporated into U2OS cells along with a double-stranded oligodeoxynucleotide (dsODN, 5'-GTT-TAATTGAGTTGTCATATGT-TAATAACGGTAT-3'). The T7 and RFLP assays were performed to confirm editing and tag integration (using TIDE primers 5'-CTAGAGCTGGGGTGCAACTATGG and 5'-GACTA-CAATACGGCCTCCTCCTCTC-3'). Genomic DNA was extracted, sequencing libraries were prepared, and next generation sequencing (NGS) was performed to identify all sites in which the dsODN was integrated into DNA breaks. GUIDE-seq reads were filtered using a cutoff of 8 mismatches according to previous studies on the CRISPR tolerance of mismatches. A total of 62 sites identified by the combination of COSMID and GUIDE-seq analyses were then tested by NGS sequencing (Illumina MiSeq) in edited HSPCs. HSPCs derived from male healthy donor cord blood (n=3) and bone marrow (n=3) were edited with CRISPR sgRNA2/ HiFi Cas9 combined with rAAV6-FOXP3 FL donor, and total cells (tNGFR+/−) were used for genomic DNA extraction. NGS sequencing reads that were identified at similar rates in edited cells and mock treated samples were eliminated from the analysis. High background in the mock treated samples was attributed to the proximity of the sequencing primer to the polynucleotide sequence 5'-CCCC-3' in the sgRNA target site, as polyN sequences commonly cause errors in NGS and can lead to false positive indel identification. Only sites with indel mutation rates above mock control background were selected for NGS validation in edited bone marrow-derived HSPCs. Four validated sites were identified in edited bone marrow-derived HSPC, and these sites were analyzed by bioinformatic gene annotation to predict expression in hematopoietic lineages and contribution to hematopoiesis or cell cycle regulation using UCSC genome browser, Uniprot, GeneCards, and publically archived microarray and RNA-seq data.

Determination of FOXP3 Expression by RT-PCR and Flow Cytometry.

FOXP3 mRNA expression was detected by RT-PCR in FOXP3$^{FL}$ edited CD4+ T cells and controls after 3 days of re-activation with Human T-Activator anti-CD3/28 Dynabeads (Life Technologies, 1:25 bead:cell ratio). RNA was extracted with TriReagent (Sigma-Aldrich) and polyA+ mRNA was reverse transcribed into cDNA using SuperScript III First-Strand Synthesis System (ThermoFisher). PCR amplification of FOXP3 cDNA was performed using Herculase II fusion polymerase (Aligent Technologies) and primers listed in Table 1. For assessing FOXP3 expression by flow cytometry, cells were fixed and permeabilized using FOXP3 staining solutions (eBioscience) and stained with anti-FOXP3 mAb (clone 259D/C7) conjugated to either AF647 (BD Biosciences) or AF488 (Biolegend) following manufacturer's instructions. Fluorescence was detected on a FACS Aria II SORP (BD Biosciences), analyzed using FlowJo software v4 10.5.0, and median florescent intensity (MFI) was recorded.

Treg Phenotyping and Suppression Assay.

For Treg phenotyping, cells were stained for flow cytometry using the following antibodies: CD25-BV605 (clone 2A3, BD Biosciences), CTLA-4-PerCPCy5.5 (L3D10, BioLegend), FOXP3− AF647 (259D/C7, BD), HELIOS-PE (22F6, Biolegend), NGFR-BV421 (cME20.4, BioLegend), PD-1-FITC (MIH4, BD), and TIGIT-PE-Cy7 (MBSA43, eBioscience). Intracellular staining for FOXP3, CTLA-4, and HELIOS was performed after fixing and permeabilizing with FOXP3 staining solutions (eBioscience). Expression was detected on a FACS Aria II SORP (BD Biosciences) and geometric mean intensity was analyzed using FlowJo software v4 10.5.0. The function of gene edited Tregs was tested by the suppression assay using allogenic CD4+ T cell responders that were labeled with CFSE proliferation dye (CellTrace CFSE Cell Proliferation Kit, Life Technologies). Responders were plated at a concentration of $2 \times 10^4$ cells/well and co-cultured with Tregs at a 1:1 or 1:0.5 ratio of responders:suppressors. The cells were activated with a 1:25 ratio of beads:cells using Human T-Activator anti-CD3/28 Dynabeads (Life Technologies). As a reference control, responders were co-cultured with an equal number of unstained Teff cells. The cells were cultured in 96-well round well plates and analyzed for CFSE staining on days 3-5 using a FACS Aria II SORP (BD Biosciences). Non-activated responders were used for gating and the percent of proliferated cells was analyzed using FlowJo software v4 10.5.0. Percent suppression was calculated using the following equation: % suppression=((% proliferated R*)−(% proliferated R*+Treg))/(% proliferated R*)×100), where R* represents stimulated CFSE-stained responder Teff. Treg purity was performed by flow cytometry analysis using the following antibodies: CD4-APC-Cy7 (RPA-T4, Biolegend), CD25− PE (4E3, Miltenyi), CD127− PerCP-Cy5-5 (A019D5, Biolegend), and FOXP3-AF647 (clone 259D/C7, BD). The frequency of demethylated TSDR Tregs was quantified by epigenetic bisulfite qPCR in collaboration with Epimune/Epiontis GmbH (Berlin, Germany) as previously described.

Teff Cytokine Quantification and Proliferation Assay.

Teff cytokine production was quantified using ELISA for IL-2 (BD Biosciences), IFN-γ (BD Biosciences), and IL-17 (R&D Systems). Teff cells were activated using Human T-Activator anti-CD3/28 Dynabeads (Life Technologies) at a 1:25 ratio of beads:cells in 96-well round well plates at $2 \times 10^5$ cells per 200 uL. Supernatants were collected at 24 hr (IL-2) and 48 hr (IFN-☐ and IL-17) post-activation. For the proliferation assay, Teff cells were stained using the CellTrace CFSE Cell Proliferation Kit (Life Technologies) and cultured at $5 \times 10^4$ cells/well in 96-well round well plates. The stained cells were activated with a 1:25 ratio of anti-CD3/28 Dynabeads and analyzed for CFSE staining on days 2-4 post-activation on a FACS Aria II SORP (BD Biosciences). The percentage of proliferated cells was determined using FlowJo software v4 10.5.0 and gated using non-activated responders as a reference.

CFU Assay to Assess In Vitro HSPC Differentiation.

Gene edited cord blood-derived HSPCs were FACS sorted 2-4 days post-editing and differentiated in vitro using the colony forming unit (CFU) assay. For each condition, 500 cells were plated in 1.1 mL of semi-solid methylcellulose medium (Methocult H4434, StemCell Technologies) and performed in duplicate or triplicate. The cells suspended in methocult were incubated at 37° C. with 5% $CO_2$ and ambient oxygen levels, and the resulting progenitor colonies were counted and scored after 14 days (BFU-E (primitive erythroid progenitors), CFU-E (mature erythroid progenitors), CFU-GM (granulocyte and macrophage progenitors), and CFU-GEMM (granulocyte, erythrocyte, macrophage, megakaryocyte)).

Engraftment Studies in Immunodeficient Mice.

All animal experiments were conducted in accordance with protocols approved by the Stanford University's Administrative Panel on Laboratory Animal Care Research Committee under the Division of Laboratory Medicine. Human cord blood-derived CD34+ HSPCs were gene edited as described above and injected two days post-editing (without enriching for tNGFR+ cells). Cultured HSPCs were phenotyped by flow cytometry to ensure purity using the antibodies, CD34-PE-Cy7 (4H11, eBiosciences), CD38-Percp-Cy5.5 (HIT2, BioLegend), CD45RA-FITC (Hl100, BD Biosciences), CD90-APC-Cy7 (5E10, BioLegend), CD49f-PE (GoH3, BioLegend), and combined lineage markers (Lin) on APC as follows: CD45-APC (30-F11, BioLegend), CD19-APC (HlB19, BioLegend), CD14-APC (HCD14, BioLegend), CD235a-APC (HlR2, BioLegend), CD20-APC (2H7, BioLegend), CD16-APC (3G8, BioLegend), CD2-APC (RPA-2.10, BioLegend), CD3-APC (SK7, Biolegend), CD4-APC (SK3, Biolegend), CD8-APC (SK1, Biolegend), and CD13-APC (WM15, Biolegend). On the day of injection, day 3-4 day old NSG– SGM3 (Jackson Laboratory, JAX:013062) neonatal pups were irradiated with 100 cGy and rested for 6 hrs before injection. HSPCs (between $1.5 \times 10^5$–$1.0 \times 10^6$) were resuspended in 30 µL of expansion media and cells were injected intrahepatically using a 28.5 gauge insulin syringe. Starting at week 6, mice were checked for peripheral engraftment of human CD45+ cells via biweekly retroorbital bleed. The mice and were sacrificed between 11-14 weeks, and blood, spleen, bone marrow, and thymus were harvested. For blood and spleen samples, red blood cells were lysed following a 5 min incubation on ice with 1×RBC lysis buffer (eBiosciences) and were resuspended in staining buffer (PBS, 0.25% BSA, 1 mM EDTA). Cells purified from tissues were stained using the following antibodies: hCD45 BV510 (Hl30, BD Biosciences), mCD45-APC (30-F11, BioLegend), CD3-Percp Cy5.5 (OKT3, BioLegend), CD56-PE (5.1H11, Biolegend), CD13-APC-Cy7 (WM15, BioLegend), and CD19-FITC (HlB19, BD Biosciences). An additional antibody panel for T cell subsets included: hCD45 BV510 (H130, BD Biosciences), mCD45 PE (30-F11, BioLegend), CD4 APC-Cy7 (RPA-T4, BioLegend), CD8 BV650 (SK1, BioLegend), CD25 BV605 (2A3, BD Biosciences), CD45RA FITC (Hl100, BD Biosciences), and FOXP3 AF647 (259D, BioLegend). Cell were either analyzed by flow cytometric analysis (CytoFLEX BD) or sorted (BD, FACSAria). Sorted $CD25^{high}$ and $CD25^{low}$ populations were analyzed by suppression and proliferation assays, respectively, as described above.

Statistical Analysis.

Statistical analysis was performed using GraphPad PRISM software v7.0c (GraphPad Inc.). Averages were represented as mean±standard deviation (SD) and the number of replicates was indicated in respective figures and figure legends. For comparison of two data sets, two-tailed Student's t-test was performed ($\alpha$=5.0%). For paired donor samples, a paired Student's t-test was performed ($\alpha$=5.0%). Differences between multiple groups were identified using one-way or two-way analysis of variance (ANOVA) and Tukey's multiple comparison test ($\alpha$=5.0%). Significances were indicated as *p<0.05, p<0.01, and *p<0.001, ****p<0.0001.

```
Sequences
NCBI Reference Sequence: NP 054728.2
                                     (SEQ ID NO: 1)
MPNPRPGKPS APSLALGPSP GASPSWRAAP KASDLLGARG

PGGTFQGRDL RGGAHASSSS LNPMPPSQLQ LPTLPLVMVA

PSGARLGPLP HLQALLQDRP HFMHQLSTVD AHARTPVLQV

HPLESPAMIS LTPPTTATGV FSLKARPGLP PGINVASLEW

VSREPALLCT FPNPSAPRKD STLSAVPQSS YPLLANGVCK

WPGCEKVFEE PEDFLKHCQA DHLLDEKGRA QCLLQREMVQ

SLEQQLVLEK EKLSAMQAHL AGKMALTKAS SVASSDKGSC

CIVAAGSQGP VVPAWSGPRE APDSLFAVRR HLWGSHGNST

FPEFLHNMDY FKFHNMRPPF TYATLIRWAI LEAPEKQRTL

NEIYHWFTRM FAFFRNHPAT WKNAIRHNLS LHKCFVRVES

EKGAVWTVDE LEFRKKRSQR PSRCSNPTPG P

NCBI Reference Sequence: NP 001107849.1
                                     (SEQ ID NO: 2)
MPNPRPGKPS APSLALGPSP GASPSWRAAP KASDLLGARG

PGGTFQGRDL RGGAHASSSS LNPMPPSQLQ LSTVDAHART

PVLQVHPLES PAMISLTPPT TATGVFSLKA RPGLPPGINV

ASLEWVSREP ALLCTFPNPS APRKDSTLSA VPQSSYPLLA

NGVCKWPGCE KVFEEPEDFL KHCQADHLLD EKGRAQCLLQ

REMVQSLEQQ LVLEKEKLSA MQAHLAGKMA LTKASSVASS

DKGSCCIVAA GSQGPVVPAW SGPREAPDSL FAVRRHLWGS

HGNSTFPEFL HNMDYFKFHN MRPPFTYATL IRWAILEAPE

KQRTLNEIYH WFTRMFAFFR NHPATWKNAI RHNLSLHKCF

VRVESEKGAV WTVDELEFRK KRSQRPSRCS NPTPGP
```

FOXP3 Full Length Codon Diverged Gene Editing Construct (SEQ ID NO:3). nt. 1-8 Not I site; nt. 9-625 5' homology arm; nt. 616-1912 FOXP3 coding sequence (encoding SEQ ID NO:1); nt. 1913-2139 BGH poly-A signal; nt. 2140-2660 PGK promoter; nt. 2661-3503 tNGFR marker sequence; nt. 3504-3730 BGH poly-A signal; nt. 3731-4386 3' homology arm; nt. 4387-4394 Not I site.

GCGGCCGCattaagtctcagaatctacccacttctcgccttctccactgccaccagcccattctg
tgccagcatcatcacttgccaggactgttacaatagcctcctcactagccccactcacagcagcca
gatgaatcttttgagtccatgcctagtcactggggcaaaataggactccgaggaGAAAG
TCCGAGACCAGCTCCGGCAAGATGAGCAAACACAGCCTGTGCAGGGTGCAGGGAGGGCTAGAGGC
CTGAGGCTTGAAACAGCTCTCAAGTGGAGGGGGAAACAACCATTGCCCTCATAGAGGACACATCCA
CACCAGGGCTGTGCTAGCGTGGGCAGGCAAGCCAGGTGCTGGACCTCTGCACGTGGGGCATGTGT
GGGTATGTACATGTACCTGTGTTCTTGGTGTGTGTGTGTGTGTGTGTGTGTGTGTCTAGAGCT
GGGGTGCAACTATGGGGCCCCTCGGGACATGTCCCAGCCAATGCCTGCTTTGACCAGAGGAGTGT
CCACGTGGCTCAGGTGGTCGAGTATCTCATACCGCCCTAGCACACGTGTGACTCCTTTCCCCTATT
GTCTACGCAGCCTGCCCTTGGACA*AGGACCCGATGCCCAACCCTCGCCCAGGAAAACCTAGCGCA*
*CCTAGCCTCGCTCTGGGGCCTTCTCCTGGAGCAAGCCCCAGTTGGCGCGCTGCACCCAAGGCTTC*
*TGACCTTCTCGGTGCCCGAGGCCCCGGCGGGACTTTTCAGGGCAGAGATCTCAGAGGCGGCGCGC*
*ACGCCAGCAGCAGTTCCCTTAATCCTATGCCACCCTCCCAGCTGCAACTGCCAACCCTGCCTCTGG*
*TGATGGTGGCCCCAGCGGAGCCCGGTTGGGACCACTGCCACACCTGCAGGCCCTGCTGCAGGAT*
*CGCCCTCATTTCATGCACCAGCTGTCTACAGTCGATGCCCACGCCCGGACCCCAGTTCTCCAGGTG*
*CACCCCCTGGAATCTCCGGCCATGATAAGCCTCACCCCACCAACCACAGCAACTGGTGTCTTTTCTC*
*TTAAAGCGCGCCCAGGCCTGCCCCCTGGTATCAACGTGGCTAGCCTGGAATGGGTGAGCAGAGAG*
*CCAGCCCTTTTGTGTACCTTTCCCAATCCTAGCGCGCCTAGGAAGGACTCTACACTGTCAGCTGTTC*
*CACAGTCTAGCTATCCCCTTCTGGCCAATGGCGTCTGCAAATGGCCAGGGTGTGAGAAGGTCTTTG*
*AAGAGCCAGAAGATTTCCTGAAACACTGTCAAGCAGACCACTTGTTGGACGAGAAGGGTCGCGCGC*
*AGTGCCTTCTGCAAAGAGAGATGGTGCAGTCACTGGAGCAGCAGCTGGTGCTGGAGAAGGAGAAG*
*CTGTCAGCTATGCAGGCACACCTGGCAGGAAAAATGGCTCTCACCAAAGCCTCTTCCGTAGCCAGC*
*TCAGACAAGGGAAGCTGTTGTATTGTCGCCGCTGGCTCTCAGGGGCCTGTTGTGCCAGCCTGGAGT*
*GGACCTCGGGAGGCACCGGACAGCCTGTTCGCCGTGCGGAGACACCTTTGGGGCTCTCACGGAAA*
*CTCTACCTTCCCTGAATCCTTCATAATATGGATTACTTCAAATTCCACAACATGAGGCCTCCTTTTAC*
*GTACGCGACGCTGATCCGGTGGGCCATTCTGGAGGCACCTGAGAAGCAAAGAACTCTCAATGAAAT*
*CTATCACTGGTTCACAAGAATGTTCGCATTTTTCCGCAACCACCCTGCCACCTGGAAGAACGCTATT*
*CGGCACAATCTTTCCCTGCACAAGTGCTTCGTCCGCGTTGAGAGCGAGAAAGGCGCCGTCTGGACA*
*GTCGACGAACTCGAATTTAGAAAAAAACGGTCACAAAGACCAAGCCGCTGCAGCAATCCCACGCCG*
*GGACCCTGAAGCCTCGACTGTGCCTTCTAGTTGCCAGCCATCTGTTGTTTGCCCCTCCCCCGTGCC*
TTCCTTGACCCTGGAAGGTGCCACTCCCACTGTCCTTTCCTAATAAAATGAGGAAATTGCATCGCAT
TGTCTGAGTAGGTGTCATTCTATTCTGGGGGGTGGGGTGGGGCAGGACAGCAAGGGGGAGGATTG
GGAAGACAATAGCAGGCATGCTGGGGATGCGGTGGGCTGAATTCCCACGGGGTTGGGGTTGCGCC
TTTTCCAAGGCAGCCCTGGGTTTGCGCAGGGACGCGGCTGCTCTGGGCGTGGTTCCGGGAAACGC
AGCGGCGCCGACCCTGGGTCTCGCACATTCTTCACGTCCGTTCGCAGCGTCACCCGGATCTTCGC
CGCTACCCTTGTGGGCCCCCCGGCGACGCTTCCTGCTCCGCCCCTAAGTCGGGAAGGTTCCTTGC
GGTTCGCGGCGTGCCGGACGTGACAAACGGAAGCCGCACGTCTCACTAGTACCCTCGCAGACGGA
CAGCGCCAGGGAGCAATGGCAGCGCGCCGACCGCGATGGGCTGTGGCCAATAGCGGCTGCTCAG
CGGGGCGCGCCGAGAGCAGCGGCCGGGAAGGGGCGGTGCGGGAGGCGGGGTGTGGGGCGGTA
GTGTGGGCCCTGTTCCTGCCCGCGCGGTGTTCCGCATTCTGCAAGCCTCCGGAGCGCACGTCGGC
AGTCGGCTCCCTCGTTGACCGAATCACCGACCTCTCTCCCCAGATGGGGGCAGGTGCCACCGGCC

```
GCGCCATGGACGGGCCGCGCCTGCTGCTGTTGCTGCTTCTGGGGGTGTCCCTTGGAGGTGCCAAG

GAGGCATGCCCCACAGGCCTGTACACACACAGCGGTGAGTGCTGCAAAGCCTGCAACCTGGGCGA

GGGTGTGGCCCAGCCTTGTGGAGCCAACCAGACCGTGTGTGAGCCCTGCCTGGACAGCGTGACGT

TCTCCGACGTGGTGAGCGCGACCGAGCCGTGCAAGCCGTGCACCGAGTGCGTGGGGCTCCAGAG

CATGTCGGCGCCGTGCGTGGAGGCCGACGACGCCGTGTGCCGCTGCGCCTACGGCTACTACCAG

GATGAGACGACTGGGCGCTGCGAGGCGTGCCGCGTGTGCGAGGCGGGCTCGGGCCTCGTGTTCT

CCTGCCAGGACAAGCAGAACACCGTGTGCGAGGAGTGCCCCGACGGCACGTATTCCGACGAGGCC

AACCACGTGGACCCGTGCCTGCCCTGCACCGTGTGCGAGGACACCGAGCGCCAGCTCCGCGAGT

GCACACGCTGGGCCGACGCCGAGTGCGAGGAGATCCCTGGCCGTTGGATTACACGGTCCACACCC

CCAGAGGGCTCGGACAGCACAGCCCCCAGCACCCAGGAGCCTGAGGCACCTCCAGAACAAGACCT

CATAGCCAGCACGGTGGCAGGTGTGGTGACCACAGTGATGGGCAGCTCCCAGCCCGTGGTGACCC

GAGGCACCACCGACAACCTCATCCCTGTCTATTGCTCCATCCTGGCTGCTGTGGTTGTGGGCCTTG

TGGCCTACATAGCCTTCAAGAGGTGGAACAGGGGGATCCTCTAGAGCCTCGACTGTGCCTTCTAGT

TGCCAGCCATCTGTTGTTTGCCCCTCCCCCGTGCCTTCCTTGACCCTGGAAGGTGCCACTCCCACT

GTCCTTTCCTAATAAAATGAGGAAATTGCATCGCATTGTCTGAGTAGGTGTCATTCTATTCTGGGGG

GTGGGGTGGGGCAGGACAGCAAGGGGGAGGATTGGGAAGACAATAGCAGGCATGCTGGGGATGC

GGTGGGCTCCCAGGGCTGGCAAGCCCTCGGCCCCTTCCTTGGCCCTTGGCCCATCCCCACGAGCC

TCGCCCAGCTGGAGGGCTGCACCCAAAGCCTCAGACCTGCTGGGGCCCGGGGCCCAGGGGGAA

CCTTCCAGGGCCGAGATCTTCGAGGCGGGGCCCATGCCTCCTCTTCTTCCTTGAACCCCATGCCAC

CATCGCAGCTGCAGGTGAGGCCCTGGGCCCAGGATGGGGCAGGCAGGGTGGGGTACCTGGACCT

ACAGGTGCCGACCTTTACTGTGGCACTGGGCGGGAGGGGGCTGGCTGGGGCACAGGAAGTGGT

TTCTGGGTCCCAGGCAAGTCTGTGACTTATGCAGATGTTGCAGGGCCAAGAAAATCCCCACCTGCC

AGGCCTCAGAGATTGGAGGctctccccgacctcccaatccctgtctcaggagaggaggaggccgtat tgtagtcccatgagcatagctatgtgtccccatccccatgtgacaagagaagaggactggggccaagtag gtgaggtgacagggctgaggccagctctgcaacttattagctgtttgatctttaaaaagttactcgatc tccatgagcctcagtttccatacgtgtaaaaggggggatgatcatagcatctaccatgtgggGCGGCCGC
```

FOXP3 D2 Codon Diverged Gene Editing Construct (SEQ ID NO:4). The features are as in SEQ ID NO:3, with the exception that the shorter isoform FOXP3 coding sequence is nt. 616-1807, encoding SEQ ID NO:2

```
GCGGCCGCattaagtctcagaatctacccacttctcgccttctccactgccaccagcccattctg tgccagcatcatcacttgccaggactgttacaatagcctcctcactagccccactcacagcagcc agatgaatcttttgagtccatgcctagtcactggggcaaaataggact ccgaggaGAAAGTCCGAGACCAGCTCCGGCAAGATGAGCAAACACAGCCTGTGCAGGGTGCAGGG

AGGGCTAGAGGCCTGAGGCTTGAAACAGCTCTCAAGTGGAGGGGAAACAACCATTGCCCTCAT

AGAGGACACATCCACACCAGGGCTGTGCTAGCGTGGGCAGGCAAGCCAGGTGCTGGACCTCTGC

ACGTGGGGCATGTGTGGGTATGTACATGTACCTGTGTTCTTGGTGTGTGTGTGTGTGTGTGTGT

GTGTGTGTCTAGAGCTGGGGTGCAACTATGGGGCCCCTCGGGACATGTCCCAGCCAATGCCTGCT

TTGACCAGAGGAGTGTCCACGTGGCTCAGGTGGTCGAGTATCTCATACCGCCCTAGCACACGTGT

GACTCCTTTCCCCTATTGTCTACGCAGCCTGCCCTTGGACAAGGACCCGATGCCCAACCCTCGCC

CAGGAAAACCTAGCGCACCTAGCCTCGCTCTGGGCCTTCTCCTGGAGCAAGCCCCAGTTGGCG
```

-continued

```
CGCTGCACCCAAGGCTTCTGACCTTCTCGGTGCCCGAGGCCCCGGCGGGACTTTTCAGGGCAGA

GATCTCAGAGGCGGCGCGCACGCCAGCAGCAGTTCCCTTAATCCTATGCCACCCTCCCAGCTGCA

ACTGTCTACAGTCGATGCCCACGCCCGGACCCCAGTTCTCCAGGTGCACCCCCTGGAATCTCCGG

CCATGATAAGCCTCACCCCACCAACCACAGCAACTGGTGTCTTTTCTCTTAAAGCGCGCCCAGGC

CTGCCCCCTGGTATCAACGTGGCTAGCCTGGAATGGGTGAGCAGAGAGCCAGCCCTTTTGTGTAC

CTTTCCCAATCCTAGCGCGCCTAGGAAGGACTCTACACTGTCAGCTGTTCCACAGTCTAGCTATCC

CCTTCTGGCCAATGGCGTCTGCAAATGGCCAGGGTGTGAGAAGGCTTTGAAGAGCCAGAAGATT

TCCTGAAACACTGTCAAGCAGACCACTTGTTGGACGAGAAGGGTCGCGCGCAGTGCCTTCTGCAA

AGAGAGATGGTGCAGTCACTGGAGCAGCAGCTGGTGCTGGAGAAGGAGAAGCTGTCAGCTATGC

AGGCACACCTGGCAGGAAAAATGGCTCTCACCAAAGCCTCTTCCGTAGCCAGCTCAGACAAGGG

AAGCTGTTGTATTGTCGCCGCTGGCTCTCAGGGGCCTGTTGTGCCAGCCTGGAGTGGACCTCGGG

AGGCACCGGACAGCCTGTTCGCCGTGCGGAGACACCTTTGGGCTCTCACGGAAACTCTACCTTC

CCTGAATTCCTTCATAATATGGATTACTTCAAATTCCACAACATGAGCCTCCTTTTACGTACGCGA

CGCTGATCCGGTGGGCCATTCTGGAGGCACCTGAGAAGCAAAGAACTCTCAATGAAATCTATCAC

TGGTTCACAAGAATGTTCGCATTTTTCCGCAACCACCCTGCCACCTGGAAGAACGCTATTCGGCA

CAATCTTTCCCTGCACAAGTGCTTCGTCCGCGTTGAGAGCGAGAAAGGCGCCGTCTGGACAGTCG

ACGAACTCGAATTTAGAAAAAAACGGTCACAAAGACCAAGCCGCTGCAGCAATCCCACGCCGGG

ACCCTGAAGCCTCGACTGTGCCTTCTAGTTGCCAGCCATCTGTTGTTTGCCCCTCCCCCGTGCCTT

CCTTGACCCTGGAAGGTGCCACTCCCACTGTCCTTTCCTAATAAAATGAGGAAATTGCATCGCATT

GTCTGAGTAGGTGTCATTCTATTCTGGGGGGTGGGGTGGGCAGGACAGCAAGGGGGAGGATTG

GGAAGACAATAGCAGGCATGCTGGGGATGCGGTGGGCTGAATTCCCACGGGGTTGGGGTTGCGC

CTTTTCCAAGGCAGCCCTGGGTTTGCGCAGGGACGCGGCTGCTCTGGGCGTGGTTCCGGGAAAC

GCAGCGGCGCCGACCCTGGGTCTCGCACATTCTTCACGTCCGTTCGCAGCGTCACCCGGATCTTC

GCCGCTACCCTTGTGGGCCCCCGGCGACGCTTCCTGCTCCGCCCCTAAGTCGGGAAGGTTCCTT

GCGGTTCGCGGCGTGCCGGACGTGACAAACGGAAGCCGCACGTCTCACTAGTACCCTCGCAGAC

GGACAGCGCCAGGGAGCAATGGCAGCGCGCCGACCGCGATGGGCTGTGGCCAATAGCGGCTGC

TCAGCGGGGCGCGCCGAGAGCAGCGGCCGGGAAGGGGCGGTGCGGGAGGCGGGGTGTGGGC

GGTAGTGTGGGCCCTGTTCCTGCCCGCGCGGTGTTCCGCATTCTGCAAGCCTCCGGAGCGCACGT

CGGCAGTCGGCTCCCTCGTTGACCGAATCACCGACCTCTCTCCCCAGATGGGGCAGGTGCCAC

CGGCCGCGCCATGGACGGGCCGCGCCTGCTGCTGTTGCTGCTTCTGGGGGTGTCCCTTGGAGGT

GCCAAGGAGGCATGCCCCACAGGCCTGTACACACACAGCGGTGAGTGCTGCAAAGCCTGCAACC

TGGGCGAGGGTGTGGCCCAGCCTTGTGGAGCCAACCAGACCGTGTGTGAGCCCTGCCTGGACAG

CGTGACGTTCTCCGACGTGGTGAGCGCGACCGAGCCGTGCAAGCCGTGCACCGAGTGCGTGGGG

CTCCAGAGCATGTCGGCGCCGTGCGTGGAGGCCGACGACGCCGTGTGCCGCTGCGCCTACGGCT

ACTACCAGGATGAGACGACTGGGCGCTGCGAGGCGTGCCGCGTGTGCGAGGCGGGCTCGGGCC

TCGTGTTCTCCTGCCAGGACAAGCAGAACACCGTGTGCGAGGAGTGCCCCGACGGCACGTATTC

CGACGAGGCCAACCACGTGGACCCGTGCCTGCCCTGCACCGTGTGCGAGGACACCGAGCGCCA

GCTCCGCGAGTGCACACGCTGGGCCGACGCCGAGTGCGAGGAGATCCCTGGCCGTTGGATTACA

CGGTCCACACCCCCAGAGGGCTCGGACAGCACAGCCCCCAGCACCCAGGAGCCTGAGGCACCT

CCAGAACAAGACCTCATAGCCAGCACGGTGGCAGGTGTGGTGACCACAGTGATGGGCAGCTCCC

AGCCCGTGGTGACCCGAGGCACCACCGACAACCTCATCCCTGTCTATTGCTCCATCCTGGCTGCT
```

-continued

```
GTGGTTGTGGGCCTTGTGGCCTACATAGCCTTCAAGAGGTGGAACAGGGGGATCCTCTAGAGCCT

CGACTGTGCCTTCTAGTTGCCAGCCATCTGTTGTTTGCCCCTCCCCCGTGCCTTCCTTGACCCTGG

AAGGTGCCACTCCCACTGTCCTTTCCTAATAAAATGAGGAAATTGCATCGCATTGTCTGAGTAGGT

GTCATTCTATTCTGGGGGTGGGGTGGGGCAGGACAGCAAGGGGGAGGATTGGGAAGACAATAG

CAGGCATGCTGGGGATGCGGTGGGCTcccagggctggcaagccctcggccccttccttggcccttg gcccatccccacgagcctcgcccagctggagggctgcacccaaagcctcagacctgctgggggcc cggggcccaggggggaaccttccagggccgagatcttcgaggcggggcccatgctcctcttcttcc ttgaaccccatgccaccatcgcagctgcaggtgaggccctgggcccaggatggggcaggcagggt ggggtacctggacctacaggtgccgacctttactgtggcactgggcgggagggggctggctgggg cacaggaagtggtttctgggtcccaggcaagtctgtgacttatgcagatgttgcagggccaagaaaa tccccacctgccaggcctcagagattggaggctctccccgacctccaatccctgtctcaggagagg aggaggccgtattgtagtcccatgagcatagctatgtgtccccatccccatgtgacaagagaagga ctggggccaagtaggtgaggtgacagggctgaggccagctctgcaacttattagctgtttgatctttaaa aagttactcgatctccatgagcctcagtttccatacgtgtaaaaggggg atgatcatagcGCGGCCGC
```

TABLE 1

| | FOXP3 sgRNAs used for screening | |
|---|---|---|
| SEQ ID NO: 5 | sgRNA_FOXP3_E1_1 | 5'-GGCATCGGGTCCTTGTCCAA-3' |
| SEQ ID NO: 6 | sgRNA_FOXP3_E1_2 | 5'-AGGACCCGATGCCCAACCCC-3' |
| SEQ ID NO: 7 | sgRNA_FOXP3_E1_3 | 5'-TCCAGCTGGGCGAGGCTCCT-3' |
| SEQ ID NO: 8 | sgRNA_FOXP3_E1_4 | 5'-GAAGGGGCCGAGGGCTTGCC-3' |
| SEQ ID NO: 9 | sgRNA_FOXP3_E1_5 | 5'-GAAGGGGCCGAGGGCTTGCC-3' |
| SEQ ID NO: 10 | sgRNA_FOXP3_E1_6 | 5'-TTGGCCCTTGGCCCATCCCC-3' |
| SEQ ID NO: 11 | sgRNA_FOXP3_E1_7 | 5'-GGCCGAGGGCTTGCCAGGCC-3' |
| SEQ ID NO: 12 | sgRNA_FOXP3_E1_8 | 5'-CCCCAGGAGCCTCGCCCAGC-3' |
| | Chemically modified sgRNA used for FOXP3 editing | |
| sgRNA_FOXP3_E1_2 (SEQ ID NO: 13 | | 5'-2'OMe(A(ps)G(ps)G(ps))ACC CGA UGC CCA ACC CCG UUU UAG AGC UAG AAA UAG CAA GUU AAA AUA AGG CUA GUC CGU UAU CAA CUU GAA AGU GCA CCG AGU CGG UGC UUU 2'OMe(U(ps) U(ps)U)-3' (ps indicates phosphorothioate, 2'OMe indicates 2'-O-methyl) |
| | TIDE analysis primers for FOXP3 indel rates | |
| SEQ ID NO: 14 | FP E1 TIDE FOXP3 | 5'-CTAGAGCTGGGGTGCAACTATGG-3' |
| SEQ ID NO: 15 | RP E1 TIDE FOXP3 | 5'-GACTACAATACGGCCTCCTCCTCTC-3' |
| | FOXP3 in-out PCR primers for qualitative analysis of HDR | |
| SEQ ID NO: 16 | FOXP3_out5arm_FP | 5'-ATGTCAGCTCGGTCCTTCCA-3' |
| SEQ ID NO: 17 | FOXP3_cDNA_RP | 5'-TGGCATAGGATTAAGGGAACTG-3' |
| SEQ ID NO: 18 | FOXP3_NGFR_FP | 5'-AGCCTTCAAGAGGTGGAACA-3' |
| SEQ ID NO: 19 | FOXP3_out3arm_RP | 5'-AGGCCATCCTGATCCTCAC-3' |
| SEQ ID NO: 20 | FOXP3_in3arm_control_FP | 5'-TGCCTCCTCTTCTTCCTTGA-3' |
| SEQ ID NO: 21 | FOXP3_out3arm_control_RP | 5'-GAGCCTCGAAAACCCTGACT-3' |
| | FOXP3 in-out PCR primers and probes for quantitative ddPCR analysis | |
| SEQ ID NO: 22 | FOXP3_inNGFR_ddPCR_FP | 5'-GGGAGGATTGGGAAGACAAT-3' |
| SEQ ID NO: 23 | FOXP3_inside_probe_FAM | 5'-TCAGAGATTGGAGGCTCTCC-3' |

TABLE 1-continued

| SEQ ID NO: 24 | FOXP3_out3arm_ddPCR_RP | 5'-ACAATACGGCCTCCTCCTCT-3' |
|---|---|---|
| SEQ ID NO: 25 | FOXP3_control_ddPCR_FP | 5'-CACCGAAATCGGTATTAGTTTG-3' |
| SEQ ID NO: 26 | FOXP3_control_probe_HEX | 5'-CAGTTCTGGAGGCCAGAGTC-3' |
| SEQ ID NO: 27 | FOXP3_control_ddPCR_RP | 5'-CCCGGGGAGTATAGAAGG-3' |

Sequencing of FOXP3 locus and mRNA expressed from edited allele

| SEQ ID NO: 28 | FOXP3_E-1_FP2 | 5'-CCAGGCTGATCCTTTTCTGTCA-3' |
|---|---|---|
| SEQ ID NO: 29 | FOXP3_E5_RP2 | 5'-CAGACACCATTTGCCAGCAG-3' |
| SEQ ID NO: 30 | FOXP3_E5_RP2d | 5'-CAGACGCCATTGGCCAGAAGG-3' |
| SEQ ID NO: 31 | FOXP3_E1_FP1d | 5'-TGCACCCAAGGCTTCTGAC-3' |
| SEQ ID NO: 32 | FOXP3_E3_RP1d | 5'-CTGGAGAACTGGGGTCC-3' |
| SEQ ID NO: 33 | FOXP3_E2_FP3d | 5'-CGCCCTCATTTCATGCACCA-3' |
| SEQ ID NO: 34 | FOXP3_E5_FP4d | 5'-TTGAAGAGCCAGAAGATTTC-3' |
| SEQ ID NO: 35 | FOXP3_E10_RP4d | 5'-ATGCGAACATTCTTGTGAAC-3' |
| SEQ ID NO: 36 | FOXP3_E11_RP1d | 5'-AGCACTTGTGCAGGGAAAGA-3' |
| SEQ ID NO: 37 | FOXP3_E11_RP2d | 5'-CCCGGCGTGGGATTGCTGCA-3' |
| SEQ ID NO: 38 | FOXP3_E11_FP1d | 5'-AACGGTCACAAAGACCAAGC-3' |
| SEQ ID NO: 39 | FOXP3_NGFR_RP1 | 5'-CACCGCTGTGTGTGTACAGG-3' |
| SEQ ID NO: 40 | FOXP3_E11_FP2d | 5'-AACGCTATTCGGCACAATCT-3' |
| SEQ ID NO: 41 | FOXP3_NGFR_RP2 | 5'-CCAGTCGTCTCATCCTGGTAG-3' |
| SEQ ID NO: 42 | FOXP3_E10_FP1d | 5'-AGGCACCTGAGAAGCAAAGA-3' |
| SEQ ID NO: 43 | FOXP3_NGFR_RP3 | 5'-GCTCACACACGGTCTGGTT-3' |
| SEQ ID NO: 44 | FOXP3_E10_FP2d | 5'-AGGCACCTGAGAAGCAAAGA-3' |
| SEQ ID NO: 45 | FOXP3_E1_RP1 | 5'-GGGGTTCAAGGAAGAAGAGG-3' |
| SEQ ID NO: 46 | FOXP3_E11_FP3d | 5'-AACGGTCACAAAGACCAAGC-3' |
| SEQ ID NO: 47 | FOXP3_E2_RP1 | 5'-CCTGGAGGAGTGCCTGTAAG-3' |
| SEQ ID NO: 48 | FOXP3_E11_FP4d | 5'-ACGCTATTCGGCACAATCTT-3' |
| SEQ ID NO: 49 | FOXP3_E2/3_RP1 | 5'-TTGAGAGCTGGTGCATGAAA-3' |
| SEQ ID NO: 50 | FOXP3_E-1_FP3 | 5'-ACCGTACAGCGTGGTTTTC-3' |
| SEQ ID NO: 51 | FOXP3_E7_RP1d | 5'-TTGGTGAGAGCCATTTTTCC-3' |
| SEQ ID NO: 52 | FOXP3_E-1_FP4 | 5'-AGAGAGAGGTCTGCGGCTTC-3' |
| SEQ ID NO: 53 | FOXP3_E9_RP1d | 5'-GAGGCCTCATGTTGTGGAAT-3' |
| SEQ ID NO: 54 | FOXP3_E7_FP1d | 5'-GGAAAAATGGCTCTCACCAA-3' |
| SEQ ID NO: 55 | FOXP3_E6_RP1d | 5'-CCAACAAGTGGTCTGCTTGA-3' |
| SEQ ID NO: 56 | FOXP3_E-1_RP1 | 5'-AGGCTTGGTGAAGTGGACTG-3' |
| SEQ ID NO: 57 | FOXP3_E1_RP2d | 5'-GGCTAGGTGCGCTAGGTTTT-3' |

What is claimed:

1. A method of providing to an individual human, in need thereof, functional FOXP3+ T cells, the method comprising:
    obtaining a biological cell sample comprising hematopoietic cells selected from hematopoietic stem or progenitor cells from a human donor;
    introducing into the hematopoietic cells a CRISPR/Cas9 complex targeting forkhead box P3 (FOXP3) gene and a recombinant FOXP3 homology donor vector to generate FOXP3 gene edited hematopoietic cells with endogenously regulated expression of FOXP3;
    administering an effective dose of the FOXP3 gene edited hematopoietic cells to the individual in need thereof, wherein the recombinant FOXP3 homology donor vector comprises at least 95% sequence identity to SEQ ID NO:3 or SEQ ID NO:4.

2. A FOXP3 homology donor vector comprising full-length FOXP3 cDNA and NGFR expressed under PGK promoter, comprising:
    a 5' arm with homology to the FOXP3 locus; a polynucleotide encoding FOXP3 or a variant thereof; a polyadenylation signal; and a 3' arm with homology to the FOXP3 locus, wherein the polynucleotide encoding FOXP3 comprises one or both of FOXP3 isoforms FOXP3$^{FL}$ (SEQ ID NO:1) and FOXP3$^{dE2}$ (SEQ ID NO:2), wherein the recombinant FOXP3 homology donor vector comprises at least 95% sequence identity to SEQ ID NO:3 or SEQ ID NO:4.

* * * * *